(12) United States Patent
Ali et al.

(10) Patent No.: US 12,026,319 B2
(45) Date of Patent: Jul. 2, 2024

(54) DYNAMIC GESTURE RECOGNITION USING mmWAVE RADAR

(71) Applicant: Samsung Electronics Co., Ltd., Suwon-si (KR)

(72) Inventors: Anum Ali, Plano, TX (US); Priyabrata Parida, Garland, TX (US); Vutha Va, Plano, TX (US); Boon Loong Ng, Plano, TX (US); Khuong N. Nguyen, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/063,055

(22) Filed: Dec. 7, 2022

(65) Prior Publication Data

US 2023/0333660 A1    Oct. 19, 2023

Related U.S. Application Data

(60) Provisional application No. 63/330,603, filed on Apr. 13, 2022.

(51) Int. Cl.
*G06F 3/01* (2006.01)
*G01S 13/88* (2006.01)
(Continued)

(52) U.S. Cl.
CPC .............. *G06F 3/017* (2013.01); *G01S 13/88* (2013.01); *G06V 10/454* (2022.01); *G06V 40/20* (2022.01)

(58) Field of Classification Search
CPC ....... G06F 3/017; G01S 13/88; G06V 10/454; G06V 40/20
See application file for complete search history.

(56) References Cited

U.S. PATENT DOCUMENTS 9,335,825 B2   5/2016  Rautiainen et al.
10,514,770 B2  12/2019  Malysa et al.
(Continued)

FOREIGN PATENT DOCUMENTS

CN    113313040 A    8/2021
CN    113963441 A    1/2022
WO    2020191070 A1  9/2020

OTHER PUBLICATIONS

International Search Report and Written Opinion dated Apr. 24, 2023 regarding International Application No. PCT/KR2023/000802, 8 pages.

*Primary Examiner* — Grant Sitta

(57) ABSTRACT

A method for end-to-end dynamic gesture recognition using mmWave radar is provided. The method includes triggering an electronic device to activate a gesture recognition mode in response to detecting that a condition for activating the gesture recognition mode is satisfied. The method includes obtaining radar data while the gesture recognition mode is activated, wherein the radar data includes time-velocity data (TVD). The method includes detecting a start and an end of a gesture based on the TVD of the obtained radar data. To classify the gesture, the method includes determining a gesture, from among a set of gesture, that corresponds to a portion of the TVD between the start and the end of the gesture. The method includes outputting an event indicator indicating that a user of the electronic device performed the gesture classified.

20 Claims, 32 Drawing Sheets

(51) Int. Cl.
    *G06V 10/44*     (2022.01)
    *G06V 40/20*     (2022.01)

(56) References Cited

U.S. PATENT DOCUMENTS

| | | |
|---|---|---|
| 11,030,459 B2 | 6/2021 | Agrawal et al. |
| 11,416,080 B2 * | 8/2022 | Heo ................... G06V 40/172 |
| 11,816,101 B2 * | 11/2023 | Poupyrev ............... G06F 16/29 |
| 2012/0280900 A1 * | 11/2012 | Wang .................. G06F 3/0488 |
| | | 345/156 |
| 2020/0300996 A1 | 9/2020 | Cetinoneri et al. |
| 2020/0336222 A1 | 10/2020 | Rimini |
| 2020/0356178 A1 * | 11/2020 | Qiu ....................... G01S 13/88 |
| 2021/0026454 A1 * | 1/2021 | Hong .................. G06V 40/161 |
| 2021/0027049 A1 | 1/2021 | Chandel et al. |
| 2021/0096653 A1 | 4/2021 | Amihood et al. |
| 2021/0270936 A1 | 9/2021 | Chen et al. |
| 2021/0293927 A1 | 9/2021 | Tyagi et al. |
| 2021/0342008 A1 | 11/2021 | Sachidanandam et al. |
| 2022/0082684 A1 | 3/2022 | Han et al. |

* cited by examiner

DYNAMIC GESTURE RECOGNITION USING mmWAVE RADAR

CROSS-REFERENCE TO RELATED APPLICATION(S) AND CLAIM OF PRIORITY

This application claims priority under 35 U.S.C. § 119(e) to U.S. Provisional Patent Application No. 63/330,603 filed on Apr. 13, 2022. The above-identified provisional patent application is hereby incorporated by reference in its entirety.

TECHNICAL FIELD

This disclosure relates generally to radar sensing. More specifically, this disclosure relates to end-to-end dynamic gesture recognition using mmWave radar.

BACKGROUND

Voice and gestural interactions are becoming increasingly popular in the context of ambient computing. These input methods allow the user to interact with digital devices, e.g., smart TVs, smartphones, tablets, smart home devices, AR/VR glasses etc., while performing other tasks, e.g., cooking and dining. Gestural interactions can be more effective than voice, particularly for simple interactions such as snoozing an alarm or controlling a multimedia player. For such simple interactions, gestural interactions have two main advantages over voice-based interactions, namely, complication and social-acceptability. First, the voice-based commands can often be long, and the user has to initiate with a hot word. Second, in quiet places and during conversations, the voice-based interaction can be socially awkward.

Gestural interaction with a digital device can be based on different sensor types, e.g., ultrasonic, IMU, optic, and radar. Optical sensors give the most favorable gesture recognition performance. The limitations of optic sensor based solutions, however, are sensitivity to ambient lighting conditions, privacy concerns, and battery consumption. Hence, optic sensor based solution have the inability to run for long periods of time. LIDAR based solutions can overcome some of these challenges such as lighting conditions and privacy, but the cost is still prohibitive (currently, only available in high-end devices).

SUMMARY

This disclosure provides dynamic gesture recognition using mmWave radar.

In one embodiment, a method for end-to-end dynamic gesture recognition using mmWave radar is provided. The method includes triggering an electronic device to activate a gesture recognition mode in response to detecting that a condition for activating the gesture recognition mode is satisfied. The method includes obtaining radar data while the gesture recognition mode is activated, wherein the radar data includes time-velocity data (TVD). The method includes detecting a start and an end of a gesture based on the TVD of the obtained radar data. To classify the gesture, the method includes determining a gesture, from among a set of gesture, that corresponds to a portion of the TVD between the start and the end of the gesture. The method includes outputting an event indicator indicating that a user of the electronic device performed the gesture classified.

In another embodiment, an electronic device for end-to-end dynamic gesture recognition using mmWave radar is provided. The electronic device includes a transceiver and a processor operatively connected to the transceiver. The processor is configured to trigger the electronic device to activate a gesture recognition mode in response to detecting that a condition for activating the gesture recognition mode is satisfied. The processor is configured to obtain radar data while the gesture recognition mode is activated, wherein the radar data includes time-velocity data (TVD). The processor is configured to detect a start and an end of a gesture based on the TVD of the obtained radar data. To classify the gesture, the processor is configured to determine a gesture, from among a set of gesture, that corresponds to a portion of the TVD between the start and the end of the gesture. The processor is configured to output an event indicator indicating that a user of the electronic device performed the gesture classified.

In yet another embodiment, a non-transitory computer readable medium comprising program code for end-to-end dynamic gesture recognition using mmWave radar is provided. The computer program includes computer readable program code that when executed causes at least one processor to trigger the electronic device to activate a gesture recognition mode in response to detecting that a condition for activating the gesture recognition mode is satisfied. The computer readable program code causes the processor to obtain radar data while the gesture recognition mode is activated, wherein the radar data includes time-velocity data (TVD). The computer readable program code causes the processor to detect a start and an end of a gesture based on the TVD of the obtained radar data. To classify the gesture, the computer readable program code causes the processor to determine a gesture, from among a set of gesture, that corresponds to a portion of the TVD between the start and the end of the gesture. The computer readable program code causes the processor to output an event indicator indicating that a user of the electronic device performed the gesture classified.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
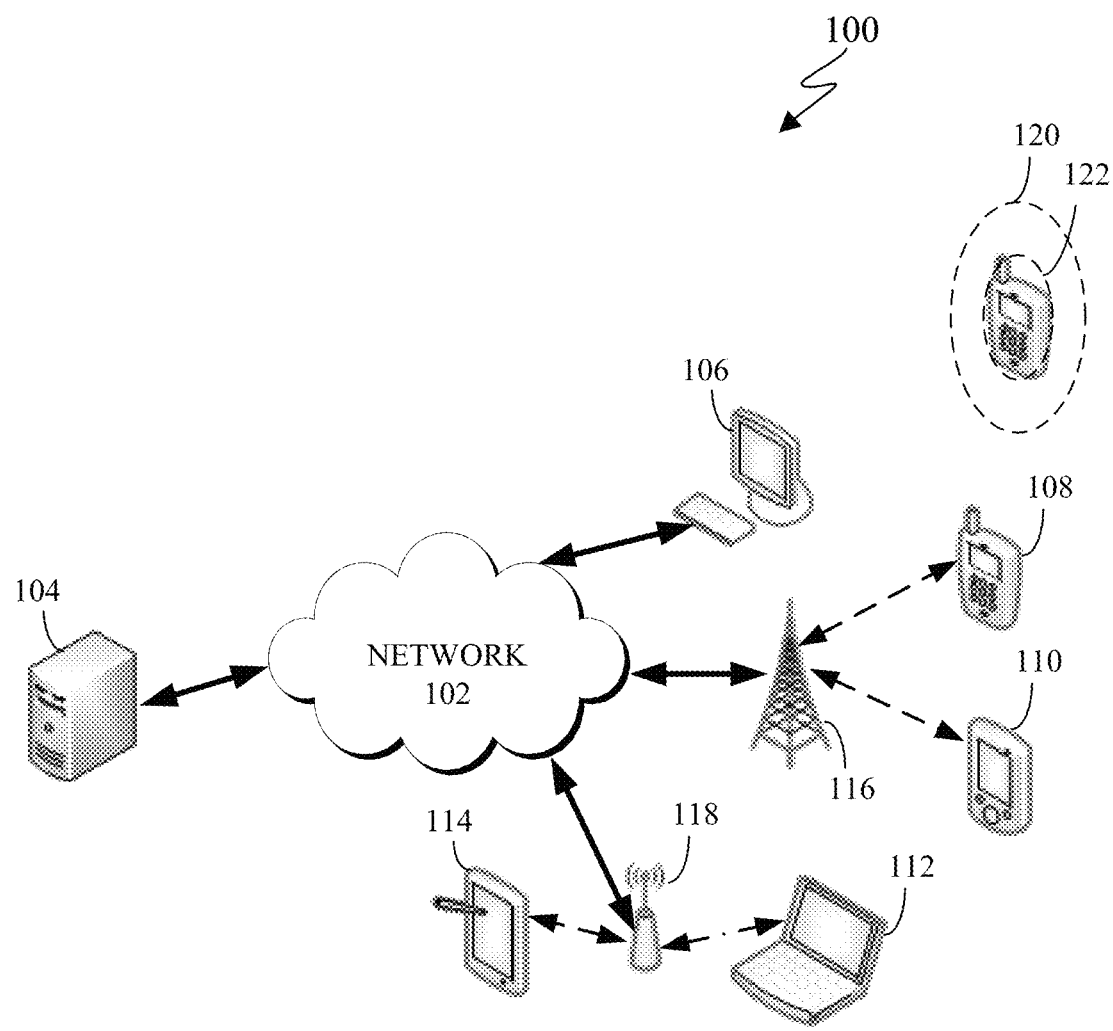
FIG. 1 illustrates an example communication system in accordance with an embodiment of this disclosure.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Regarding gestural interactions in the context of ambient computing, the limitations of ultrasonic, IMU, and optic sensors are overcome by the radar based solutions provided in this disclosure. Specifically, millimeter-wave (mmWave) radar sensors are a particularly suitable choice. In addition to overcoming all the limitations of optic sensor based solutions, the mmWave radars are small in size making them suitable choices for mobile devices. Further, due to the ability of electromagnetic waves to pass through dielectric materials, the radar does not need to be visible on a mobile device.

The use of radars on the mobile devices is also becoming more prevalent, due to the ability of a radar to support numerous applications. These applications include maximum permissible exposure (MPE) management, proximity sensing, gesture recognition, liveness detection, sleep monitoring, and vital sign monitoring (breathing/heart rate detection) etc.

Due to limited spatial resolution of the radars (because of the limited number of antennas) and higher range-Doppler resolution, generally dynamic gestures are of interest in radar based hand gesture recognition. Depending on the application and use case of the dynamic hand gestures, the gestures can be classified into macro-gestures and micro-gestures.

Macro-gestures are gestures that are performed using hand level movements. On the other hand, micro-gestures are performed by finger level movements. For dynamic gestures, the gesture signatures are rather complicated and vary substantially with users. As such, machine learning (ML) solutions are used for gesture classification.

Embodiments of this disclosure solve to two problems for ML solutions. As a first solution, embodiments of this disclosure limit the variety of scenarios that the ML model needs to deal with. This limit on the variety of scenarios is helpful because (i) the training data for the ML model needs to be obtained for a few carefully chosen cases/scenarios; and ii) the ML model itself benefits from this careful selection and can provide good performance on the chosen cases rather than dealing with a wide variety of cases/scenarios. As a second solution provided by embodiments of this disclosure, in the online operation of the gesture-recognition system, inferences are made based on the ML model. These inferences can be computationally expensive, especially if the model is complex. However, embodiments of this disclosure deploy simple methods to avoid making the use of ML model, then the computational burden associated with the overall gesture recognition method is reduced.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D)

communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example communication system in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver. In certain embodiments, the client devices 106-114 are able to sense the presence of an object located close to the client device and determine whether the location of the detected object is within a first area 120 or a second area 122 closer to the client device than a remainder of the first area 120 that is external to the first area 120. In certain embodiments, the boundary of the second area 122 is at a predefined proximity (e.g., 20 centimeters away) that is closer to the client device than the boundary of the first area 120, and the first area 120 can be a within a predefined range (e.g., 1 meter away, 2 meters away, or 5 meters away) from the client device where the user is likely to perform a gesture.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
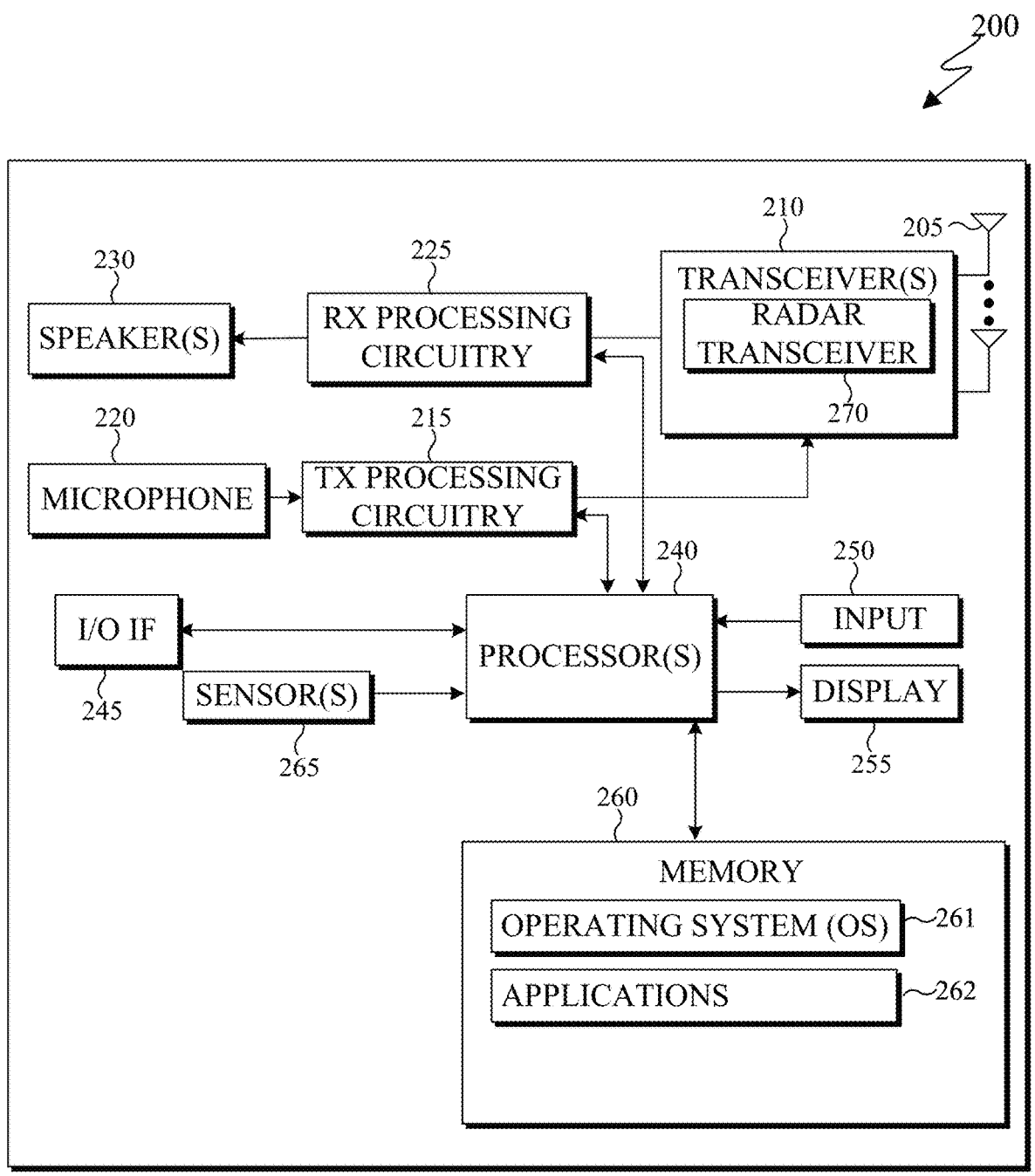
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of downlink (DL) channel signals and the transmission of uplink (UL) channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at a various frequencies. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

Figure 4:
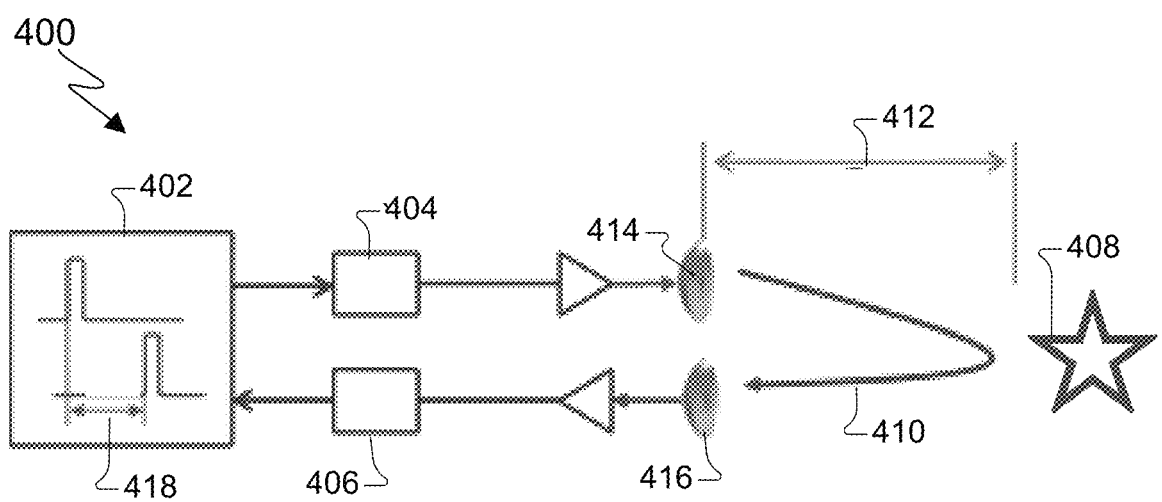
FIG. 4 illustrates an example architecture of a monostatic radar in an electronic device in accordance with an embodiment of this disclosure.

In certain embodiments, the radar transceiver 270 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 270 can include a transmitter and a receiver. In the radar transceiver 270, the transmitter of can transmit millimeter wave (mm-Wave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
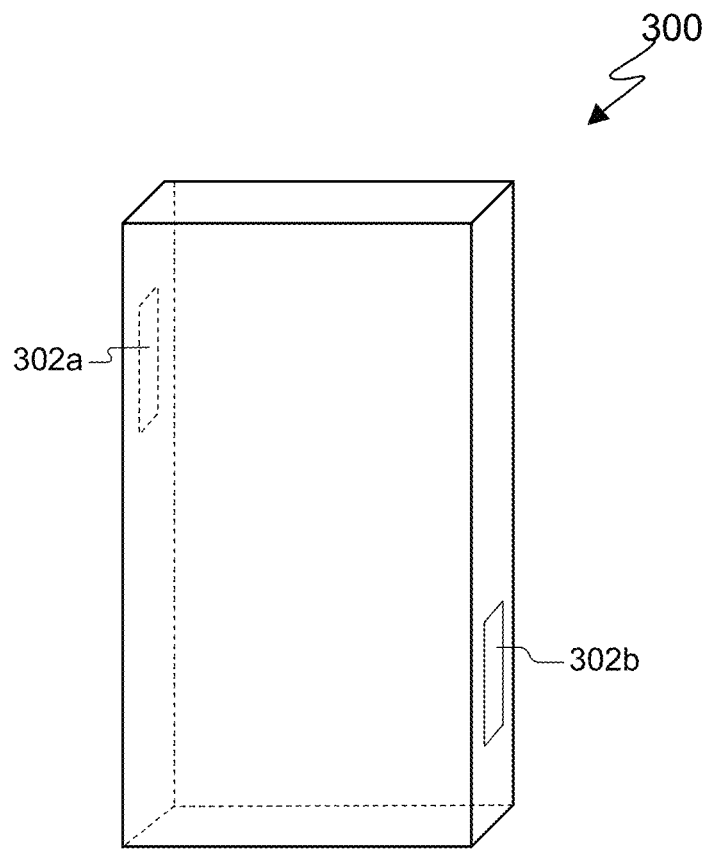
FIG. 3 illustrates a three-dimensional view of an example electronic device that includes multiple millimeter wave (mmWave) antenna modules in accordance with an embodiment of this disclosure.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the client devices 106-114 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302a and the second antenna module 302b are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only, and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off of the target object 408 and is received by the receiver 406 as a delayed echo, via a receive antenna 416. The signal 410 represents one or many signals that can be transmitted from the transmitter 404 and reflected off of the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off of the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving. As described herein, the electronic device 400 that includes the architecture of a monostatic radar is also referred to as a radar 400.

The signal 410 can be a radar pulse as a realization of a desired "radar waveform," modulated onto a radio carrier frequency. The transmitter 404 transmits the radar pulse signal 410 through a power amplifier and transmit antenna 414, either omni-directionally or focused into a particular direction. A target (such as target 408), at a distance 412 from the location of the radar (e.g., location of the transmit antenna 414) and within the field-of-view of the transmitted signal 410, will be illuminated by RF power density $p_t$ (in units of W/m$^2$) for the duration of the transmission of the radar pulse. Herein, the distance 412 from the location of the radar to the location of the target 408 is simply referred to as "R" or as the "target distance." To first order, $p_t$ can be described by Equation 1, where $P_T$ represents transmit power in units of watts (W), $G_T$ represents transmit antenna gain in units of decibels relative to isotropic (dBi), $A_T$ represents effective aperture area in units of square meters (m$^2$), and $\lambda$ represents wavelength of the radar signal RF carrier signal in units of meters. In Equation 1, effects of atmospheric attenuation, multi-path propagation, antenna losses, etc. have been neglected.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \tag{1}$$

The transmit power density impinging onto the surface of the target will reflect into the form of reflections depending on the material composition, surface shape, and dielectric behavior at the frequency of the radar signal. Note that off-direction scattered signals are typically too weak to be received back at the radar receiver (such as receive antenna 416 of FIG. 4), so typically, only direct reflections will contribute to a detectable receive signal. In essence, the illuminated area(s) of the target with normal vectors pointing back at the receiver will act as transmit antenna apertures with directivities (gains) in accordance with corresponding effective aperture area(s). The power of the reflections, such as direct reflections reflected and received back at the radar receiver, can be described by Equation 2, where $P_{refl}$ represents effective (isotropic) target-reflected power in units of watts, $A_t$ represents effective target area normal to the radar direction in units of m$^2$, $G_t$ represents corresponding aperture gain in units of dBi, and RCS represents radar cross section in units of square meters. Also in Equation 2, $r_t$ represents reflectivity of the material and shape, is unitless, and has a value between zero and one inclusively ([0, . . . , 1]). The RCS is an equivalent area that scales proportional to the actual reflecting area-squared, inversely proportional with the wavelength-squared, and is reduced by various shape factors and the reflectivity of the material itself. For a flat, fully reflecting mirror of area $A_t$, large compared with $\lambda^2$, RCS=$4\pi A_t^2/\lambda^2$. Due to the material and shape dependency, it is generally not possible to deduce the actual physical area of a target from the reflected power, even if the target distance R is known. Hence, the existence of stealth objects that choose material absorption and shape characteristics carefully for minimum RCS.

$$P_{refl} = p_t A_t G_t \sim p_t A_t r_t \frac{A_t}{(\lambda^2/4\pi)} = p_t RCS \tag{2}$$

The target-reflected power ($P_R$) at the location of the receiver results from the reflected-power density at the reverse distance R, collected over the receiver antenna aperture area. For example, the target-reflected power ($P_R$) at the location of the receiver can be described by Equation 3, where $A_R$ represents the receiver antenna effective aperture area in units of square meters. In certain embodiments, $A_R$ may be the same as $A_T$.

$$P_R = \frac{P_{refl}}{4\pi R^2} A_R = P_T \cdot RCS \frac{A_T A_R}{4\pi \lambda^2 R^4} \tag{3}$$

The target distance R sensed by the radar 400 is usable (for example, reliably accurate) as long as the receiver signal exhibits sufficient signal-to-noise ratio (SNR), the particular value of which depends on the waveform and detection method used by the radar 500 to sense the target distance. The SNR can be expressed by Equation 4, where k represents Boltzmann's constant, T represents temperature, and kT is in units of W/Hz]. In Equation 4, B represents bandwidth of the radar signal in units of Hertz (Hz), F represents receiver noise factor. The receiver noise factor represents degradation of receive signal SNR due to noise contributions of the receiver circuit itself.

$$SNR = \frac{P_R}{kT \cdot B \cdot F} \tag{4}$$

If the radar signal is a short pulse of duration $T_P$ (also referred to as pulse width), the delay $\tau$ between the transmission and reception of the corresponding echo can be expressed according to Equation 5, where c is the speed of (light) propagation in the medium (air).

$$\tau = 2R/c \tag{5}$$

In a scenario in which several targets are located at slightly different distances from the radar 400, the individual echoes can be distinguished as such if the delays differ by at least one pulse width. Hence, the range resolution ($\Delta R$) of the radar 400 can be expressed according to Equation 6.

$$\Delta R = c\Delta\tau/2 = cT_P/2 \tag{6}$$

If the radar signal is a rectangular pulse of duration $T_P$, the rectangular pulse exhibits a power spectral density P(f) expressed according to Equation 7. The rectangular pulse has a first null at its bandwidth B, which can be expressed according to Equation 8. The range resolution $\Delta R$ of the radar 400 is fundamentally connected with the bandwidth of the radar waveform, as expressed in Equation 9.

$$P(f) \sim (\sin(\pi f T_P)/(\pi f T_P))^2 \tag{7}$$

$$B = 1/T_P \tag{8}$$

$$\Delta R = c/2B \tag{9}$$

Although FIG. 4 illustrates one example radar 400, various changes can be made to FIG. 4. For example, the radar 400 could include hardware implementing a monostatic radar with 5G communication radio, and the radar can utilize a 5G waveform according to particular needs. In another example, the radar 400 could include hardware implementing a standalone radar, in which case, the radar transmits its own waveform (such as a chirp) on non-5G frequency bands such as the 24 GHz industrial, scientific and medical (ISM) band. In another particular example, the radar 400 could include hardware of a 5G communication radio that is configured to detect nearby objects, namely, the 5G communication radios has a radar detection capability.

Some electronic devices implement a binary method to prevent overexposure of RF energy on a human user by simply determining whether the target (such as a human body) is in the field of view of the radar 400, and disabling (or reducing the transmit power of) the antenna module of the radar 400 that generated the field of view in response to a determination that the target is in the field of view. The alternative outcome of this binary method is, in response to a determination that the target is not in the field of view, the electronic device enables the antenna module of the radar 400 to perform communication transmission using a transmit power that is not reduced (for example, increased or maintained).

Embodiments of this disclosure provide solutions for determining a TX power budget based on radar sensing, which is used to estimate an RFE level and to compensate for constraints, such as radar detection at discrete times (not instantaneous) and radar detection errors. Embodiments of this disclosure achieve an objective to allow a highest TX power while avoiding violation of the MPE and achieve another objective to avoid interruption of transmission due to a violation of the MPE.

Figure 5:
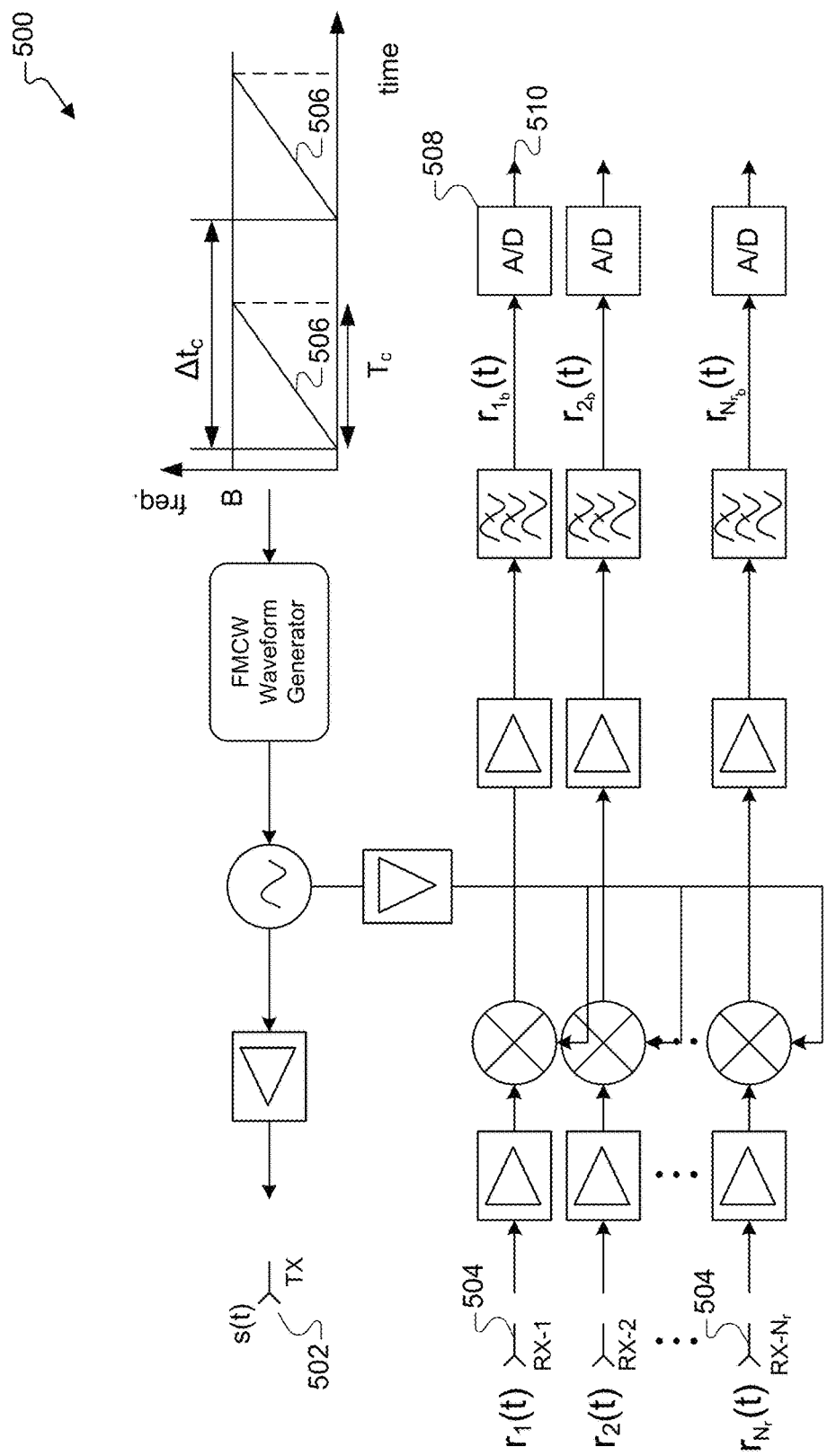
FIG. 5 illustrates a mmWave monostatic frequency-modulated continuous wave (FMCW) transceiver system in accordance with an embodiment of this disclosure.

FIG. 5 illustrates a mmWave monostatic frequency-modulated continuous wave (FMCW) transceiver system 500 in accordance with an embodiment of this disclosure. The FMCW transceiver system 500 could be included in one or more of the client devices 106-114 of FIG. 1, the electronic device 200 of FIG. 2, or the electronic device 300 of FIG. 3. The transmitter and the receiver within the FMCW transceiver system 500 can be included within the radar transceiver 270 of FIG. 2. The FMCW transceiver system 500 operates as a radar that can be used to detect the range, velocity and/or angle of a target object (such as the target object 408 of FIG. 4). The embodiments of the FMCW transceiver system 500 illustrated in FIG. 5 are for illustration only, and other embodiments can be used without departing from the scope of the present disclosure.

The FMCW transceiver system 500 includes a mmWave monostatic FMCW radar with sawtooth linear frequency modulation. The operational bandwidth of the radar can be described according to Equation 10, where $f_{min}$ and $f_{max}$ are minimum and maximum sweep frequencies of the radar, respectively. The radar is equipped with a single transmit antenna 502 and $N_r$ receive antennas 504.

$$B = f_{min} - f_{max} \tag{10}$$

The receive antennas 504 form a uniform linear array (ULA) with spacing $d_0$, which is expressed according to Equation 11, where $\lambda_{max}$ represents a maximum wavelength that is expressed according to Equation 12, c is the velocity of the light.

$$d_0 = \frac{\lambda_{max}}{2} \tag{11}$$

$$\lambda_{max} = \frac{c}{f_{min}} \tag{12}$$

The transmitter transmits a frequency modulated sinusoid chirp 506 of duration $T_c$ over the bandwidth B. Hence, the range resolution $r_{min}$ of the radar is expressed according to Equation 13. In the time domain, the transmitted chirp s(t) 506 is expressed according to Equation 14, where $A_T$ represents the amplitude of the transmit signal and S represents a ratio that controls the frequency ramp of s(t). The ratio S is expressed according to Equation 15.

$$r_{min} = \frac{c}{2B} \tag{13}$$

$$s(t) = A_T \cos(2\pi(f_{min}t + \frac{1}{2}St^2)) \tag{14}$$

$$S = \frac{B}{T_c} \tag{15}$$

When the transmitted chirp s(t) 506 impinges on an object (such as a finger, hand, or other body part of a human), the reflected signal from the object is received at the $N_r$ receive antennas 504. The object is at located at a distance $R_0$ from the radar (for example, from the transmit antenna 502). In this disclosure, the distance $R_0$ is also referred to as the "object range," "object distance," or "target distance." Assuming one dominant reflected path, the received signal at the reference antenna can be expressed according to Equation 16, where $A_R$ represents the amplitude of the reflected signal which is a function of $A_T$, distance between the radar and the reflecting object, and the physical properties of the object. Also in Equation 16, T represents the round trip time delay to the reference antenna, and can be express according to Equation 17.

$$r(t) = A_R \cos\left(2\pi\left(f_{min}(t-\tau) + \frac{1}{2}S(t-\tau)^2\right)\right) \tag{16}$$

$$\tau = \frac{2R_0}{c} \tag{17}$$

The beat signal $r_{b(t)}$ for the reference antenna is obtained by low pass filtering the output of the mixer. For the reference antenna, the beat signal is expressed according to Equation 18, where the last approximation follows from the fact that the propagation delay is orders of magnitude less than the chirp duration, namely, $\tau \ll T_c$.

$$r_{b(t)} = \tag{18}$$

$$\frac{A_T A_R}{2}\cos\left(2\pi\left(f_{min}\tau + S\tau t - \frac{1}{2}S\tau^2\right)\right) \approx \frac{A_T A_R}{2}\cos(2\pi S\tau t - 2\pi f_{min}\tau)$$

Two of the parameters that the beat signal has will be described in further in this disclosure, namely the beat frequency $f_b$ and the beat phase $\phi_b$. The beat frequency is used to estimate the object range $R_0$. The beat frequency can be expressed according to Equation 19. The beat phase can be expressed according to Equation 20.

$$f_b = S\tau = \frac{S2R_0}{c} \tag{19}$$

$$\phi_b = 2\pi f_{min}\tau \tag{20}$$

Further, for a moving target object, the velocity can be estimated using beat phases corresponding to at least two consecutive chirps. For example, if two chirps 506 are transmitted with a time separation of $\Delta t_c$ (where $\Delta t_c > T_c$), then the difference in beat phases is expressed according to Equation 21, where $v_0$ is the velocity of the object.

$$\Delta\phi_b = \frac{4\pi\Delta R}{\lambda_{max}} = \frac{4\pi v_0 \Delta t_c}{\lambda_{max}} \tag{21}$$

The beat frequency is obtained by taking the Fourier transform of the beat signal that directly gives the range $R_0$. To do so, the beat signal $r_b(t)$ is passed through an analog to digital converter (ADC) 508 with a sampling frequency $F_s$. The sample frequency can be expressed according to Equation 22, where $T_s$ represents the sampling period. As a consequence, each chirp 506 is sampled $N_s$ times where the chirp duration $T_c$ is expressed according to Equation 23.

$$F_s = \frac{1}{T_s} \quad (22)$$

$$T_c = N_s T_s \quad (23)$$

The ADC output 510 corresponding to the n-th chirp is $x_n \in R^{N_s \times 1}$ and defined according to Equation 24. The NS-point fast Fourier transform (FFT) output of $x_n$ is denoted as $X_n$. Assuming a single object, the frequency bin that corresponds to the beat frequency can be obtained according to Equation 25. In consideration of the fact that the radar resolution $r_{min}$ is expressed as the speed of light c divided by double the chirp bandwidth B (shown above in Equation 13), the n-th bin of the FFT output corresponds to a target located within [kc/2B−kc/4B, kc/2B+kc/4B] for $1 \leq k \leq N_s-1$. As the range information of the object is embedded in $X_n$, it is also referred to as the range FFT.

$$x_n = [\{x[k,n]\}_{k=0}^{N_s-1}] \text{ where } x[k,n] = r_b(n\Delta t_c + kT_s) \quad (24)$$

$$k^* = \text{argmax} \|X_n\|^2 \quad (25)$$

Figure 6:
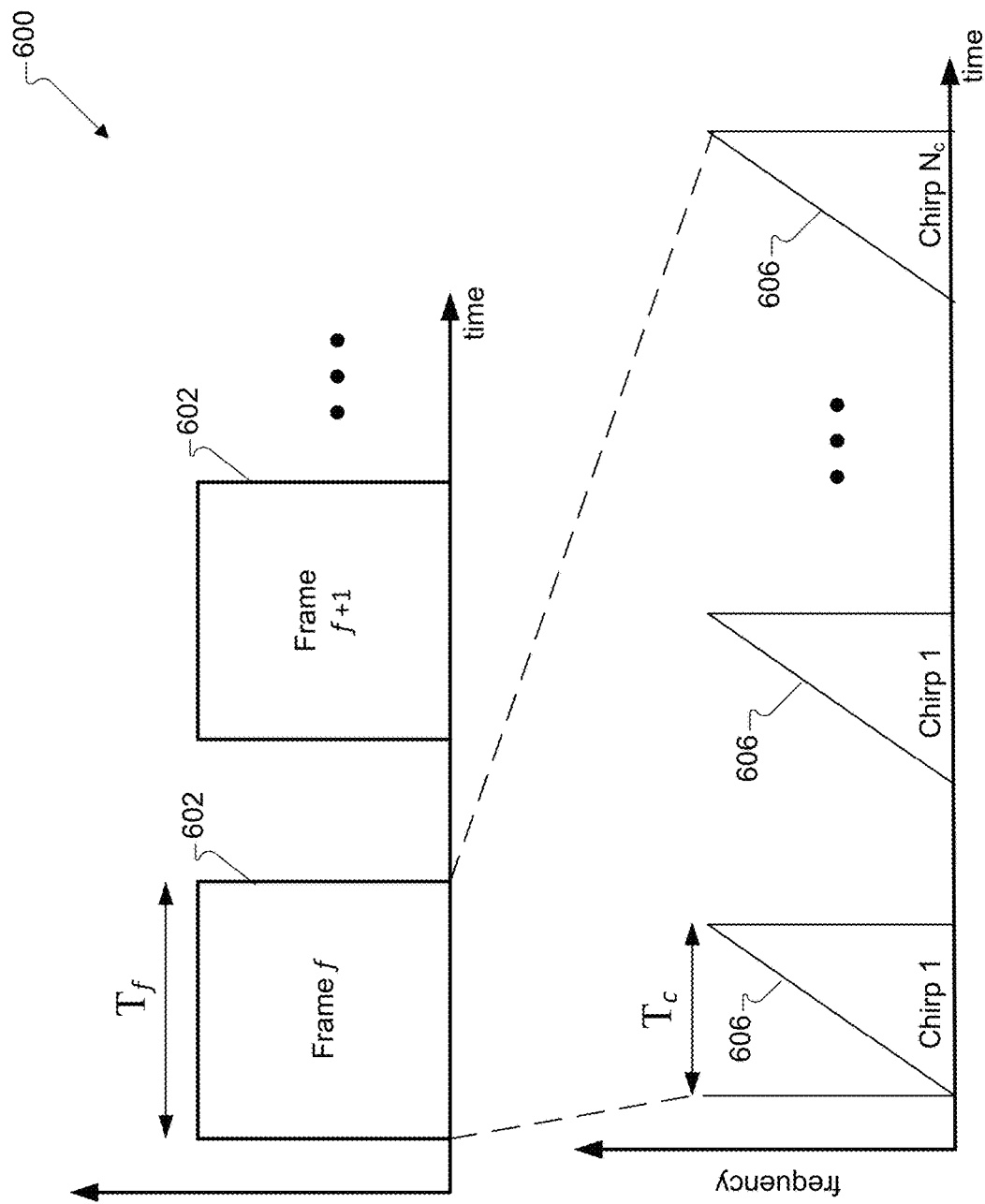
FIG. 6 illustrates a frame-based radar transmission timing structure in accordance with an embodiment of this disclosure.

FIG. 6 illustrates a frame-based radar transmission timing structure 600 in accordance with an embodiment of this disclosure. The embodiments of the frame-based radar transmission timing structure 600 illustrated in FIG. 6 are for illustration only, and other embodiments can be used without departing from the scope of the present disclosure.

The radar transmission timing structure 600 is used to facilitate velocity estimation. The radar transmissions are divided into frames 602, where each frame consists of Ne equally spaced chirps 606. The chirps 606 of FIG. 6 can be similar to the chirps 506 of FIG. 5. The range FFT of each chirp 606 provides the phase information on each range bin. For a given range bin, the Doppler spectrum, which includes the velocity information, is obtained by applying $N_c$-point FFT across the range FFTs of chirps corresponding to that range bin. The range-Doppler map (RDM) is constructed by repeating the above-described procedure for each range bin. The RDM is denoted as M, which is obtained by taking $N_c$-point FFT across all the columns of R. In Equation 26, this disclosure provides the following mathematical definition:

$$R \in \mathcal{C}^{N_c \times N_s} \text{ as } R = [X_0, X_1, \ldots, X_{N_c-1}]^T \quad (26)$$

The minimum velocity that can be estimated corresponds to the Doppler resolution, which is inversely proportional to the number of chirps $N_c$ and is expressed accorded to Equation 27.

$$v_{min} = \frac{\lambda_{max}}{2N_c T_c} \quad (27)$$

Further, the maximum velocity that can be estimated as shown in Equation 28.

$$v_{max} = \frac{N_c}{2} v_{min} = \frac{\lambda_{max}}{4T_c} \quad (28)$$

As an example, the FMCW transceiver system 500 of FIG. 5 can generate and utilize the frame-based radar transmission timing structure 600 of FIG. 6 for further processing, such as radar signal processing that includes clutter removal. The description of a clutter removal procedure will refer to both FIGS. 5 and 6.

In the case of a monostatic radar, the RDM obtained using the above-described technique has significant power contributions from direct leakage from the transmitting antenna 502 to the receiving antennas 504. Further, the contributions (e.g., power contributions) from larger and slowly moving body parts, such as the fist and forearm can be higher compared to the power contributions from the fingers. Because the transmit and receive antennas 502 and 504 are static, the direct leakage appears in the zero-Doppler bin in the RDM. On the other hand, the larger body parts (such as the fist and forearm) move relatively slowly compared to the fingers. Hence, signal contributions from the larger body parts mainly concentrate at lower velocities. Because the contributions from both these artifacts dominate the desired signal in the RDM, the clutter removal procedure according to embodiments of this disclosure remove them using appropriate signal processing techniques. The static contribution from the direct leakage is simply removed by nulling the zero-Doppler bin. To remove the contributions from slowly moving body parts, the sampled beat signal of all the chirps in a frame are passed through a first-order infinite impulse response (IIR) filter. For the reference frame f 602, the clutter removed samples corresponding to all the chirps can be obtained as expressed in Equation 28, where $\overline{y}_f[k,n]$ includes contributions from all previous samples of different chirps in the frame.

$$\widehat{x}_f[k,n] = x_f[k,n] - \overline{y}_f[k,n-1]$$

$$\overline{y}_f[k,n] = \alpha x_f[k,n] + (1-\alpha)\overline{y}_f[k,n-1]$$

$$\text{for } 0 \leq k \leq N_s-1 \text{ and } 0 \leq n \leq N_c-1 \quad (28)$$

This disclosure uses the following notation as shown in Table 1. The fast Fourier transform (FFT) output of a vector x is denoted as X. The N×N identity matrix is represented by $I_N$, and the N×1 zero vector is $0_{N \times 1}$. The set of complex and real numbers are denoted by $\mathcal{C}$ and $\mathcal{R}$, respectively.

TABLE 1

| | Notation | |
|---|---|---|
| Letter or Symbol | Typeface | What is represented |
| x | bold lowercase | column vectors |
| X | bold uppercase | matrices |
| x and X | non-bold letters | Scaler |
| T | superscript | transpose |
| * | superscript | conjugate transpose |

Figure 7A:
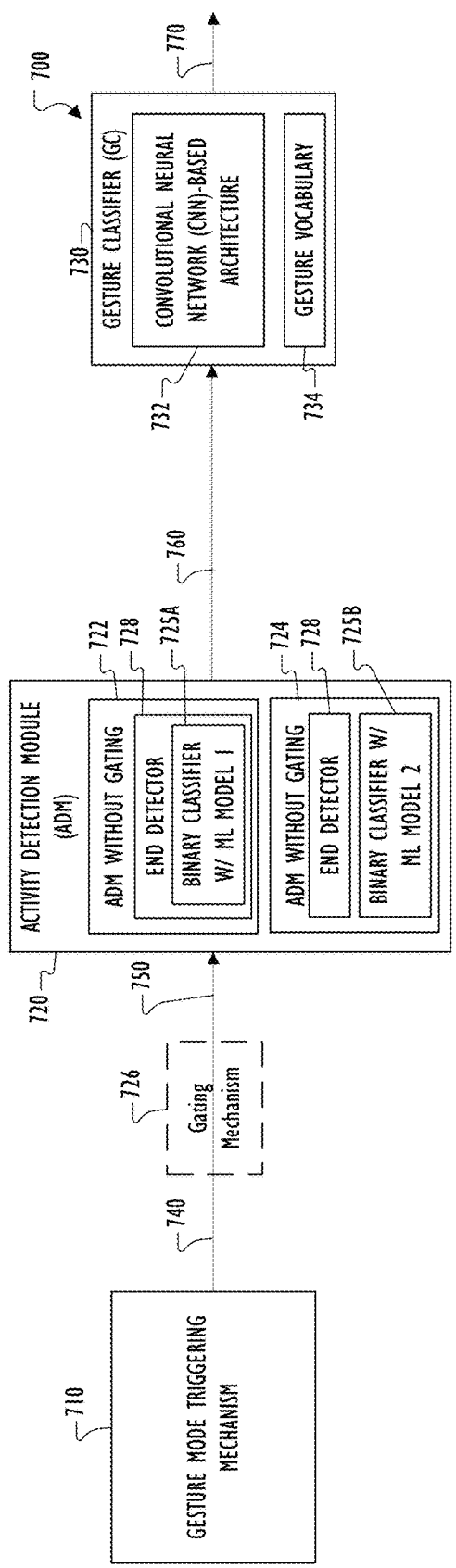
FIG. 7A illustrates an end-to-end gesture recognition system in accordance with an embodiment of this disclosure.

FIG. 7A illustrates an end-to-end gesture recognition system 700 in accordance with an embodiment of this disclosure. The embodiment of the system 700 shown in FIG. 7A is for illustration only, and other embodiments can be used without departing from the scope of this disclosure.

The end-to-end gesture recognition system 700 can be used to recognize a dynamic micro-gesture. The end-to-end gesture recognition system 700 has a gesture detection mode, which is activated by a trigger and which can be in an ON state or an OFF state. The end-to-end gesture recognition system 700 includes a gesture mode triggering mechanism 710, an activity detection module (ADM) 720, and a gesture classifier (GC) 730. In a first embodiment, the ADM 720 is an ADM 722 without a gating mechanism. In a second embodiment, the ADM 720 is an ADM 724 with a gating mechanism 726. In both embodiments with and without the gating mechanism, the ADM 720 includes an end detector 728. A binary classifier with an ML model 725A is included within the ADM 722 without gating. A binary classifier with a simpler ML model 725B is included within the ADM 724 with gating. The ML-based binary classifiers 725A and 725B (generally 725) perform similar functions as each other. The GC 730 includes a convolutional neural network based architecture 732 that is shift-invariant.

The gesture mode triggering mechanism 710 triggers the gesture detection mode, controlling whether the gesture detection mode of the system 700 is in the ON or OFF state. The gesture mode triggering mechanism 710 can apply multiple methods of triggering, for example by applying application-based triggering or proximity-based triggering. Applying application-based triggering, the gesture mode triggering mechanism 710 puts or maintains the gesture detection mode in the OFF state in response to a determination that a first application, which does not utilize dynamic gestures, is active (e.g., currently executed by the electronic device; or a user of the electronic device is interacting with a first application). On the other hand, the gesture mode triggering mechanism 710 turns ON the gesture detection mode in response to a determination that a second application, which utilizes or processes dynamic gestures, is being executed by the electronic device or a determination that the user is interacting with the second application. The second application can represent one or more of only a few applications with which the dynamic finger/micro-gesture gestures may be used, and as such, the gesture detection mode is triggered infrequently, when the user is actively using the second application exploiting gestural interaction. As an example, the first application can be an email application or a text message application, and the second application can be a multimedia player application. A user of the multimedia player application may want to fast forward or rewind by swiping right or swiping left in-air, in which case, the multimedia player application uses the system 700 and is able process such in-air dynamic micro-gestures.

In the case of applying proximity-based triggering, the gesture detection mode is activated when an object in close proximity to the radar is detected. The gesture mode triggering mechanism 710 puts or maintains the gesture detection mode in the OFF state if the user (i.e., target object) is located outside of the first area 120 (FIG. 1) or far from the electronic device, but puts the gesture detection mode in the ON state in response to a determination that the user is located inside the first area 120. In certain embodiments, to save power and avoid using the gesture mode when the user is likely performing a touchscreen gesture as opposed to an in-air gesture, the gesture mode triggering mechanism 710 puts the gesture detection mode in the ON state in response to a determination that the user is located outside the second area 122 and still inside the first area 120, but turns OFF the gesture detection mode when the user is located inside the second area 122. A benefit of activating the gesture detection mode based on proximity detection comes in reduced power consumption. A simpler task of proximity detection (relative to the complex task of gesture detection) can be achieved reliably with radar configurations that have low power consumption. The proximity detection function can itself be based on the radar data that is also used for gesture detection. After an object is detected in close proximity to the radar, then the system 700 is switched into the gesture detection mode, which could be based on another radar configuration that consumes more power. The embodiments of this disclosure relate to gesture detection, and this disclosure does not delve deeply into the implementation of the triggering mechanism 710.

The purpose of the ADM 720 is to determine the end of a gesture and subsequently trigger the GC 730 to operate. While the gesture recognition mode is activated, the ADM 720 obtains radar data 740 (e.g., receives from the radar transceiver 270 of FIG. 2), determines whether the obtained radar data 740 includes gesture activity, and further determines an end of a gesture. In the first embodiment without gating, to determine whether the obtained radar data 740 includes gesture activity, the ADM 722 executes the binary classifier 725A function of generating an indicator of "class 1" if the radar data 740 includes gesture activity or an indicator of "class 0" if the radar data 740 does not include gesture activity. In the second embodiment with gating, to determine whether the obtained radar data 740 includes gesture activity, the ADM 724 executes a gating mechanism 726 described further below. To determine the end of the gesture, the ADM 720 executes an end detector 728 function that detects an end of a gesture based on time velocity data (TVD) and/or time angle data (TAD) included in the obtained radar data. In certain embodiments, the end detector 728 determines both the start and the end of the gesture. In the second embodiment, the gating mechanism 726 determines whether the radar data includes gesture activity, and if so, then end detector 728 determines whether the detected gesture activity is a valid gesture based on the ML model within the binary classifier 725B.

The second embodiment including ADM 724 with gating will be described followed by a description of the first embodiment including the ADM 722 without gating. To avoid duplicative descriptions, the GC 730 can be used with any embodiment of the ADM 720, including the ADM 722 and the ADM 724.

ADM with Gating

The gating mechanism 726 is included within the ADM 724, but to ease explanation, is illustrated as being a processing block intermediately between the gesture mode triggering mechanism 710 and other components within the ADM. Also, to describe the gating mechanism 726 more easily, the term ADM refers to components within the ADM 720, 724 other than the gating mechanism 726. When the radar starts operation in the gesture detection mode, there could be detections of an object by the radar that could potentially be valid gestures, and as such, some action needs to be taken in response to these detections of valid gestures. In most cases, however, the detections of the object would not correspond to a valid gesture. One example is a hand of a person approaching the mobile phone, which is a type of activity that will be detected by the radar, but is not a valid gesture. Over the course of a day, the user may perform a gesture only a few times, but the hand may approach the mobile phone several times. The gating mechanism 726 prevents such detected non-gesture activity from triggering operation of the modules directly involved in gesture-recognition, such as the ADM 720 and GC 730.

Specifically, the gating mechanism 726 determines whether activity in a radar signal corresponds to non-gesture activities or gesture-related activities. In response to detecting gesture-related activities, the gating mechanism 726 triggers activation of the ADM. On the other hand, a detection non-gesture activities causes the ADM to be deactivated (if the ADM is already in operation), or to not be activated (if ADM is not currently in operation). The gating mechanism 726 ensures that ML models used in the ADM do not operate unless conditions for activating the ADM are satisfied, hence saving computational resources—potentially prolonging the device battery life. Based on information extracted from TVD and/or RDM, the gating mechanism 726 activates or deactivates the ADM, particularly a ML-classifier of the ADM. By selectively activating/deactivating the ADM, the gating mechanism 726 prevents the ADM from wasting computing resources, which waste would occur if the ADM processed radar data that does not correspond to gesture-related activity. Further, the gating mechanism 726 ensures that the ML model has good performance, as the ML model only needs to be trained to deal with a reduced number of scenarios. Information extracted from a TVD and/or RDM can be used for various gating methods, such as a gating method based on: (i) 1st peak detection; (ii) variation in range during the gesture; (iii) average time velocity diagram (TVD); (iv) persistent increase in the TVD; (v) burst detection; (vi) azimuth angle; or (vii) elevation angle.

During the time period that the radar operates (e.g., while gesture detection mode is ON), the radar is capturing data continuously, yet only part of this data (in time) contains a valid gesture because the user performs a gesture during only part of this time period. A function of the ADM 720 is to determine the time-period (e.g., 792 of FIG. 7B) during which an actual gesture is performed, so that data 760 from this time-period is input to the GC 730. In the example of the multimedia player application, the ADM 720 determines whether valid gesture activity occurred in order to control functions of the multimedia player application. Particularly, in order to trigger the GC 730, the ADM 720 is configured to determine the end of a gesture based on information extracted from time velocity data (TVD) and/or time angle data (TAD). The TVD and TAD can be presented in the format of a time-velocity diagram and a time-angle diagram, respectively. The flow of data 740, 750, 760, and 780 in FIG. 7A is described further below.

Figure 7B:
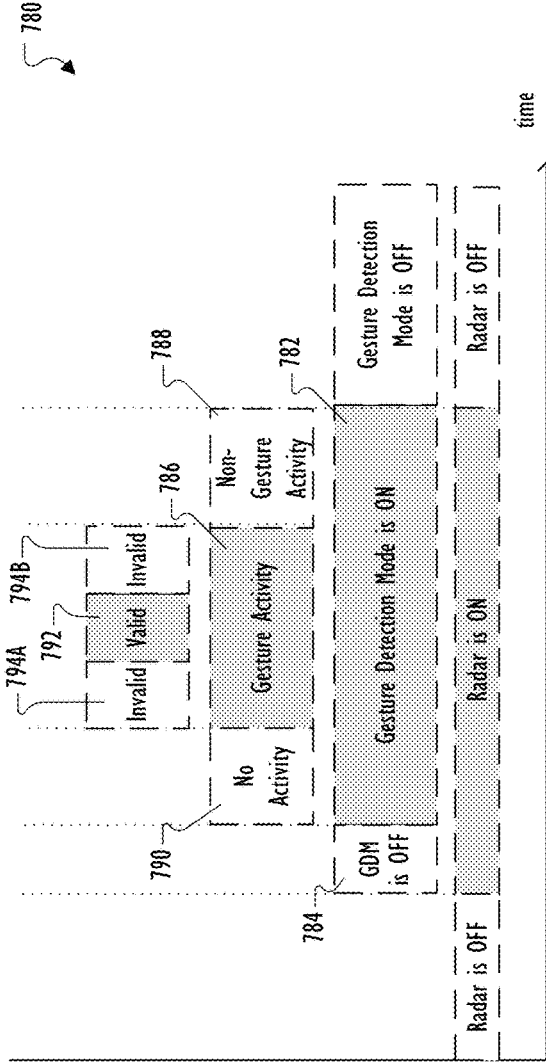
FIG. 7B illustrates a four-tier timeline in accordance with an embodiment of this disclosure.

Referring temporarily to FIG. 7B, which shows a four-tier timeline 780 during which the radar transceiver 270 (FIG. 2) may be in an ON state transceiving radar signals, or in an OFF state not receiving radar signals, as shown by a first tier of the timeline. The timeline 780 is not drawn to scale, yet aids in describing time periods that correspond to the data 740, 750, 760, and 780 in FIG. 7A. At second tier of the timeline, the gesture mode triggering mechanism 710 enables the gating mechanism 726 to receive radar data 740 (FIG. 7A) from the radar transceiver 270 (FIG. 2) during a period 782 while the radar is ON and operating. However, there may be time 784 when the radar is ON, but the gesture detection mode is OFF, for example, if the user interacts with a first application (e.g., provides touch input to an email application) while the radar operates. Also, the gesture detection mode is OFF if the radar is OFF. At the third tier of the timeline 780, the gating mechanism 726 enables the ADM 720 to process gesture activity data 750, which corresponds to a period 786. For example, in response to a determination that the radar data 740 contains gesture activity data 750, the gating mechanism 726 enables the ADM 720 to receive the radar data 740 from the radar transceiver 270. Also, the gating mechanism 726 discards, or disables the ADM 720 from processing, radar data 740 that corresponds to a time 788 of non-gesture activity or that corresponds to a time 790 of no activity. At the fourth tier of the timeline, the ADM 720 outputs valid gesture data 760 to the GC 730. However, the ADM 720 filters the gesture activity data 750 to remove invalid gesture data. The valid gesture data 760 corresponds to a period 792 during which a valid gesture was performed. Corresponding to the invalid gesture data, the periods 794a-794b are when the detected gesture activity is a performance that is not a valid gesture.

Referring back to FIG. 7A, the GC 730 is triggered when the end of a gesture is detected by the ADM 720. The GC 730 receives the gesture data 760 and determines which specific gesture, out of a set 734 of pre-determined gestures (illustrated and also referred to as "gesture vocabulary"), is performed. That is, GC 730 identifies or recognizes the gesture performed by the user based on the TVD and/or TAD within the gesture data 760 received. As an example only, this disclosure describes a set 734 of pre-determined gestures that includes three pairs of dynamic micro-gestures, namely, total six gestures. Further, the system 700 outputs an event indicator 770 indicating that a user of the electronic device performed the gesture classified by the GC 730. In certain embodiments, the event indicator 770 is output by the GC 730.

The GC 730 includes a convolutional neural network based (CNN-based) architecture 732 that is shift-invariant. The CNN-based architecture 732 processes TVD and/or TAD to determine which specific gesture within then the gesture vocabular 734 matches the gesture performed by a user. The GC 730 The CNN-based architecture 732 is shift-invariant due to the presence of one or more blur pool layers, described further below. The CNN-based architecture 732 includes a CNN model that recognizes or identifies the gestures with high accuracy and generalizes well to unseen users.

ADM without Gating

The ADM 722 includes a computationally-simple trained binary classifier 725 that operates on information extracted from a TVD to determine the end of a gesture. In a first example, the information extracted from a TVD includes low-dimensional Doppler features extracted from the TVD, and the ADM 722 determines the end of a gesture based on the extracted low-dimensional Doppler features. In a second example of the ADM 722, the information extracted from a TVD includes burst information extracted from the TVD, and the ADM 722 determines the end of a gesture based on the extracted burst information.

Figure 8:
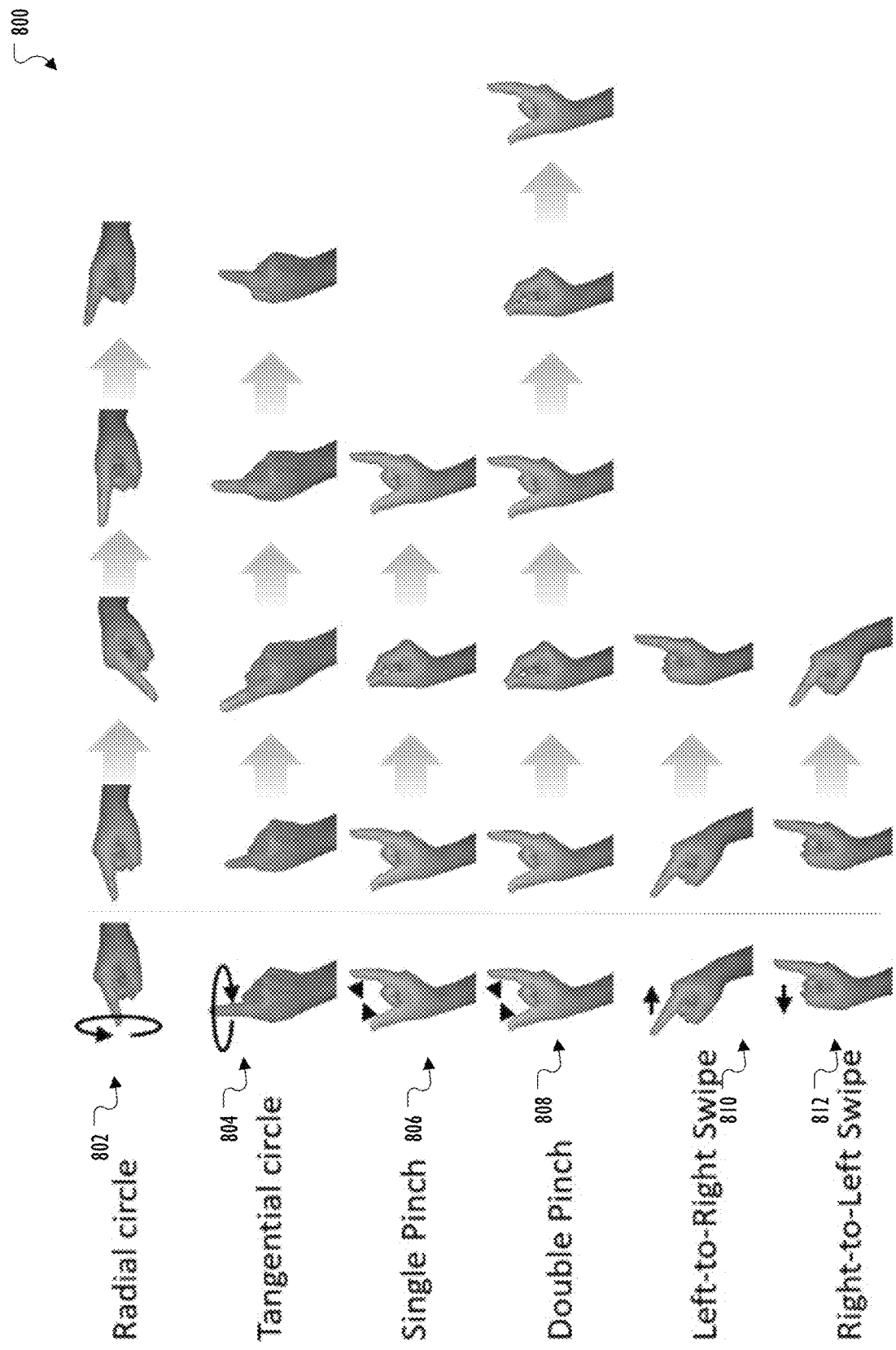
FIG. 8 illustrates a gesture set that forms a gesture vocabulary in accordance with an embodiment of this disclosure.

FIG. 8 illustrates a gesture set that forms a gesture vocabulary 800 in accordance with an embodiment of this disclosure. The gesture vocabulary 800 of FIG. 8 can be the same as or similar to the set 734 of pre-determined gestures of FIG. 7. The embodiment of the gesture vocabulary 800 shown in FIG. 8 is for illustration only, and other embodiments can be used without departing from the scope of this disclosure. For example, the gesture vocabulary 800 can include more or fewer gestures.

In certain embodiments, during selection of which gestures to include in the gesture vocabulary 800, two attributes were considered by the designer of the gesture vocabulary 800. The first desirable attribute was the intuitiveness and simplicity of the gesture. The second desirable attribute was the distinguishability of the gesture in the considered features. That is, each gesture is distinguishable from the other gestures either in TVD or TAD. Intuitive gestures are easy for the users to remember. Simpler gestures are easy to perform and imply more uniformity across users. Also, gestures in pairs are intuitive and simple. The selected gestures have clearly distinguishable features, and as such are conducive to good classification. Hence, the selected gestures are suitable for a good user experience.

With these desirable attributes in mind during selection of which gestures to include in the gesture vocabulary 800, some other gestures considered but not selected, including: (i) an index extension in which the index finger is extended towards the radar and is subsequently contracted; (ii) clockwise circle; (iii) counter-clockwise circle; (iv) left-half circle; (v) right-half circle; (vi) a slide of thumb on index finger; (vii) an open only gesture that starts from thumb and index fingers touching and includes movement of separating them; and (viii) a close only gesture that starts from the separated thumb and index fingers and includes movement of touching them.

The gesture vocabulary 800 includes a pair of circles, a pair of pinches, and a pair of swipes. The pair of circles contains a radial circle gesture 802 and a tangential circle 804. The names radial and tangential come from the movement of the finger relative to the radar. As the name implies in the radial circle gesture 802, the movement of the finger is radial to the radar, whereas in the tangential circle gesture 804, the movement is tangential to the radar. The pair of pinches includes a single pinch gesture 806 and a double pinch gesture 808. The pair of swipes includes two directional swipes, including a left-to-right swipe gesture 810 and a right-to-left swipe gesture 812.

Figure 9:
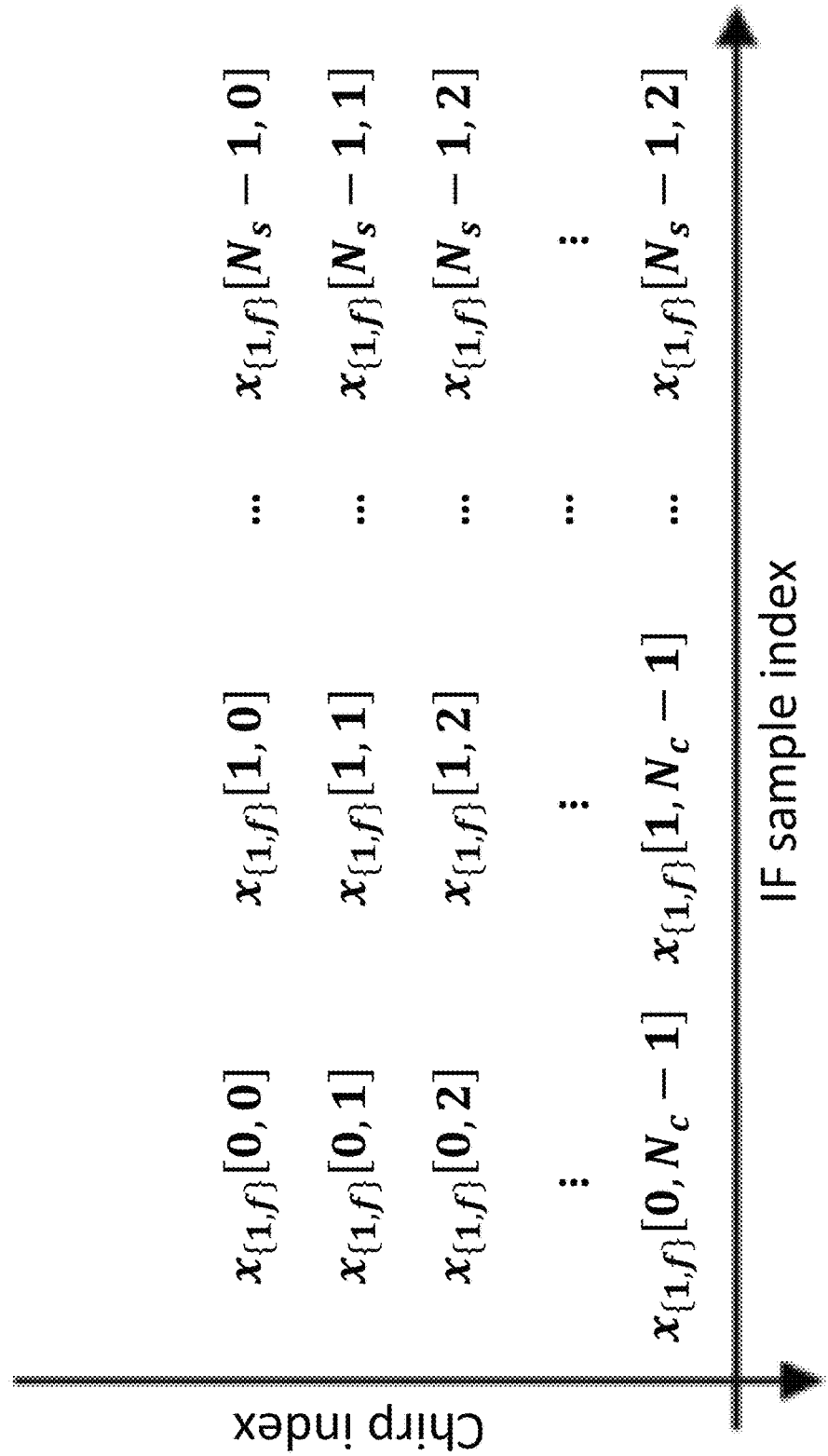
FIG. 9 illustrates an example raw radar data format for one radar frame of one receive antenna in accordance with an embodiment of this disclosure.

FIG. 9 illustrates an example raw radar data format 900 for one radar frame of one receive antenna in accordance with an embodiment of this disclosure. The embodiment of the raw radar data format 900 shown in FIG. 9 is for illustration only, and other embodiments can be used without departing from the scope of this disclosure. The raw radar data format 900 relates to the signal processing performed on the radar signal (such as the radar data 740) to obtain (for example, extract) the features that are used for gesture detection. Examples of features extracted from the raw radar data format 900 and used for gesture detection include: TVD, TAD, and low-dimensional Doppler extracted from the TVD.

FIG. 10 and FIG. 11 illustrate signal processing that the electronic device 200 executes to obtain the features. Regarding dynamic micro-gestures, the variation in the received radar signal as a function of time should highlight or distinguish the unique signatures of different gestures. The range variation is not particularly distinguishable in the context of micro-gesture recognition because the movement of the fingers is on the order of a few centimeters. As the range resolution $\Delta R$ itself is multiple centimeters, such as $\Delta R \sim 3$ cm for a radar with 5 GHz bandwidth, any range variation is quite coarse. The variation in Doppler and angle is thus more distinguishable in the context of micro-gesture recognition. The variation in Doppler as a function of time is captured through TVD. Similarly, the variation in angle is captured via TAD. In this disclosure, TVD and TAD (and features that can be obtained from them) are used as features for gesture classification (i.e., used by the GC 730). FIGS. 10 and 11 show how to obtain the TVD and TAD from the radar data, respectively.

Figure 10A:
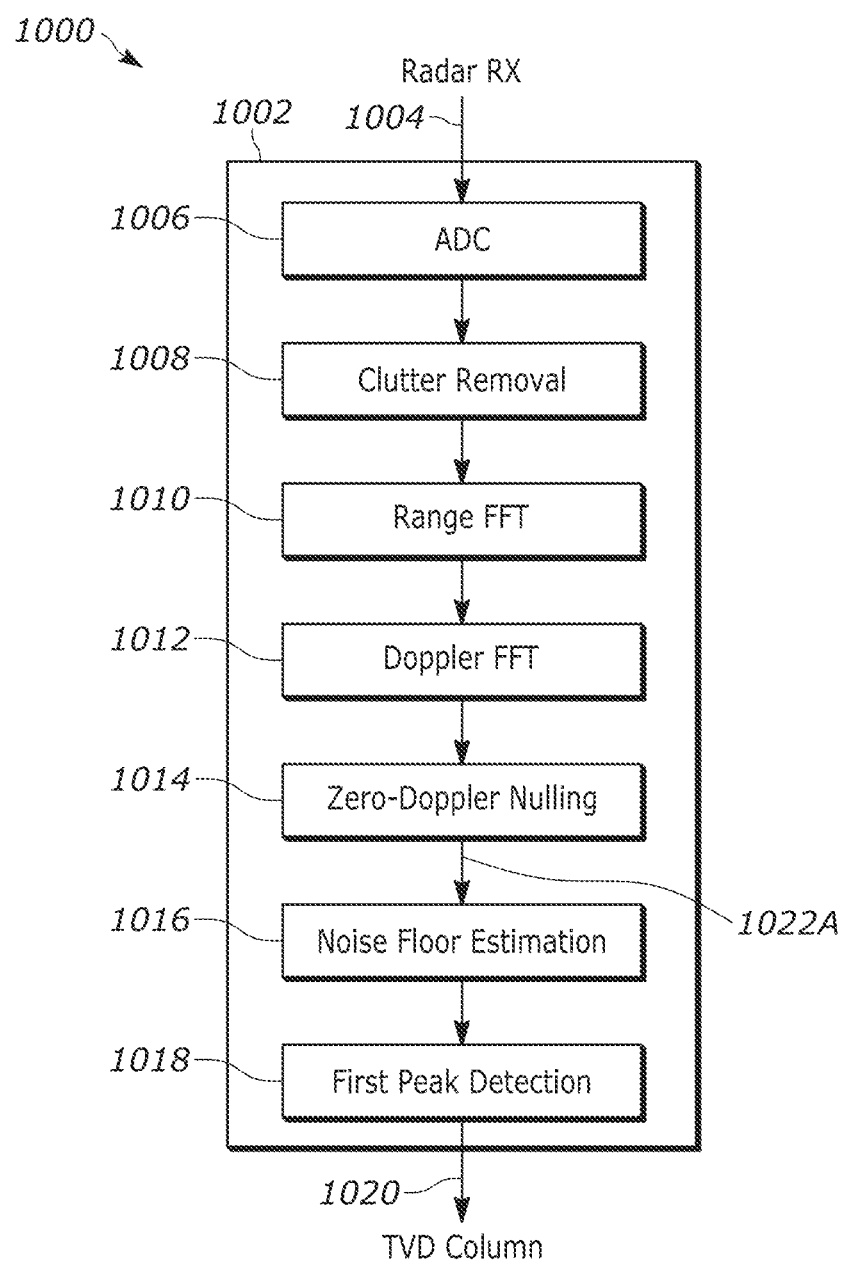
FIG. 10A illustrates a process of generating a time velocity data (TVD) column from a frame, such as the radar frame of FIG. 9, in accordance with an embodiment of this disclosure.
Figure 10B:
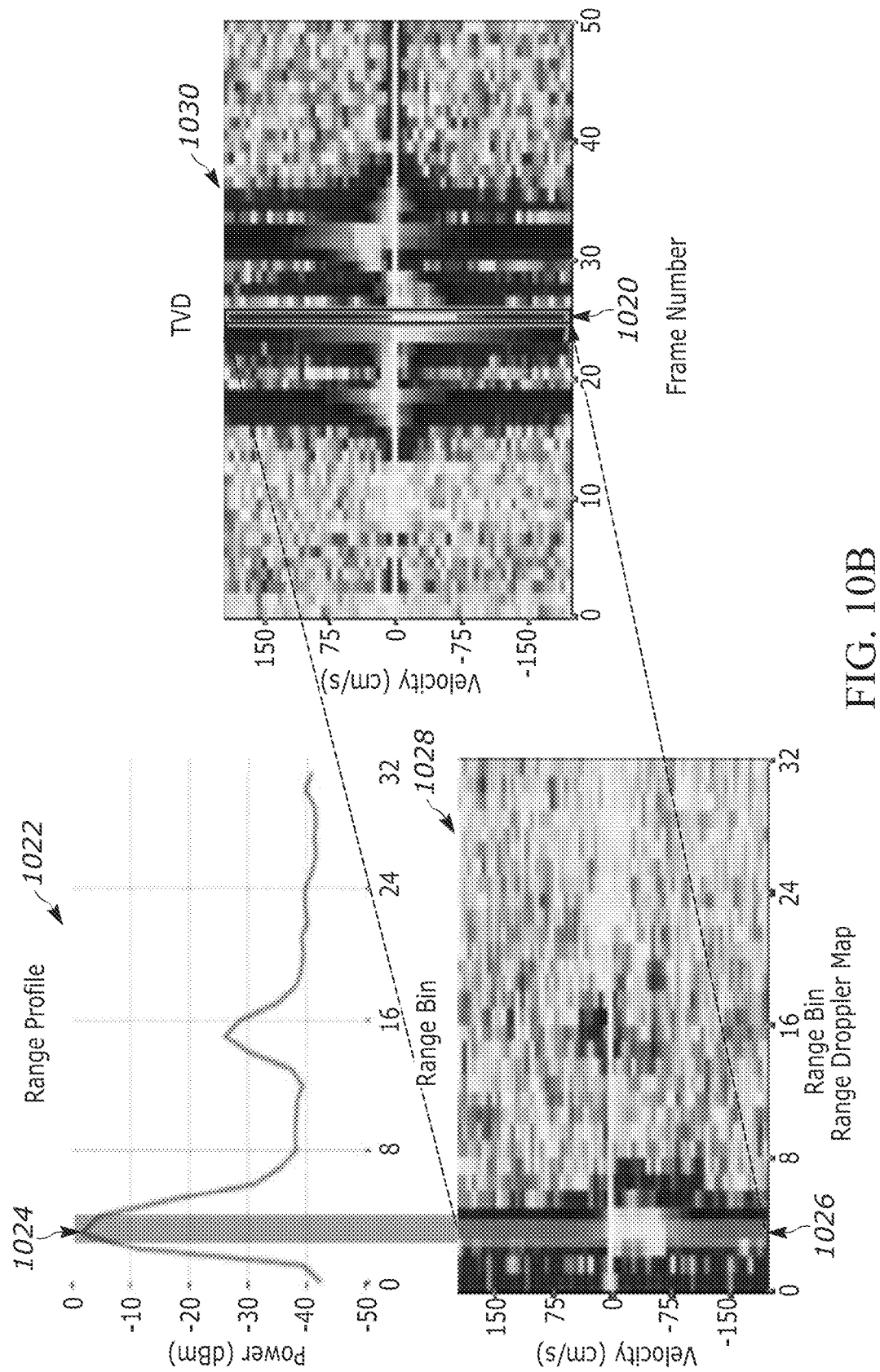
FIG. 10B illustrates a range profile, a range doppler map, and the TVD generated by the process of FIG. 10A, in accordance with an embodiment of this disclosure.

FIG. 10A illustrates a process 1000 of generating a TVD column from a frame, such as the radar frame 900 of FIG. 9, in accordance with an embodiment of this disclosure. FIG. 10B illustrates a range profile 1022, a range doppler map (RDM) 1028, and the TVD 1030 generated by the process of FIG. 10A, in accordance with an embodiment of this disclosure. Together, FIGS. 10A and 10B are generally referred to as FIG. 10. The embodiment of the TVD column generation process 1000 shown in FIG. 10 is for illustration only, and other embodiments can be used without departing from the scope of this disclosure.

A radar module 1002 obtains a received radar signal 1004 (illustrated as "Receive RX"). To implement the process 1000, the radar module 1002 includes an analog-to-digital converter (ADC) 1006, clutter remover 1008, range Fast Fourier transform (FFT) module 1010, a Doppler FFT 1012, a zero-Doppler nulling module 1014, a noise floor estimator 1016, and a first peak detector 1018. By implementing the process 1000, the radar module 1002 generates and outputs a TVD column 1020 from the radar signal 1004.

Using the clutter removed and zero-Doppler nulled RDM for a given frame 1022a, the radar module 1002 generates a range profile 1022 curve by summing the power across all Doppler bins. In this example range-profile 1022, the x-axis of the range profile 1022 represents the Range bins (e.g., 32 bins are illustrated), and the y-axis represents the power (in dBm) across all Doppler bins.

At the noise floor estimator 1016, the range profile 1022 is compared with a detection threshold to extract the range information of the target of interest. In this disclosure, the first detected peak 1024 in the range profile 1022 indicates the location of the target object. Specifically, the first peak above the detection threshold is considered to contain the moving finger. This is based on the observation that in a typical experimental use case, the gesture is the closest moving target to the radar. The detection threshold itself varies with range to accommodate the leakage residual in the first few taps. As such, the detection threshold on the first few taps is chosen higher than the subsequent taps. The number of taps and the amount of offset applied to the detection threshold is determined based on measurements. Based on experimental results, these thresholds depend on the choice of the radar parameters and remain consistent across various radars and across time. Thus, these thresholds, once determined, can be used in various radar platforms and across time. Once the first peak 1024 is identified, the Doppler 1026 from the RDM 1028 for the tap corresponding to the first peak 1024 is used to construct the TVD 1030.

In this example TVD 1030, the x-axis of the range profile 1022 represents time measured in frame numbers (e.g., two seconds are illustrated as 50 frames), and the y-axis represents the velocity (in centimeters per second). That is, the Doppler dimension of the TVD is the velocity dimension represented by the y-axis. The TVD 1030 includes the TVD column 1020 for a given frame, such as the frame corresponding to the received radar signal 1004.

Figure 11A:
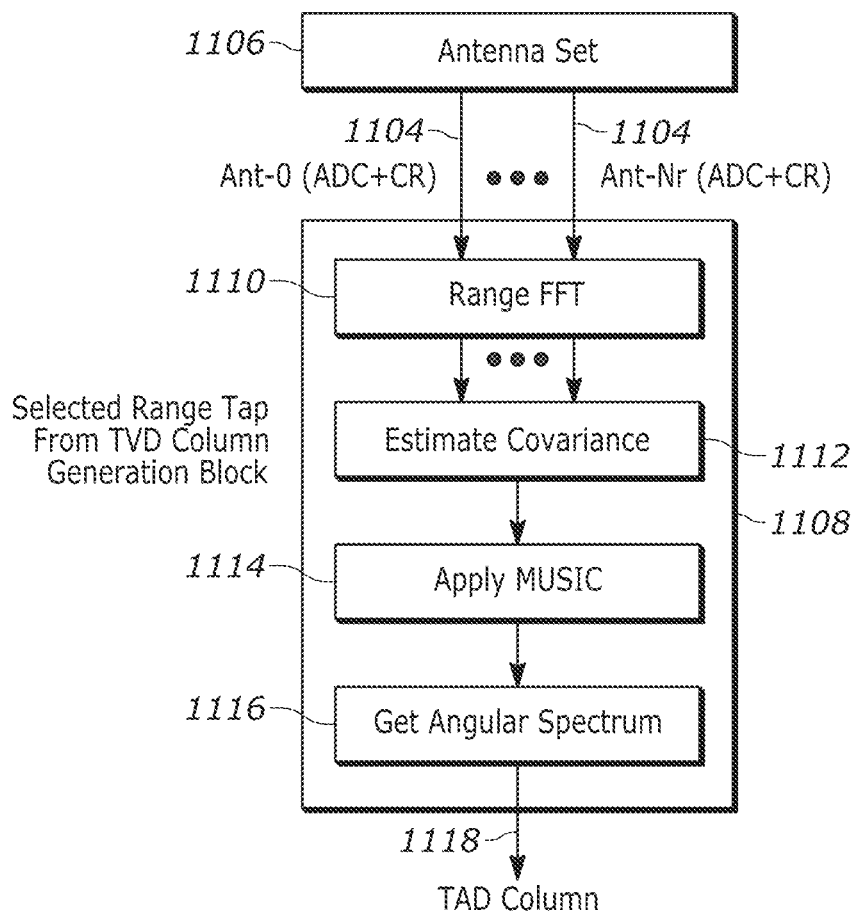
FIG. 11A illustrates a process of generating a time angle data (TAD) column for a frame from an antenna set in accordance with an embodiment of this disclosure.
Figure 11B:
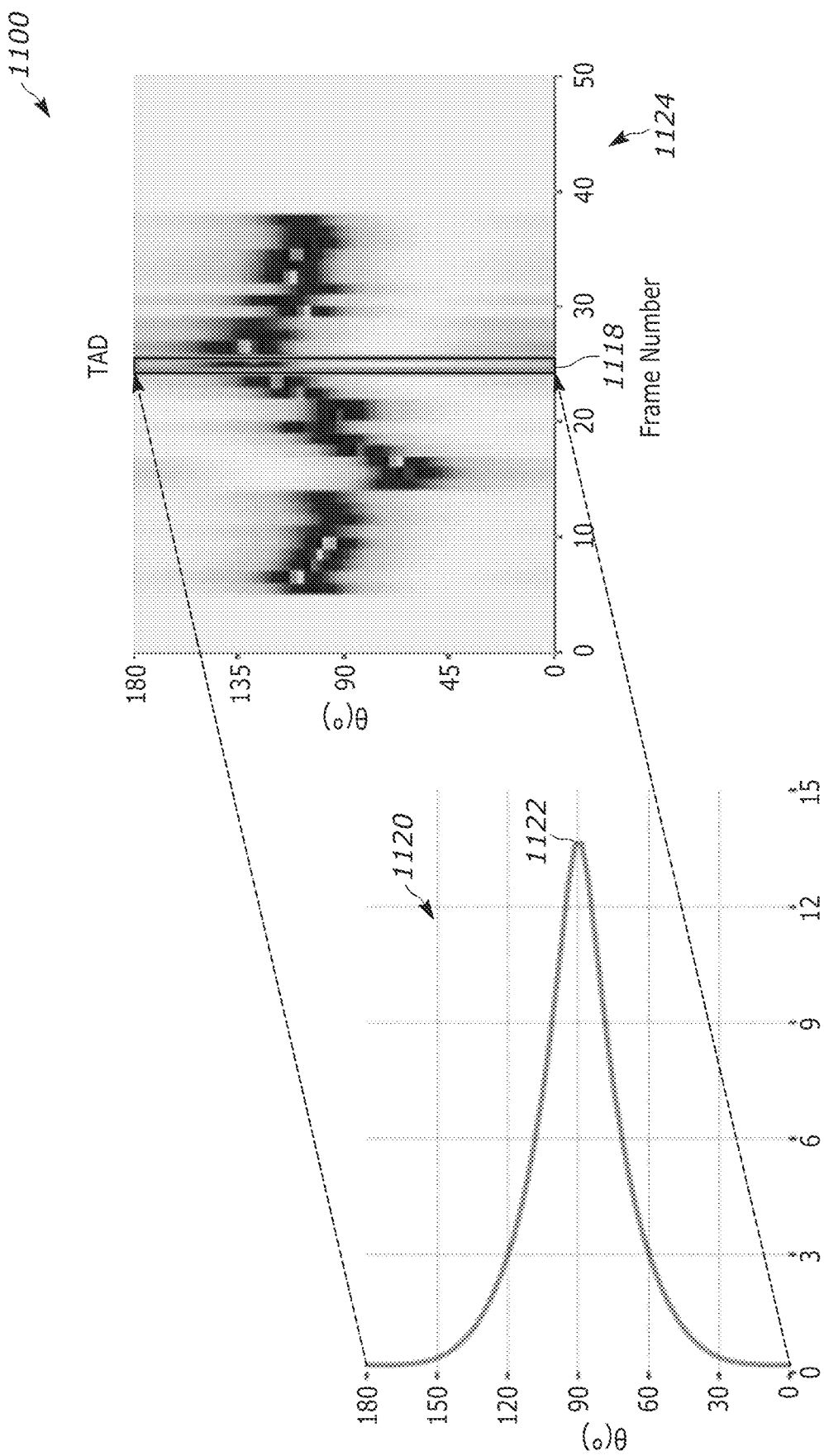
FIG. 11B illustrates an angular spectrum and the TAD graph generated by the process of FIG. 11A, in accordance with an embodiment of this disclosure.

FIG. 11A illustrates a process 1100 of generating a TAD column for a frame from an antenna set 1102 in accordance with an embodiment of this disclosure. FIG. 11B illustrates an angular spectrum 1120 and the TAD graph 1124 generated by the process of FIG. 11A, in accordance with an embodiment of this disclosure. Together, FIGS. 11A and 11B are generally referred to as FIG. 11. The embodiment of the TVD column generation process 1100 shown in FIG. 11 is for illustration only, and other embodiments can be used without departing from the scope of this disclosure.

For the TVD generation process 1000 of FIG. 10, the received signal 1004 from any one or more of the antennas can be processed. However, by way of comparison, for the TAD generation process 1100 of FIG. 11, the beat signals 1104 from an antenna set 1106 of multiple antennas (illustrated as "Ant-0 (ADC+CR) . . . Ant-$N_r$ (ADC+CR)") are processed. In certain embodiments, the antenna set 1106 includes all receive antennas of the radar. In certain embodiments, the antenna set 1106 is the same as or similar to the ULA in FIG. 5. To implement the process 1100, the radar processes the $N_r$ beat signals 1104 through blocks 1110-1116 described further below, and outputs a TAD column 1118.

The process 1100 of TAD generation is shown in FIG. 11 assumes the target object is located at an angle $\Phi_0$ with respect to the end fire of a ULA. The beat signal 1104 for a receive antenna having an index i is expressed according to Equation 29, where $\tau_i$ denotes the round trip time delay to the i-th receive antenna. The round trip time delay $\tau_i$ is expressed according to Equation 30 as antenna index i≥1.

$$r_{i_b}(t) \approx \frac{A_T A_{R_i}}{2} \cos(2\pi S\tau_i t + 2\pi f_{min}\tau_i) \text{ for } i \geq 1 \quad (29)$$

$$\tau_i = \frac{2R_0 + (i-1)d_0 \cos(\Phi_0)}{c} \quad (30)$$

Because the object range $R_0$ is much greater than the antenna spacing $d_0$ ($R_0 \ll d_0$), the beat frequency at the i-th antenna is expressed according to Equation 31.

$$S\tau_i \approx S\tau_1, \forall i \quad (31)$$

On the other hand, the spatial angle information is easily extracted using the phases of the beat signals across the antennas. For a given frame f, the sampled ADC output corresponding to the n-th chirp for the i-th antenna is expressed according to Equation 32.

$$x_{i,n,f} = [\{x_{i,f}[k,n]\}_{k=0}^{N_s-1}]$$

where $x_{i,j[k,n]} = r_{i_b}(n\Delta t_c + kT_s)$ (32)

At block 1110, to extract the angle information using all the chirps in f-th frame, Equation 33 can be utilized to compute the range FFT $R_{i,f} \in \mathcal{C}^{N_c \times N_s}$ of all the chirps for each antenna i. In Equation 33 $X_{i,n,f}$ denotes the range FFT corresponding to $x_{i,n,f}$. The target location corresponding to the range bin index $b_0$ and $r_{i,f,b_0}$ is the corresponding column in $R_{i,f}$. Also at block 1110, $B_{f,b_0} \in \mathcal{C}^{N_r \times N_c}$ is defined as expressed in Equation 34.

$$R_{i,f} = [X_{i,0,f}, X_{i,1,f}, \ldots, X_{i,N_c-1,f}]^T \quad (33)$$

$$B_{f,b_0} = [r_{1,f,b_0}, r_{2,f,b_0}, \ldots, r_{N_r,f,b_0}]^T \quad (34)$$

At block, 1112, the co-variance matrix of the received signal across the $N_r$ antennas is empirically obtained, mathematically, as expressed in Equation 35.

$$C_{f,b_0} = \frac{B_{f,b_0} B^*_{f,b_0}}{N_c} \quad (35)$$

At block 1114, the MUSIC algorithm is applied to the $C_{f,b_0}$, to obtain the spatial spectrum of the target at bin $b_0$. Other direction estimation algorithms can also be used instead of the MUSIC algorithm. Formally, the radar module 1108 decomposes $C_{f,b_0}$ using the eigenvalue decomposition and separate the signal and noise subspaces as according to Equation 36, where $\Lambda_{s,f,b_0}$ represents a diagonal matrix containing the eigenvalues of $C_{f,b_0}$ corresponding to the signal and $\sigma_n^2$ is the noise variance. Separating signal and noise subspaces is not a trivial procedure, and embodiments of this disclosure assume a single target and select the subspace corresponding to the strongest eigenvalue as the signal subspace.

$$C_{f,b_0} = U_{s,f,b_0} \Lambda_{s,f,b_0} U^*_{s,f,b_0} + \sigma_n^2 U_{n,f,b_0} U^*_{n,f,b_0} \quad (36)$$

At block 1116, the angular spectrum 1120 is obtained according to Equation 37. The angular spectrum 1120 can be presented as a graph in which the x-axis represents power (in dB), and the y-axis represents the angle $\theta$ (in degrees). The peak 1122 of the angular spectrum 1120 is attained at $\beta = \theta_0$.

$$P_{f,b_0}(\beta) = \frac{1}{a(\beta) U_{n,f,b_0} U^*_{n,f,b_0} a(\beta)}, \quad (37)$$

where $a(\beta) = \left[1, e^{-j\frac{2\pi d_0}{\lambda_{min}}\cos(\beta)}, \ldots, e^{-j\frac{2\pi(N_r-1)d_0}{\lambda_{min}}\cos(\beta)}\right]$ To construct the TAD column 1118 for the f-th frame, Equation 38 is evaluated. The TAD column 1118 can be presented as part of a TAD graph 1124 in which the x-axis represents frame numbers, and the y-axis represents the angle $\theta$ (in degrees). This choice of $\beta$ is selected to match the dimension of TVD 1030 of FIG. 10.

$$P_{f,b_0}(\beta) \text{ for } \beta \in \left[0, \frac{\pi}{N_c}, \ldots, \frac{\pi(N_c-1)}{N_c}\right] \quad (38)$$

Figure 12A:
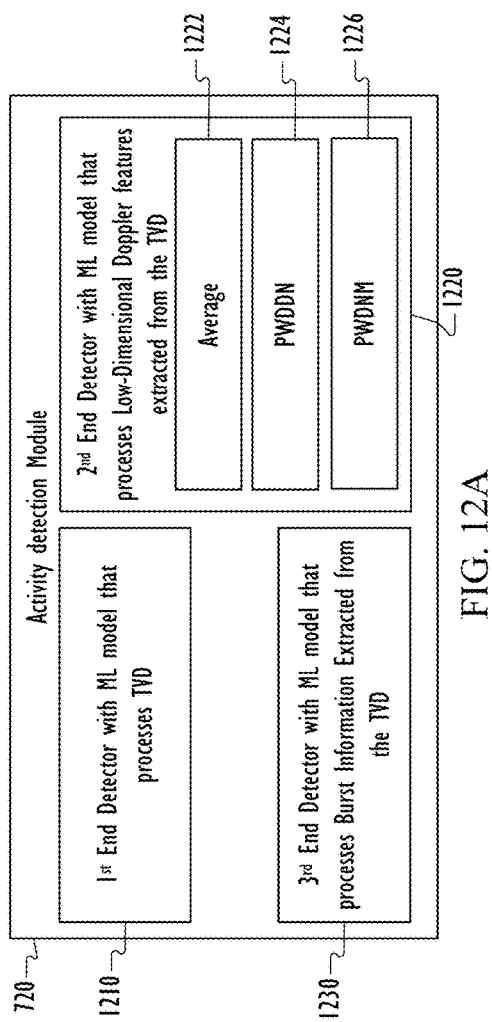
FIG. 12A illustrates the ADM including one or more end detectors that respectively detect end of a gesture in accordance with an embodiment of this disclosure.

FIG. 12A illustrates the ADM 720 including one or more end detectors 1210, 1220, and 1230 that respectively detect an end of a gesture in accordance with an embodiment of this disclosure. The end detectors 1210, 1220, and 1230 can be the same as or similar to the end detector 728 of FIG. 7, and can include corresponding the binary classifiers 725A-725B. The embodiment of the ADM 720 shown in FIG. 12A is for illustration only, and other embodiments can be used without departing from the scope of this disclosure.

As the functionality of the gating mechanism is intertwined with the function of the ADM 724 with gating, this disclosure describes three implementations of ML-based ADMs. A first implementation of the ML-based ADM includes the first end detector 1210, which operates on the TVD as features extracted from radar data 740, and is described with FIGS. 13A-14. A second implementation of the ML-based ADM includes the second end detector 1220, which operates on low-dimensional Doppler features extracted from TVD, and is described with FIGS. 15A-15C. A third implementation of the ML-based ADM includes the third end detector 1230, which operates on burst information extracted from the TVD, and is described with FIGS. 16A-19. Subsequently, with FIGS. 20-25B, this disclosure provides a description of the different gating mechanisms that support proper functioning of the ADM, and in turn the whole gesture detection system 700."

The ML-based ADM 722 (without gating) can include any of the end detectors 1210, 1220, or 1230. The ML-based ADM 724 with gating can include the first end detector 1210 or second end detector 1220, both of which do not need to determine a start of the gesture. The first end detector 1210, can be a binary classifier that can be trained to determine the end of a gesture based on processing the TVD as features extracted from radar data 740, and as described further below, does not need to determine a start of the gesture for similar reasons as the second end detector 1220 does not.

The second end detector 1220 can be a computationally-simple trained binary classifier that operates on low-dimensional Doppler features extracted from TVD. Examples of the low-dimensional Doppler features extracted from TVD include an average 1222, PWDDN 1224, and power weighted Doppler normalized by maximum (PWDNM) feature 1226. In practice, the duration of performance of the set of gestures in the gesture vocabulary 800 is limited, and as such, it is sufficient for the second end detector 1220 to determine the end of a gesture without determining the start. As an example, to classify six different gestures, the longest gesture duration (for example, ~2 seconds) can be determined in the set of 6 gestures. Then whenever the ADM module, using the second end detector 1220, determines the end of a gesture, there is an assumption that the radar data containing gesture-related activity is in the previous 2 seconds from the determined end. As such, the ML model within the second end detector 1220 of the ADM 720 can be trained to determine the end of a gesture, without determining a start of the gesture.

Figure 12B:
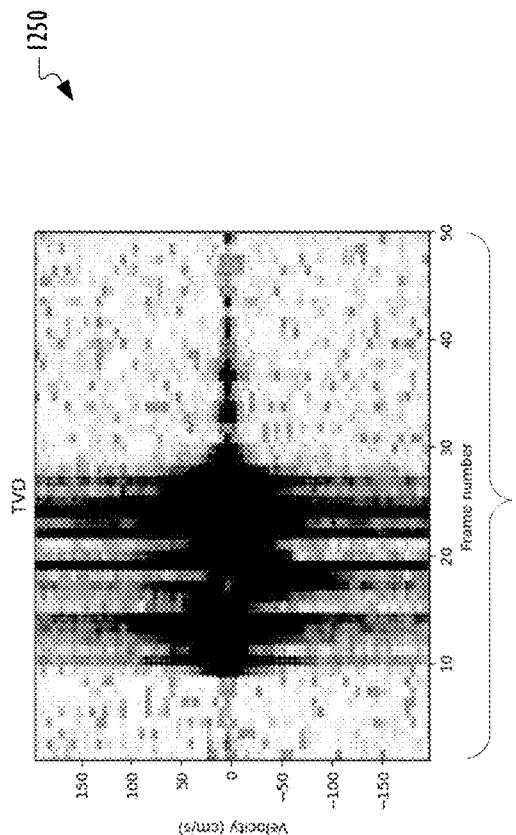
FIG. 12B illustrates an example TVD showing activity of a dynamic gesture in accordance with an embodiment of this disclosure.

FIG. 12B illustrates an example TVD 1250 showing activity of a dynamic gesture in accordance with an embodiment of this disclosure. For the description about the features used for the ADM, this disclosure now sets forth some preliminary information about the radar data. Particularly, the radar data is separated into frames 1252. The duration of each frame is a function of radar parameters (e.g., radar configuration). Any frame rate can be used, but to as a non-limiting example only, this disclosure analyses at frame rate of 25 frames per second (fps). Assuming the longest gesture duration is 2 seconds, then 50 frames are obtained during the gesture duration, as shown in the 2 seconds duration obtained in the example TVD 1250 of FIG. 12B. In the TVD 1250, the x-axis represents the frame number, the y-axis represents the velocity (in cm/s), and as such the TVD 1250 shows the variation of the velocity/Doppler as a function of time. The rightmost column 1254 (e.g., frame 50) in the TVD 1250 is based on the latest frame. The range of velocities along the y-axis, as well as the granularity of the velocities depends on the radar parameters. This example TVD 1250 is based on 64 Doppler bins. For dynamic finger or hand level gestures, the time velocity diagram is a good feature for understanding the time duration in which the radar data includes activity and the time-duration in which the radar data includes no activity. Periods of activity manifest as regions of higher power (i.e., displayed as warmer colors) in the TVD 1250, while periods of low activity or inactivity manifest as regions of lower power (i.e., displayed as cooler colors) in the TVD 1250. To make the determination of activity and the lack of activity in a frame (or TVD column) is made by extracting simpler features from the TVD 1250. This disclosure describes several possibilities of constructing or extracting such features, such as an accumulation method.

Figures 13A, 13B:
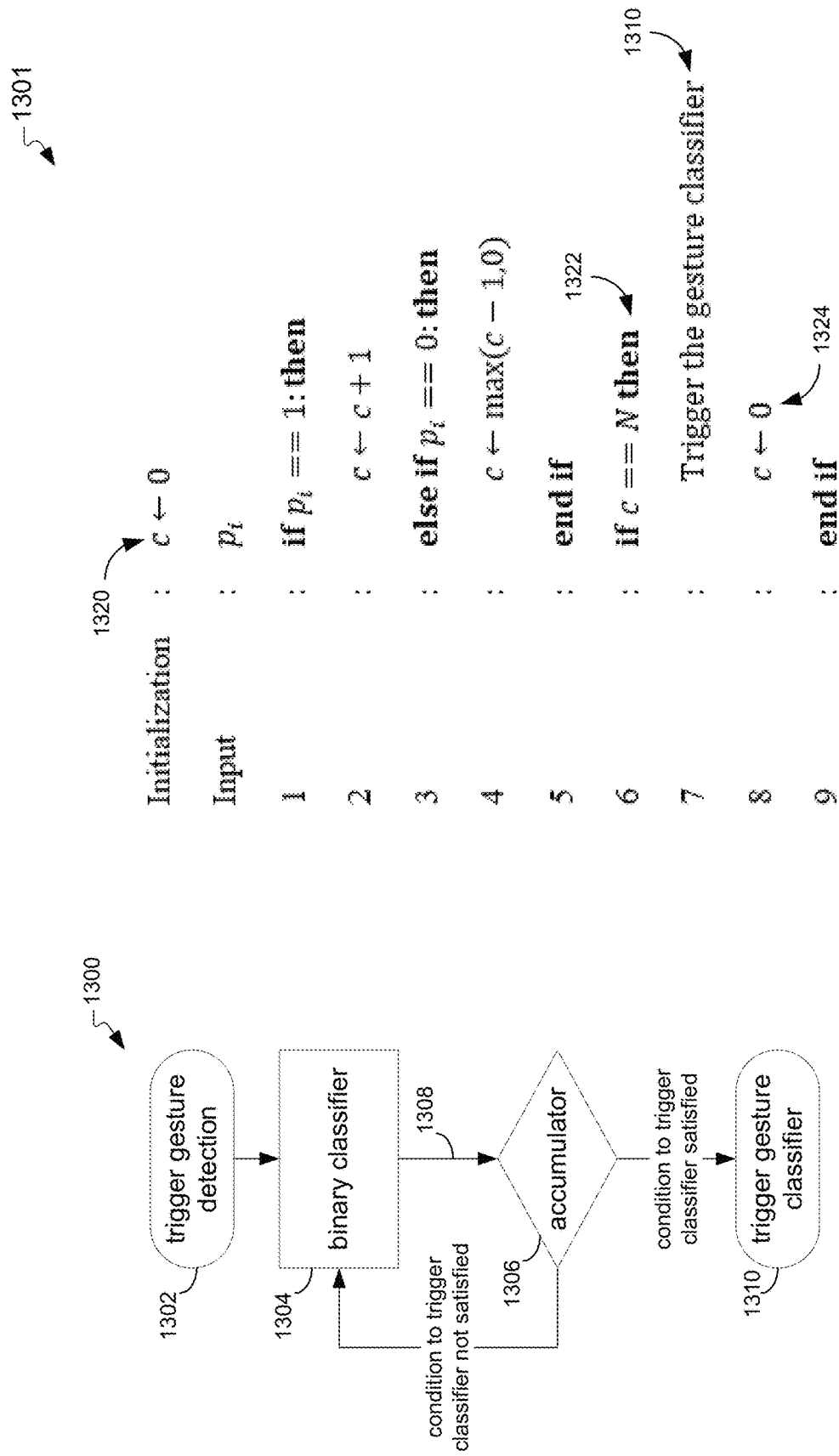
FIG. 13A illustrates the end-detection method executed by the ADM as an online operation in accordance with an embodiment of this disclosure.
FIG. 13B illustrates the accumulation method, which is a sub-process of the end-detection method of FIG. 13A, in accordance with an embodiment of this disclosure.

FIGS. 13A and 13B illustrate an accumulation method implemented as part of an online end-detection operation by the ADM in accordance with an embodiment of this disclosure. FIG. 13A illustrates the end-detection method 1300 executed by the ADM as an online operation in accordance with an embodiment of this disclosure. In other words, after being trained, operation of the ADM is referred to as online operation. FIG. 13B illustrates the accumulation method 1301, which is a sub-process of the end-detection method 1300 of FIG. 13A, in accordance with an embodiment of this disclosure. The embodiments of the accumulation method 1301 and the end-detection method 1300 by the ADM shown in FIGS. 13A and 13B are for illustration only, and other embodiments can be used without departing from the scope of this disclosure.

Referring to FIG. 13A, the first and second end detectors 1210 and 1220 enable the ADM 720 to perform the end-detection method 1300, in which method the GC 730 is triggered to operate in response to a determination that two conditions are concurrently satisfied, those two conditions being (i) that gesture activity has started and (ii) that the gesture activity has ended. To save computing resources, the ADM triggers operation of the GC 730 when performance of a gesture is completed.

From a design perspective, the ADM can be based on some rules devised to determine the activity. For example, the rules could be based on the level of Doppler and how it varies with time to determine the gesture end. The limitation of the rule-based method is that if the gesture vocabulary 800 or the radar parameters are to be revised (i.e., updated), it is likely that the rules may also need to be revised and/or refined, thereby making the rule-based method laborious in practice. Also from a design perspective, an alternative design is data-driven, in which an ML model is trained to determine the end of the gesture. The data-driven method will include data-collection and training of the ML model whenever the gesture vocabulary 800 or radar parameters change, but eliminates the need to re-engineer the rules in contrast to the laborious updating of the of the rule-based method.

The end-detection method 1300 begins at block 1302, at which the gesture detection mode is triggered by the gesture mode triggering mechanism 710. The end-detection method 1300 is based on a binary classifier 1304 followed by an accumulator 1306. One function of the accumulator 1306 is to keep track of the predictions 1308 of the binary classifier 1304. Another function of the accumulator 1306 is to determine whether the condition to trigger the GC 730 is satisfied, for example, the condition can be satisfied if the binary classifier 1302 outputs a threshold number of gesture-is-complete determinations/predictions within a specified duration or in specified number of frames. As long as the condition to trigger the GC 730 is not satisfied, the operation of the binary classifier 1304 and the accumulator 1306 continues or repeats. At block 1310, in response to a determination that the condition to trigger the GC 730 is satisfied, the ADM triggers the GC 730.

The binary classifier 1304 uses features derived from TVD to determine (for example predict) whether a given frame of radar data 740 includes gesture activity. The binary classifier 1304 predicts the end of a gesture, for example, predicting whether a frame is an end of a gesture. In certain embodiments, the binary classifier 1304 provides satisfactory performance using TVD alone, although more information such as range and angle may also be considered in other embodiments of the binary classifier. Accordingly, the following description is that of system 700 in which the binary classifier 1304 only uses features derived from TVD.

Referring to FIG. 13B. The purpose of the accumulator 1306 is to increase robustness of the prediction of the binary classifier 1304, and the accumulator 1306 declares a gesture end is detected by the ADM when the accumulator 1306 has enough confidence. These predictions output from the binary classifier 1304 are then collected through the accumulator 1306. The accumulator 1306 increases the confidence if the number of number of gesture-is-complete determinations output by the binary classifier 1304 increases or increases within the specified duration or in specified number of frames.

According to the accumulation method 1301 executed by the accumulator 1306, the GC 730 is triggered (at block 1310) when a predetermined accumulation condition is met. The rationale for accumulating predictions is twofold. Firstly, the binary classifier 304 is imperfect, and occasionally predicts that the gesture has ended, whereas, in reality, the gesture has not ended (i.e., user has not completed performance of the gesture). Secondly, some delay is required to make sure that the gesture has ended in reality. To this end, a good example is the case of "Single Pinch" gesture 806 and "Double Pinch" gesture 808. The "Double Pinch" inherently contains two "Single Pinch" gestures. If the user intends to perform a "Double Pinch" gesture 808, and if there is no delay after the first pinch (i.e., the GC 730 is triggered by the prediction 1308 without the intermediate accumulator 1306), then GC 730 will be triggered, and will determine that a "Single Pinch" gesture 806 was performed. In contrast, if the accumulator provides enough delay, then the user will start the second pinch of the "Double Pinch" gesture 808, and hence only after the user completes the whole "Double Pinch" gesture, the GC 730 will be triggered.

Just like other design choices, several accumulation conditions can be used. For one simple accumulation method 1301, the accumulator 1306 waits to accumulate N consecutive prediction 1308 outcomes that include the indicator of "class 1" before triggering the GC 730. Here N is a parameter that provides a trade-off between accuracy and delay. In this accumulation method 1301, the counter (c) 1320 to N and is completely reset whenever the prediction 1308 includes the indicator of "class 0". A limitation of this accumulation method 1301 method is due to the imperfection in the classifier predictions 1308. If due to imperfection, the binary classifier 1304 predicts "class 0" instead of "class 1", the counter 1320 will be reset.

If the counter 1320 has already reached a value close to N, resetting the counter to 0 based on a single "class 0" prediction, implies discarding all the information contained in the previous few frames. Such discarding can be another limitation of this accumulation method 1301. To overcome this discarding limitation, in another embodiment of the accumulator 1306, the accumulation method 1301 is modified to penalize the counter 1302 whenever the prediction 1308 is "class 0", but do not completely reset counter 1302 to a 0 value. According to the modified accumulation method, if there is an indicator of "class 1" in the prediction 308, the counter 1320 is incremented, and if the prediction 1308 includes an indicator of "class 0", the counter 1320 is decremented. Whenever the counter 1320 reaches the value N (at 1322), the GC 730 is triggered (at 1310), and the counter 1320 is reset to 0 (at 1324) to begin searching for and keeping track of a subsequent gesture that the user may perform. In the proposed modified accumulation method, a higher value of N will still give more delay, but also more confidence in the determination of the end of the gesture.

FIGS. 14A-14E illustrate examples of TVD for training a binary classifier (1304 of FIG. 13A or 725 of FIG. 7A) within the ADM in accordance with an embodiment of this disclosure. FIGS. 14A-14E illustrate TVD 1402, 1404, 1406, 1408, and 1410, respectively. The embodiment of the training set of TVD 1402, 1404, 1406, 1408, and 1410 shown in FIGS. 14A-14E is for illustration only, and other embodiments can be used without departing from the scope of this disclosure.

The binary classifier 1304 predicts whether a gesture has ended or not. As the TVD is updated at the frame rate according to radar parameters, the binary classifier 1304 will operate at the same or lower rate than the frame rate.

For ease of explanation, the TVD 1402-1410 are described as being used to train a binary classifier 1304 that makes one prediction 1308 per frame. In every frame, the prediction 1308 by the binary classifier 1304 includes either an indicator of "class 0" that implies that the gesture has not ended, or an indicator of "class 1" that implies that the gesture has ended. For training, the TVDs 1402-1410 were generated as "class 0" and "class 1" samples.

Figure 14A:
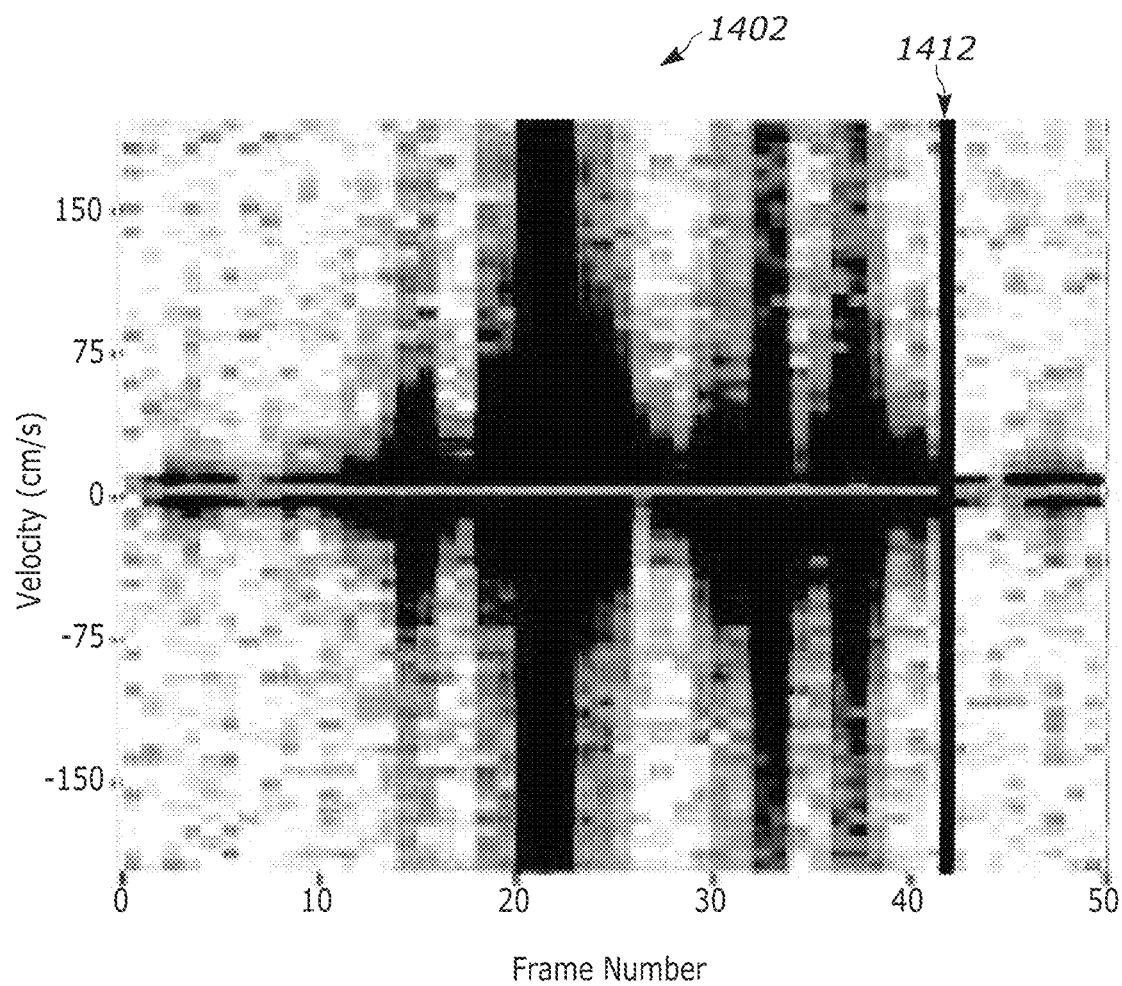
FIGS. 14A-14E illustrate examples of TVD for training a binary classifier within the ADM in accordance with an embodiment of this disclosure.

Refer to FIG. 14A. For this TVD 1402, the ground truth ending 1412 of the gesture is marked (illustrated as a red vertical line), for example, marked by a user of a training system or an engineer who is training the binary classifier.

The ground truth endings 1412, 1414, 1416, 1418, and 1420 are marked based on visual observations in FIGS. 14A-14E, respectively.

Figure 14B:
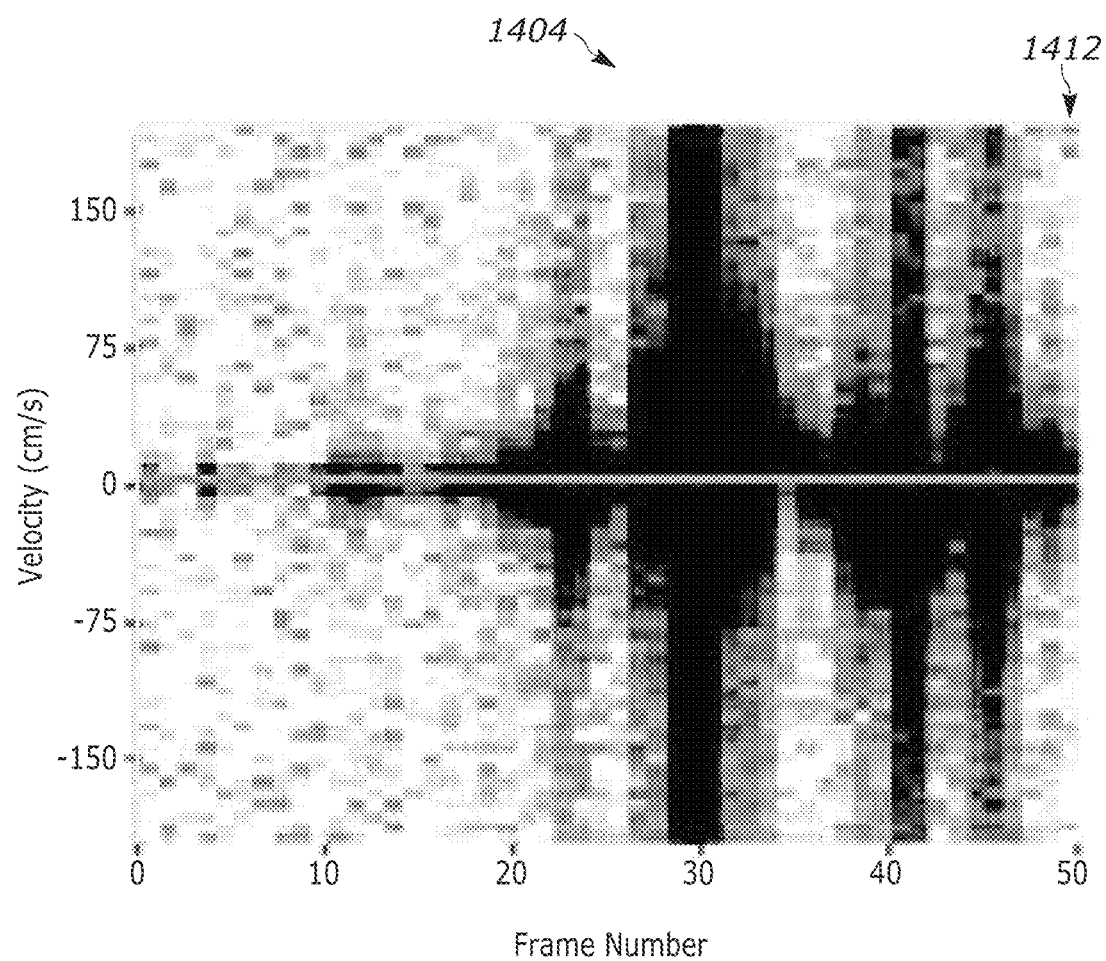

Refer to FIG. 14B, which illustrates the TVD 1404, which is the TVD 1402 of FIG. 14A that is shifted such that the ground truth ending 1412 frame is now at the last frame (for example, frame 50).

Figure 14C:
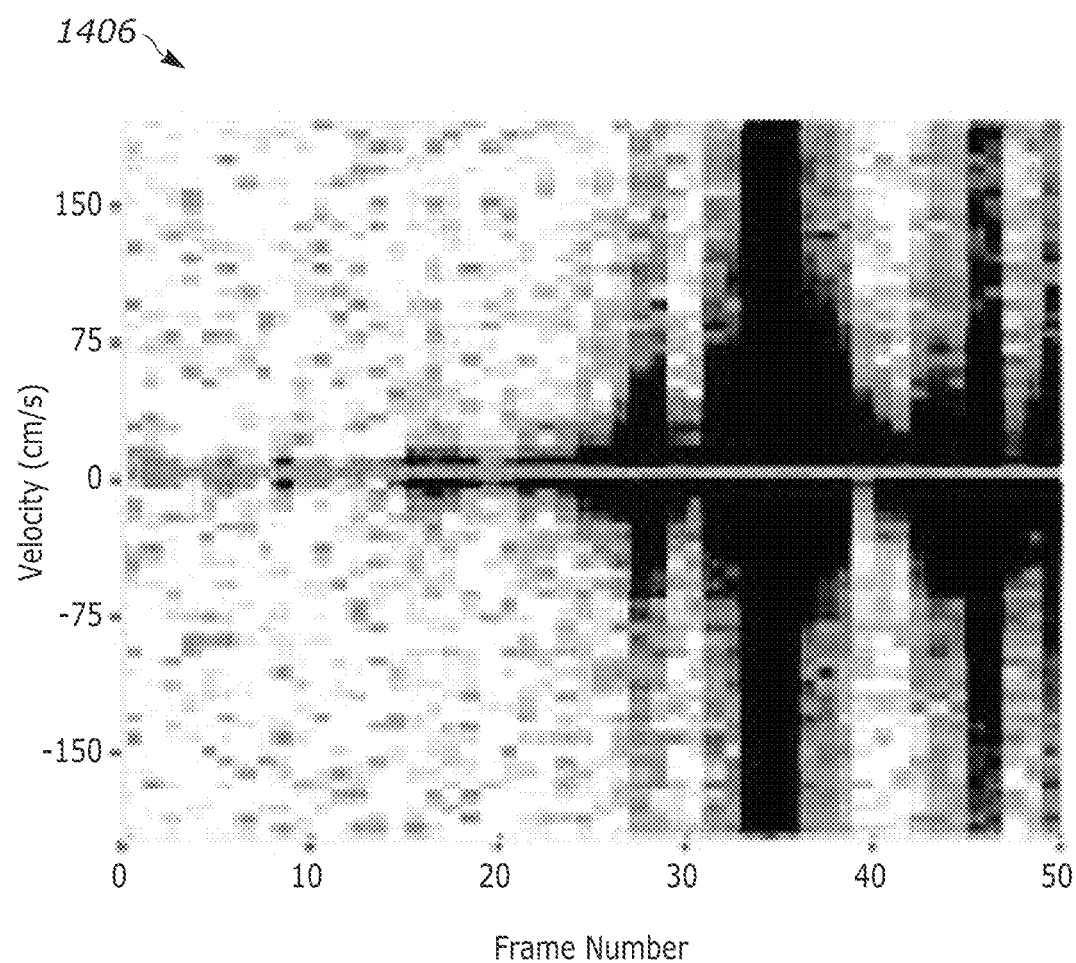

FIG. 14C illustrates a TVD 1406 that is a "class 0" sample that is generated by shifting the TVD 1404 of FIG. 14B to the right (toward the future) by a number of frames, such as a random number or frames. For example, the "class 0" sample TVD 1406 is obtained by a 5-frame shift. This way the ground truth end 1412 of the gesture is not within the TVD 1406. The "class 0" sample TVD 1406 corresponds to the case in which the gesture has not ended.

Figure 14D:
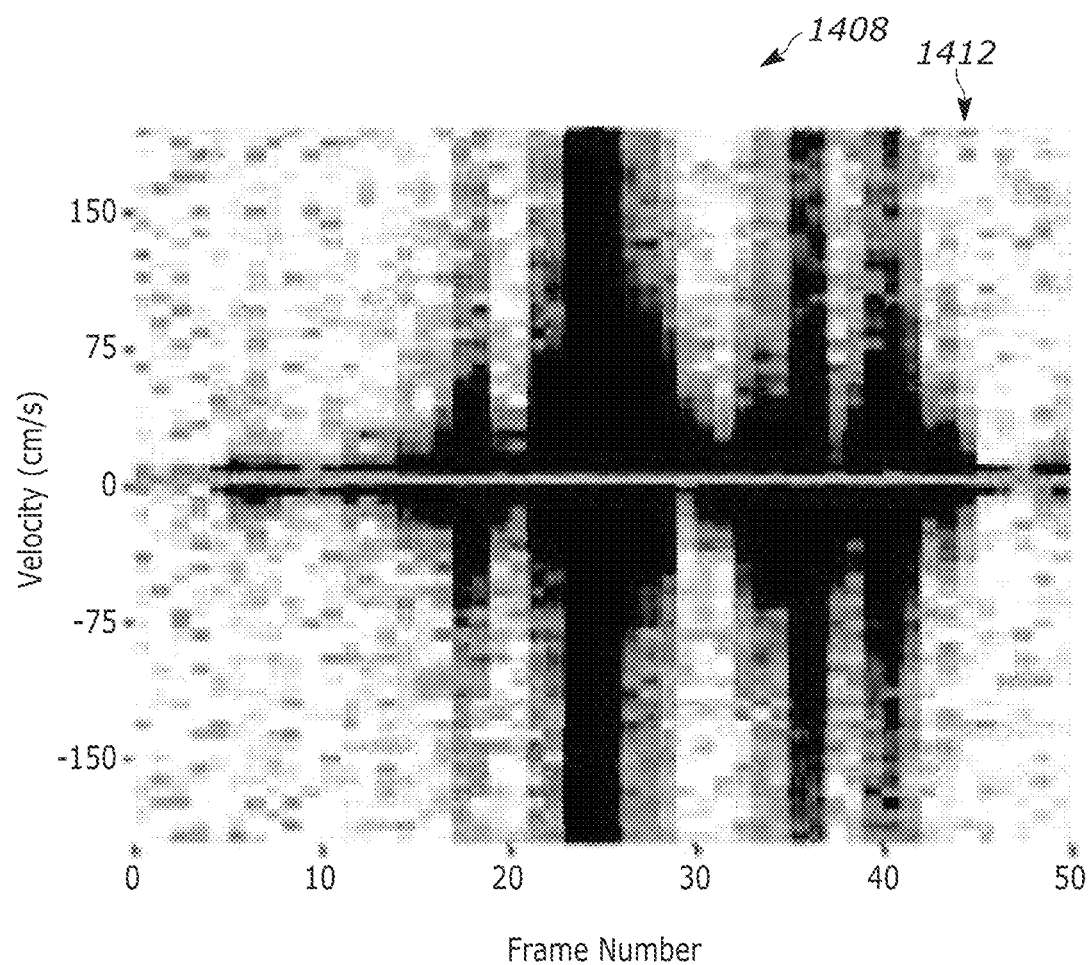

FIG. 14D illustrates a TVD 1408 that is a "class 1" sample that is generated by shifting the TVD 1404 of FIG. 14B to the left (toward the past) by a number of frames, such as a random number or frames. For example, the "class 1" sample TVD 1408 is obtained by a shift of 5 frames leftward. This way the ground truth end 1412 of the gesture is within the TVD 1408 at frame 45, and hence the TVD 1408 corresponds to a case in which the gesture has ended. Note that because the TVD 1406 and 1408 that are "class 0" and "class 1" samples are generated by applying frame offsets or random frame shifts to the same TVD (TVD 1402 of FIG. 14A), multiple "class 0" and "class 1" samples can be generated from a single TVD for training purposes.

Figure 14E:
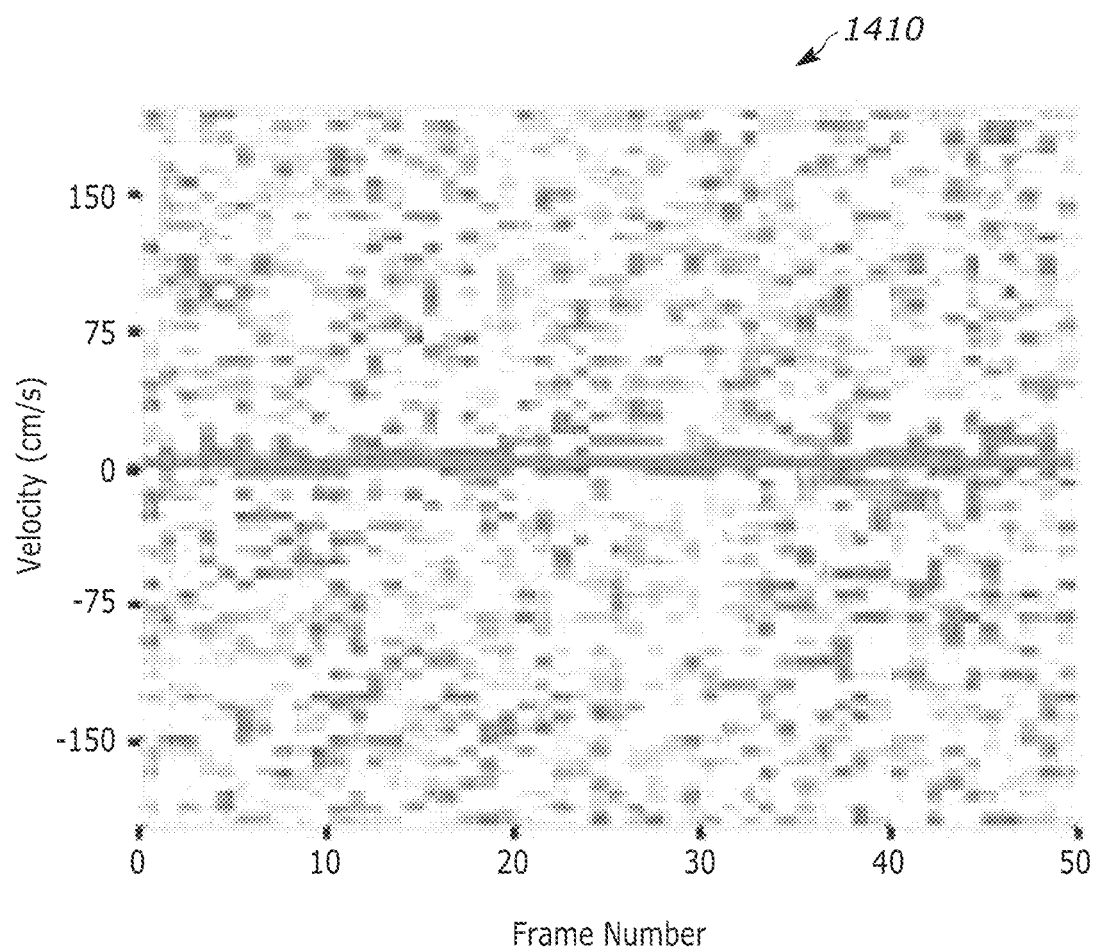

Refer to FIG. 14E, which illustrates and example TVD 1410 of a no-activity "class 0" sample. The example TVD 1410 is generated in a scenario in which the radar senses a static finger. By way of contrast to the TVD 1406 "class 0" samples generated that represent the case in which the gesture has started but not ended, the ADM 720, however, is continuously operational and needs to make predictions even for the cases when no gesture is being performed. To train the ADM 720 to recognize such cases of no activity, the no-activity TVD 1410 is generated to have representation in the training set 1402-1410 of the case when the gesture has not even started, i.e., no-activity. To generate TVD 1410, data is collected at the ending position of each gesture in the gesture vocabulary 800.

Figure 15A:
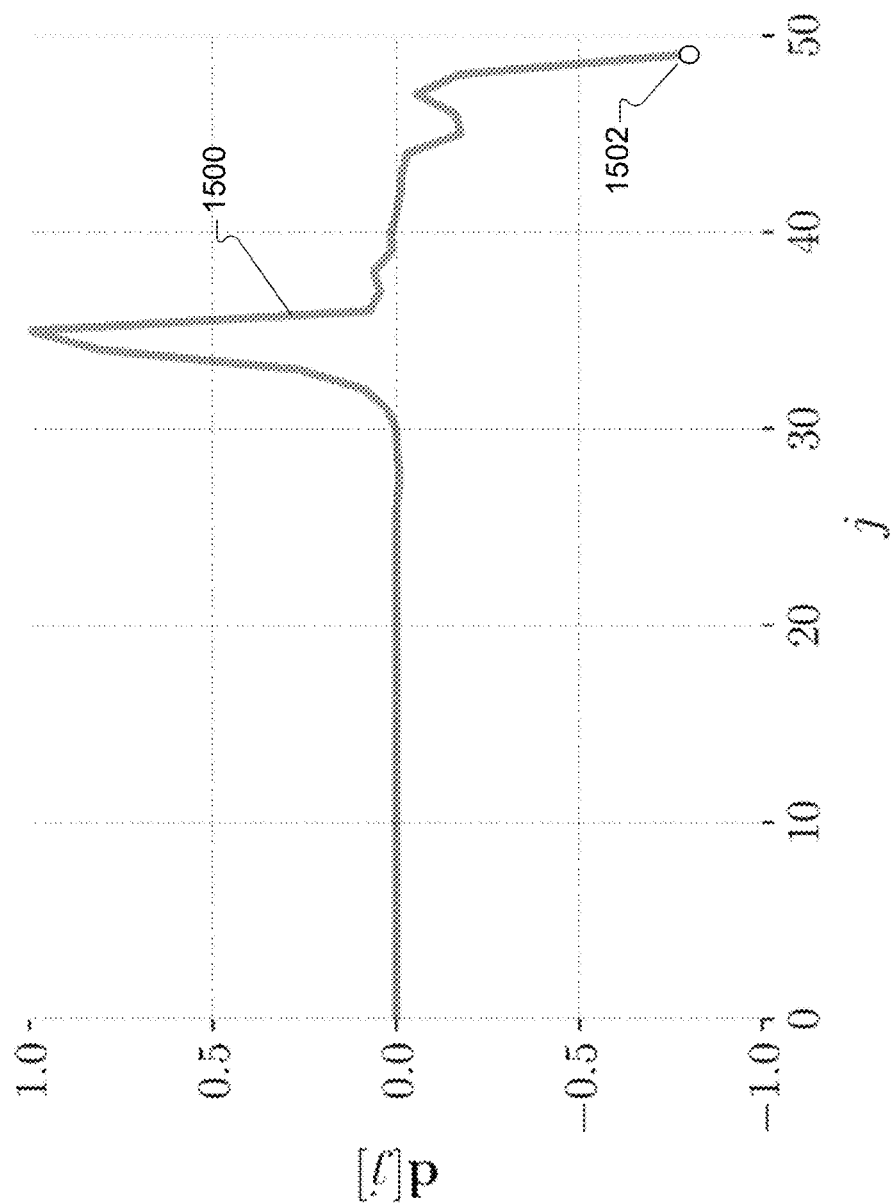
FIGS. 15A, 15B, and 15C illustrate examples of power weighted Doppler normalized by maximum (PWDNM) type of low-dimensional Doppler features extracted from the sample TVD of FIGS. 14C, 14D, and 14E, respectively.
Figure 15B:
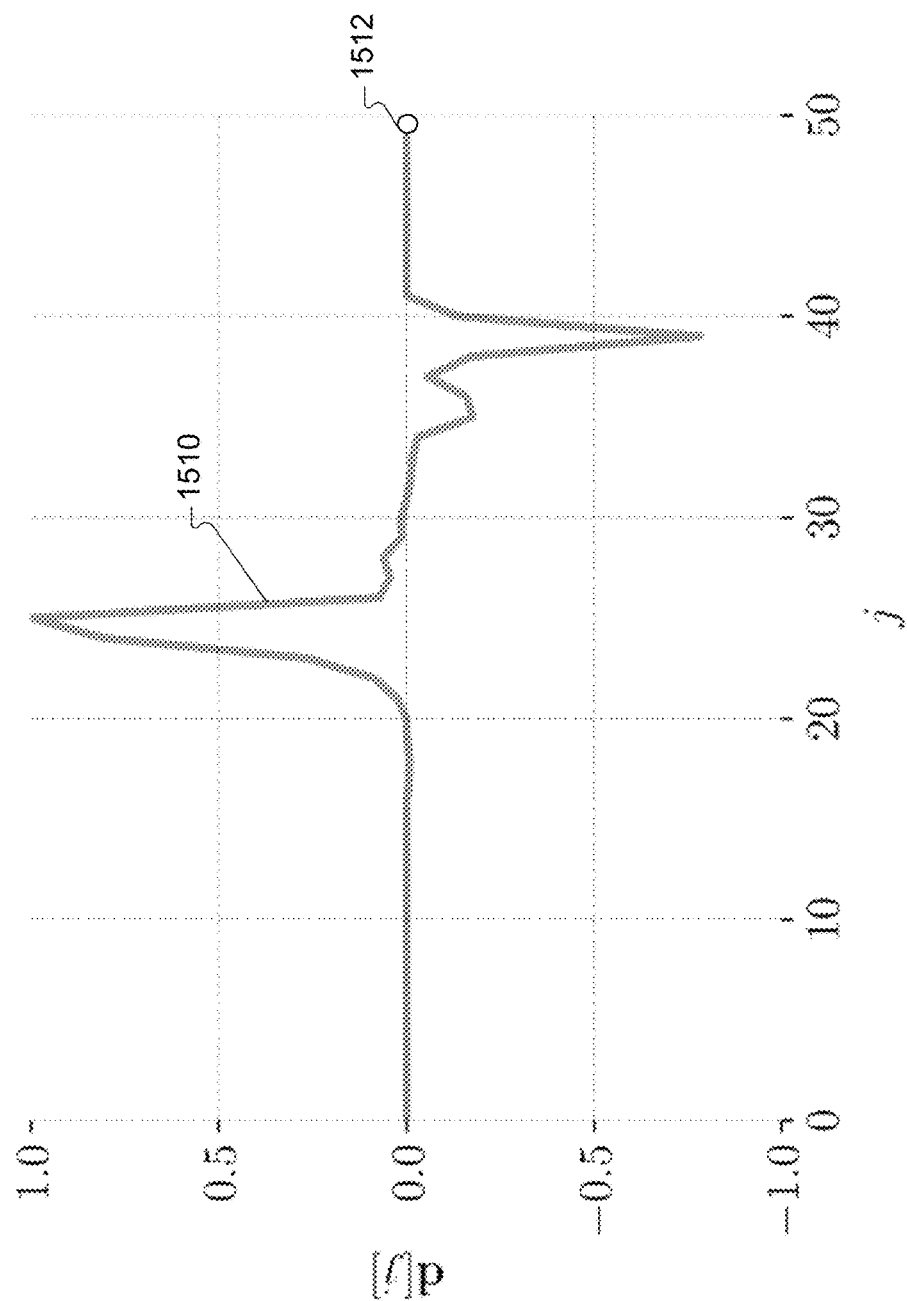
Figure 15C:
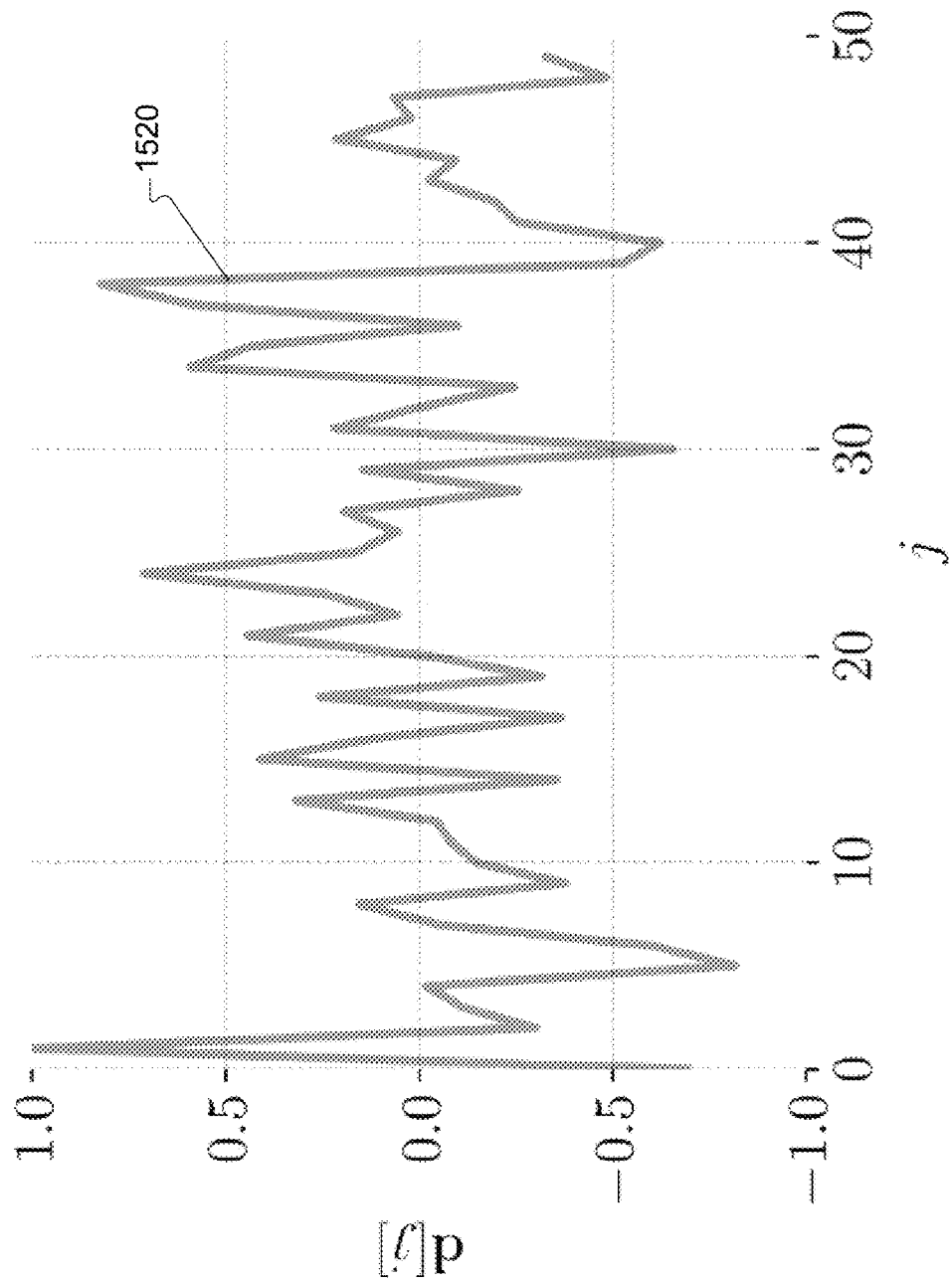

FIGS. 15A-15C illustrate examples of a collapsed doppler dimension of the TVD for training a binary classifier within the ADM in accordance with an embodiment of this disclosure. The "class 0" and "class 1" TVD samples (TVD 1406 and TVD 1408 of FIG. 14) can be considered $N_c \times F$ grayscale images, where F=50 frames. A binary classifier can be trained based on these images directly, for example, based on a convolutional neural network (e.g., CNN-based architecture 732 of FIG. 7). The embodiments of this disclosure keeps the computational complexity of the ML model of the ADM low because the binary classifier 1304 can, in some embodiments, be required to make a prediction 1308 at the frame rate. In order to reduce the computational complexity of the binary classifier 1304, embodiments of this disclosure collapse the TVD (such as TVDs 1406, 1408, 1410) into simpler features, namely, low-dimensional Doppler features, so that a simpler model (e.g., within the second end-detector 1220) can be trained within the ADM. Specifically, embodiments of this disclosure collapse the Doppler dimension of the TVD according to various methods, such as collapsing by taking the average, taking PWDDN, or taking PWDNM. For example, the low-dimensional Doppler features can be computed by the second end-detector 1220 as mean (such as the average 1222 of FIG. 12A) in the Doppler dimension in the linear or the log scale of the class "0" sample TVD 1406 of FIG. 14C

For brevity and as shown in FIGS. 15A-15C, this disclosure describes details of the PWDNM feature, which gave promising results. The embodiments of the PWDNM features 1500, 1510, 1512 shown in FIGS. 15A-15C are for illustration only, and other embodiments can be used without departing from the scope of this disclosure. This PWDNM feature is denoted as $d \in \mathcal{R}^F$ and is calculated from the linear version of the TVD $T_l$. The linear version of the TVD can be expressed according to Equation 39, where T is the TVD in dB, the power and division operations are element wise. The PWDNM feature (d) can be expressed according to Equation 40.

$$T_\ell = 10^{\frac{T}{10}} \tag{39}$$

$$d = \frac{\bar{d}}{\max_j |\bar{d}[j]|}, \bar{d}[i] = \sum_{k=-\frac{N_c}{2}}^{k=\frac{N_c}{2}-1} k T_\ell [k, j] \tag{40}$$

The rationale of the name PWDNM, is clear from the definition. The Doppler k is weighted by the power $T_l[k,j]$ and the result $\bar{d}$ is normalized by the maximum absolute value to get the feature entries $d[j] \in [-1,1]$. This PWDNM feature is designed to have desirable properties. One desirable property is to put higher weight on high Doppler bins by scaling the power in k-th bin by k. The lower Doppler bins might contain some leftover clutter—after clutter removal—in addition to the signal. As such, the power in the high frequency bins is a stronger indicator of gestural activity, and can better distinguish the gesture part from the non-gesture part for activity detection. The normalization by the maximum absolute value helps to generalize the PWDNM feature across users because some users having a stronger/weaker signature than other users.

FIG. 15A illustrates the PWDNM feature 1500 of the "class 0" sample TVD 1406 of FIG. 14C. The PWDNM feature 1500 has a non-negligible value 1502 for j=50, implying a high activity.

FIG. 15B illustrates the PWDNM feature 1510 of the "class 1" sample TVD 1408 of FIG. 14D. The PWDNM feature 1510 has a small value 1512 (close to 0) for j=50. As a good indication that the gesture has ended, the PWDNM feature 1510 includes preceding values (i.e., for j=20 to j=43) that are high, followed by the small value 1512.

FIG. 15C illustrates the PWDNM feature 1520 of the no-activity sample TVD 1410 of FIG. 14E. The PWDNM feature 1520 has a non-negligible value form almost for all j∈ 1, 2, . . . , 50. Though there is no-activity, the normalization means that the largest value will be 1. As such, large values for all j are an indication that the gesture has not ended. The PWDNM feature 1520 corresponds to a "class 0" sample, which is the TVD 1410 of FIG. 14E.

Although FIGS. 15A-15C illustrate PWDNM features as one example type of the low-dimensional Doppler features that can be extracted from a TVD, the second end-detector 1220 can extract various types of features from a TVD. As a nonlimiting example of extracting Doppler features, the TVD can be in dB scale, and this TVD can be defined as T∈ 64×50, where the 64 is the dimension of the Doppler bins and 50 is the number of frames. This same TVD in linear domain can be defined as $T_l \in$ 64×50. The end of activity should result in a smaller Doppler signature. As such features need to be engineered that can measure the variation of Doppler as a function of time. With this in mind, the following low-dimensional Doppler features can be extracted from the TVD (in dB scale or in linear domain) and considered. These low-dimensional Doppler features may vary in performance, and final selection of which feature is to be used by the second end-detector 1220 (FIG. 12A) can be based on the performance, such as the classification accuracy of the binary classifier trained using the feature.

Mean in dB (mean) can be expressed according to Equation 41.

$$\mu \in 1 \times 50, \text{ with } \mu[j] = \tau_z k T[k,j] \tag{41}$$

Mean in linear scale (meanl) can be expressed according to Equation 42.

$$\mu_l \in 1 \times 50, \text{ with } \mu[j] = 10 \log_{10}(\tfrac{1}{64} \Sigma hd\ k T_l[k,j]) \tag{42}$$

Power weighted absolute Doppler with Doppler normalization (PWDDNabs) can be expressed according to Equation 43.

$$d_1 \in 1 \times 50, d_1[j] = \frac{\sum_{k=-32}^{31} |k| T_l[k,j]}{\sum_{k=-32}^{31} T_l[k,j]} \tag{43}$$

Power weighted Doppler with Doppler normalization (PWDDN) can be expressed according to Equation 44.

$$d_2 \in 1 \times 50, d_2[j] = \frac{\sum_{k=-32}^{31} k T_l[k,j]}{\sum_{k=-32}^{31} T_l[k,j]} \tag{44}$$

Power weighted absolute Doppler with max normalization (PWDNMabs) can be expressed according to Equation 45.

$$d_3 \in 1 \times 50, \overline{d_3[J]} = \sum_{k=-32}^{31} |k| T_l[k,j], d_3 = \frac{\bar{d_3}}{\max_j(\bar{d_3}[J])} \tag{45}$$

Power weighted Doppler with max normalization (PWDNM) can be expressed according to Equation 46.

$$d_4 \in 1 \times 50, \overline{d_4[J]} = \sum_{k=-32}^{31} k T_l[k,j], d_4 = \frac{\bar{d_4}}{\max_j(|\bar{d_4}[J]|)} \tag{46}$$

Figure 16A:
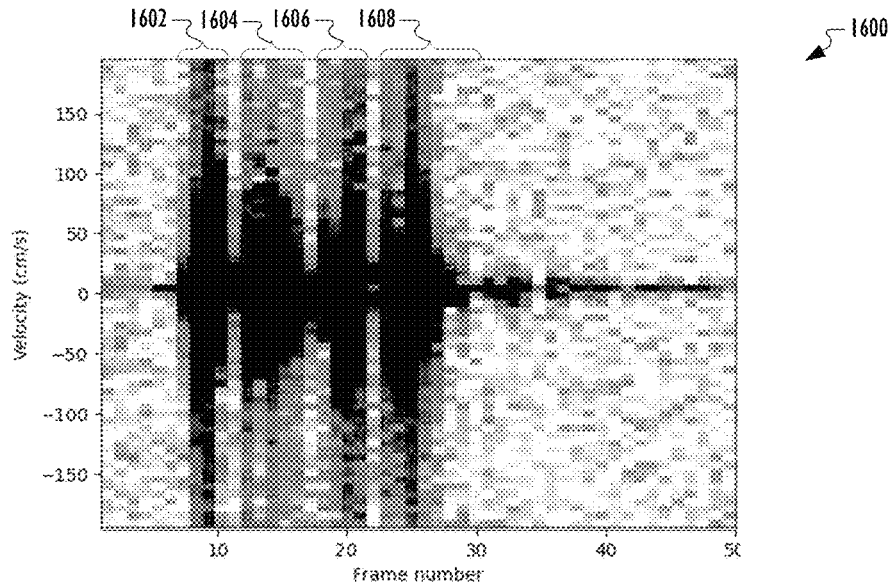
FIG. 16A illustrates an example TVD representing a gesture that includes four bursts in accordance with an embodiment of this disclosure.

FIG. 16A illustrates an example TVD 1600 representing a gesture that includes four bursts 1602-1608 in accordance with an embodiment of this disclosure. In some embodiments, the third end detector 1230 executes a method to determine the end of a gesture, which includes learning patterns that are specific to gestures and that are not present within non-gesture activity nor within invalid gesture activity. One such pattern is the bursty behavior of the gestures. Based on detecting the bursts 1602-1608 in the TVD 1600, third end detector 1230 executes a method (1800 of FIG. 18) to determine the bursts.

Figures 16B, 16C:
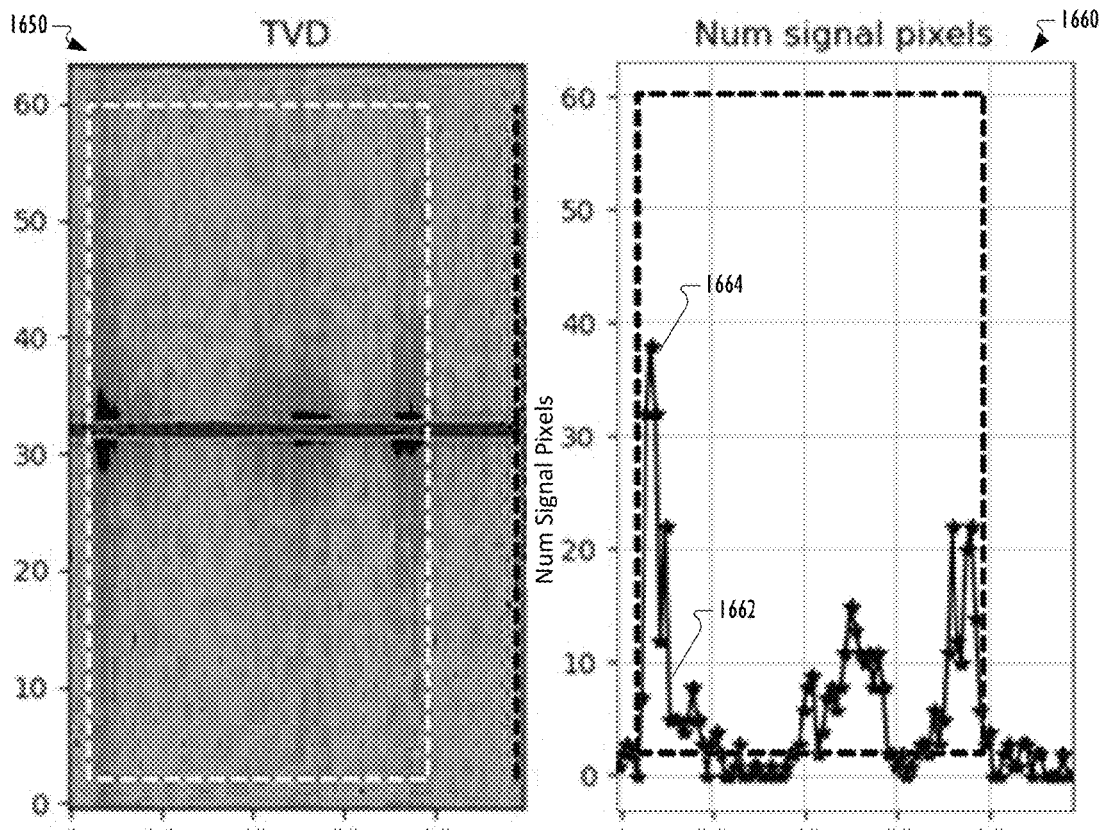
FIG. 16B illustrates another example TVD to aid in describing the process of FIG. 17.
FIG. 16C illustrates a graph of a number of signal elements as a function of frame index in the TVD of FIG. 16B.
Figure 17:
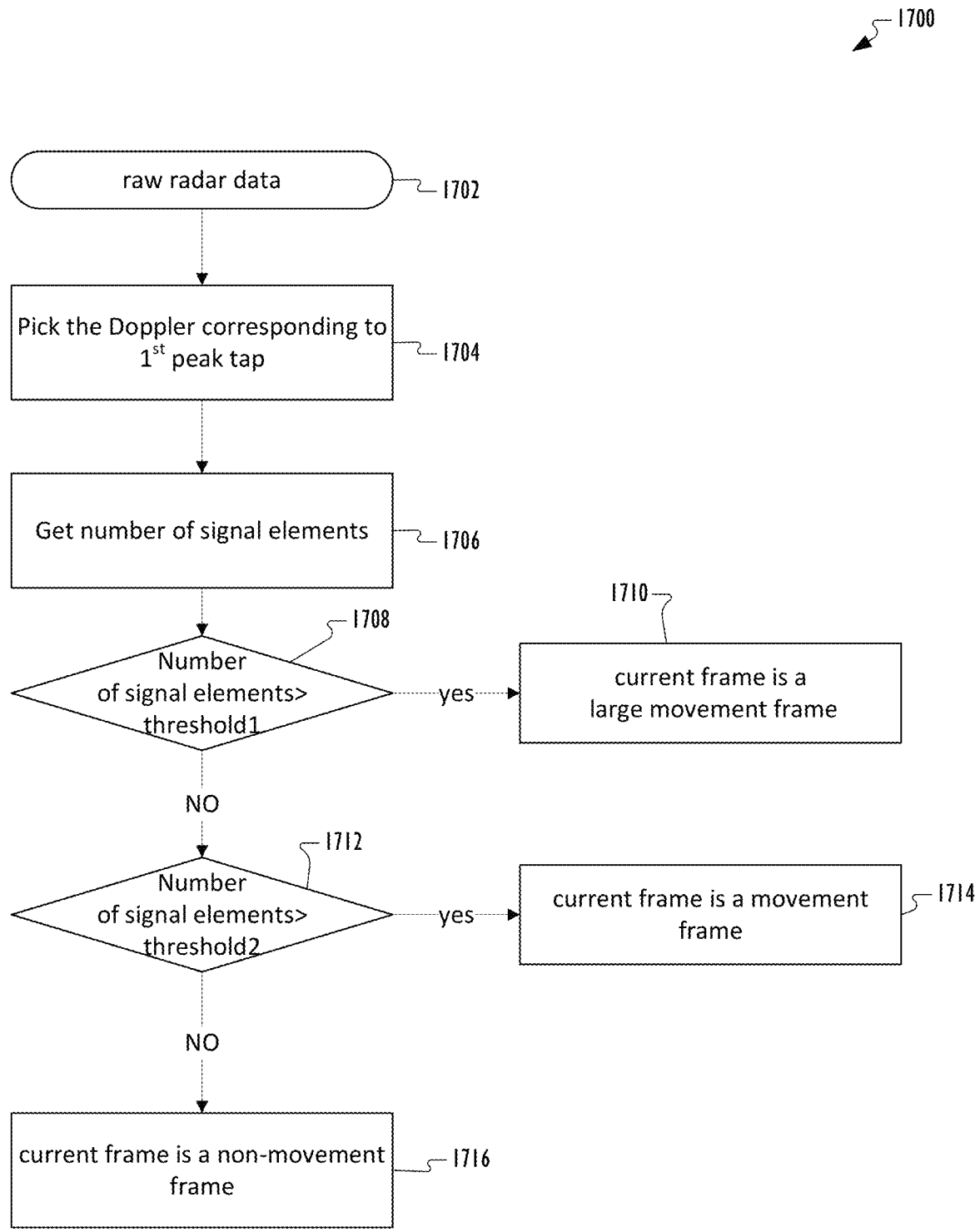
FIG. 17 illustrates a process for determining a level of movement within a current frame of radar transmission in accordance with an embodiment of this disclosure.

FIGS. 16B and 16C aid in describing the process of FIG. 17. FIG. 16B illustrates another example TVD 1650. FIG. 16C illustrates a graph 1660 of a number of signal elements (i.e., signal pixels) as a function of frame index (i.e., x-axis) in the TVD 1650 of FIG. 16B. A curve 1662 representing the number of signal elements includes a first peak 1664. The embodiments of the TVDs 1600 and 1650 and graph 1660 shown in FIG. 16A-16C are for illustration only, and other embodiments can be used without departing from the scope of this disclosure.

FIG. 17 illustrates a process 1700 for determining a level of movement within a current frame of radar transmission in accordance with an embodiment of this disclosure. The process 1700 is executed by the ADM, particularly, by the third end-detector 1230. The embodiment of the process 1700 shown in FIG. 17 is for illustration only, and other embodiments can be used without departing from the scope of the present disclosure.

At block 1702, ADM obtains raw radar data. The raw radar data is processed into a range-Doppler map, such as the RDM 1028 of FIG. 10. At block 1704, third end-detector 1230 identifies and selects the Doppler corresponding to a first peak tap (e.g., peak 1664 of FIG. 16C).

Subsequent processing at block 1706 is based on the Doppler elements in this $1^{st}$ peak tap. Specifically, the Doppler elements (e.g., all Doppler elements of the peak 1664) are compared to the noise level (i.e., detection threshold) to determine whether the Doppler elements are signal elements or noise elements. The detection threshold is based on noise threshold and potentially some offset calculated from measurements that captures the self-interference between the transmit and receive antennas of the radar. The Doppler elements with energy clearly greater than the noise-level (e.g., 5 dB) are identified as signal elements. The other Doppler elements (e.g., with power less than or equal to the noise-level) are noise elements. Subsequently, based on this comparison against the noise-level, the number of signal elements are counted. The counted number of signal elements from the example TVD 1650 is shown by the curve 1662 of FIG. 16B.

At block 1708, if the number of signal elements is greater than a first threshold (threshold1), then at block 1710, the current frame is determined (e.g., classified) as a large movement frame. An example value of threshold1 can be 65% of the total number of Doppler elements in the $1^{st}$ peak tap 1664. The method 1700 proceeds to block 1712 if this condition is not satisfied (NO path at block 1708).

At bock 1712, the number of signal elements are compared to a second threshold (threshold2). If the number of signal elements is greater than threshold2, then the current frame is a movement frame. On the other hand, if this condition is not satisfied (NO path at block 1712), then at block 1716, the current frame is classified as a non-movement frame. An example value of threshold2 could be 25% of the total number of Doppler elements in the $1^{st}$ peak tap 1664.

Figure 18:
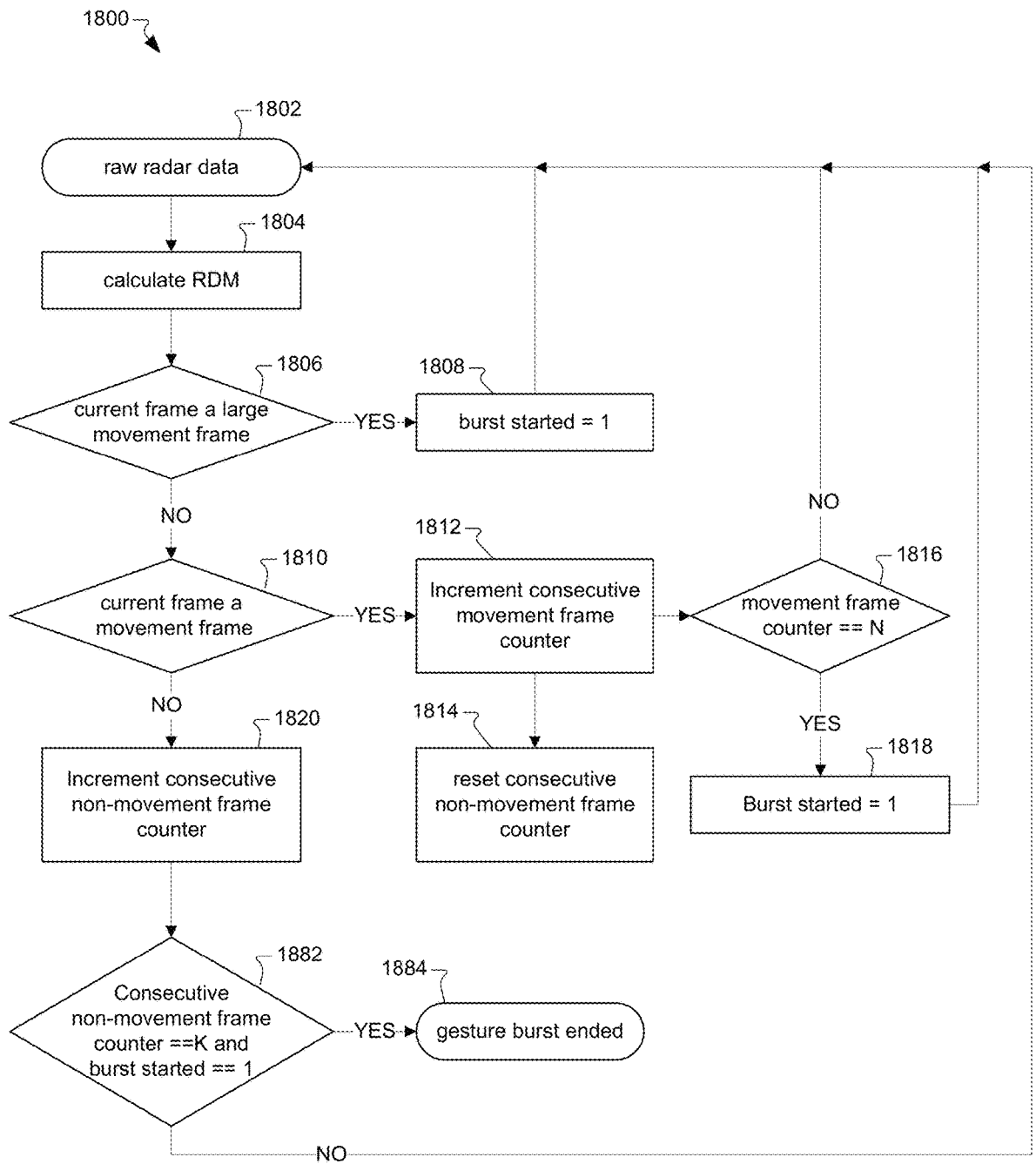
FIG. 18 illustrates a process for detecting a burst in accordance with an embodiment of this disclosure.

The current frame determination (1710, 1714, 1716) is then used in the process 1800 of determining the burst in FIG. 18. The determination of a burst is based on classifying the current frame into one of the three frame types, i) the movement frame, ii) the large movement frame, and iii) the non-movement frame. The movement and large-movement frame both contain movement, but the large-movement frame contains substantial movement. In comparison, the non-movement frames do not contain any movement. The procedure for determining the current frame type is given in FIG. 18. Frame types may also be defined based on some definitions of the averaged Doppler energy.

FIG. 18 illustrates a process 1800 for detecting a burst in accordance with an embodiment of this disclosure. The process 1800 is executed by the ADM, particularly, by the third end-detector 1230. The embodiment of the process 1800 shown in FIG. 18 is for illustration only, and other embodiments can be used without departing from the scope of the present disclosure.

Block 1802 is the same as or similar procedure as block 1702 of FIG. 17. At block 1804, the raw radar data is processed into a range-Doppler map, such as the RDM 1028 of FIG. 10. Block 1806 is the same as or similar procedure as block 1708 of FIG. 17. Particularly, as soon as the ADM determines that a large movement frame is detected at block 1806, then at block 1808, a burst start is declared as the current frame. For example, a burst started variable is set to a 1 value. From block 1808, the method returns to block 1802 to process a next frame. In response to determining that the current frame is not a large movement frame, the method 1800 proceeds to block 1810.

To satisfy the condition for declaring a burst start at the current frame, at least N (e.g., 3) movement frames (i.e., determined at block 1714) need to be detected. Particularly, at block 1810, the third end-detector 1230 determines whether the current frame is a movement frame. At block 1812, in response to a determination that the current frame is a movement frame, the third end-detector 1230 increments a consecutive movement frame counter. The method 1800 proceeds from block 1812 to blocks 1814 and 1816. At block 1814, the consecutive non-movement frame counter is reset. At block, 1816, the third end-detector 1230 determines whether the movement frame counter equals N, which is a threshold number for movement frames. In response to a determination that the movement frame counter does not equal N, the method returns to block 1802 to process a next frame. At block 1818, in response to a determination that the movement frame counter equals N, a burst start is declared as the current frame. Block 1818 is the same as or similar procedure as block 1808. From block 1818, the method returns to block 1802 to process a next frame.

After the burst start has been detected, then in order to satisfy the condition for declaring a burst end at the current frame, at least K (e.g., 2) non-movement frames need to be detected. Particularly, at block 1820, in response to a determination that the current frame is not a movement frame, the consecutive non-movement frame counter is incremented. At block 1822, the third end-detector 1230 determines whether a two-part condition is satisfied, wherein satisfaction occurs when that the consecutive non-movement frame counter equals K and the burst started variable is assigned the 1 value. If the two-part condition for declaring a burst end is satisfied, the method proceeds to block 1884 to declare the gesture burst ended. If the two-part condition is not satisfied at block 1882, the method returns to block 1802 to process a next frame.

Figure 19:
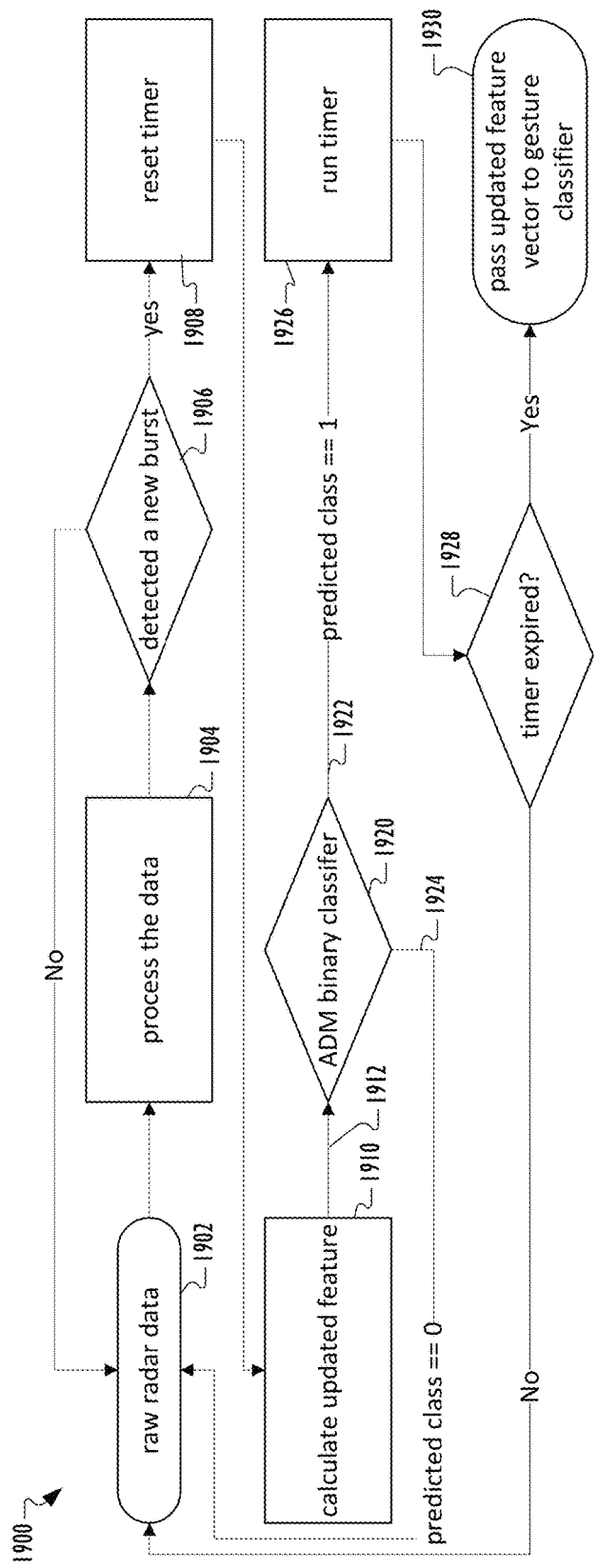
FIG. 19 illustrates a method of an ML-based ADM using binary classifier based on burst information in an online operation in accordance with an embodiment of this disclosure.

FIG. 19 illustrates a method 1900 of an ML-based ADM using binary classifier based on burst information in an online operation in accordance with an embodiment of this disclosure. The process 1900 is executed by the ADM, particularly, by the third end-detector 1230. The embodiment of the process 1900 shown in FIG. 19 is for illustration only, and other embodiments can be used without departing from the scope of the present disclosure.

For developing an ADM in which the third end-detector 1230 uses burst information, first based on the valid gestures in the gesture vocabulary 800, the largest number of bursts possible is determined. To be conservative, the maximum number of bursts in the feature used in training the ADM can be be slightly larger than the largest number of bursts possible is determined. The reason is that though the determination of the expected largest number of bursts from the gesture vocabulary 800 is ideal, however, during online operation in practical situations one burst could get detected as two separate bursts etc. From each burst, the third end-detector 1230 extracts some meaningful information about the burst, for example, the length of the burst in frames, maximum absolute Doppler within the burst, the variation of range taps within the burst, and the starting position of the burst relative to the ending position of the last burst. As such if the maximum number of bursts determined is B', the dimension of the feature will be B=4B'.

The binary classifier (for example, a binary classifier 1920 within the third end-gesture detector 1230) is then trained based on these features extracted from the TVDs. The online operation of the ADM using burst based training is shown in FIG. 19.

The method 1900 begins at block 1902, at which raw radar data is received.

The raw radar data is processed (at block 1904) to detect whether a new burst is detected or not (at block 1906). If a new burst is detected, the method proceeds to block 1908, at which a previously running timer is reset, the newly detected burst is used to update the features (i.e., updated features are calculated at block 1910), and the binary classifier 1920 makes a prediction 1922 or 1924 based on the updated feature 1912. If the If the binary classifier 1920 outputs a prediction 1924 that includes the indicator of "class 0", then the method 1900 returns to block 1902 and repeats.

If the binary classifier 1920 outputs a prediction 1922 that includes the indicator of "class 1", then the timer is run or continues to run (at block 1926). At block 1928, if the timer expires before the detection of any other burst, then the GC 730 is triggered at block 1930. At block 1930, the ADM sends process the updated feature vector 1912 to the GC 730, which upon receipt triggers the GC 730 to classify the updated feature vector 1912. However, at block 1928, if the timer has not expired when a another (i.e., subsequent) burst is detected, then the process 1900 returns to block 1902 and repeats.

The timer can be in frames, in which case the value of the timer can be set similar to N, i.e., 11. In some embodiments, the burst information based third end-gesture detector 1230 may call the binary classifier 1920 only when the end of a burst is detected. Thus, such embodiments provide an advantage help reduce some computational complexity in terms of the number of calls to the ADM binary classifier 1920.

FIGS. 20-25 illustrate embodiments of this disclosure in which the ADM 724 includes a gating mechanism (for example, as shown in FIG. 7A). For the sake of brevity, the ADM 724 and its gating mechanisms will be described in this section of the disclosure, and the description of the gesture mode triggering mechanism 710 and GC 730 apply equally to the end-to-end system 700 with the gating mechanism without a duplicative description.

The ADM 724 (with gating) can be compared to the ADM 722 (without gating). The above-described first, second, and third end-gesture detectors 1210, 1220, 1230 are ML-based ADM modules that are operational and generate predictions (namely, 1922 or 1924 of FIG. 19 or 1308 of FIG. 13A). However, simple gating mechanisms further reduce the operational complexity of the ADM 720 operation/inferences. This further reduction of complexity is relative to the complexity of the ADM 722 (without gating). Gating mechanisms are beneficial not only in the online operation in terms of reducing the computational complexity, but also because the ADM's 724 (with gating) is not dealing with the cases (i.e., frames) that are discarded by with the gating mechanisms, the training process of the ML models within the ADM 724 (with gating) is simpler, as the ADM's 724 models (associated with binary classifier 725B) needs to be trained to deal with fewer cases than the ADM's 722 (without gating) models that are associated with binary classifier 725A.

Figure 20:
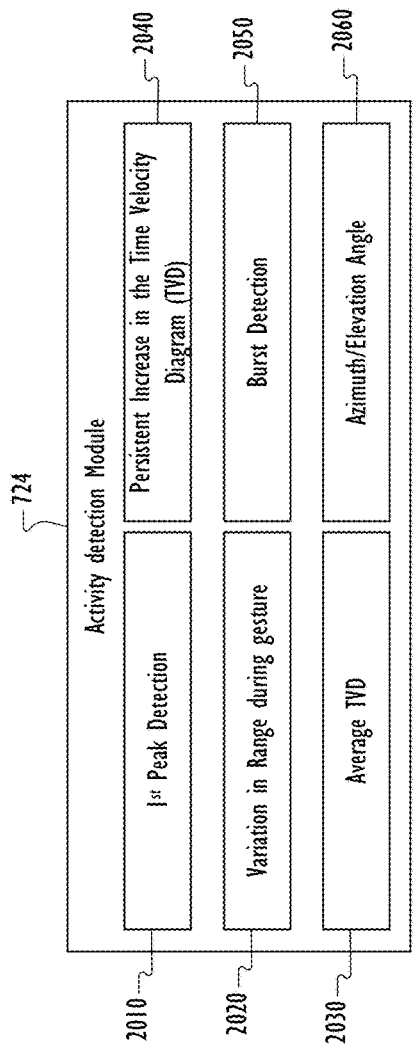
FIG. 20 illustrates a block diagram of the ADM including one or more gating mechanisms in accordance with an embodiment of this disclosure.

FIG. 20 illustrates a block diagram of the ADM 724 including one or more gating mechanisms 2010-2060 in accordance with an embodiment of this disclosure. The embodiment of the ADM 2000 shown in FIG. 20 is for illustration only, and other embodiments can be used without departing from the scope of this disclosure. Each embodiment of the different gating mechanisms 2010-2060 activate and deactivate the end detector 728 (FIG. 7) of the ADM, ensuring that the ADM 720 is activated when gesture activities are detected and deactivated when non-gesture activities or no activities are detected.

FIGS. 21-26 illustrate various examples of gating methods executed by the respective gating mechanisms 2010-2060 in accordance with this disclosure. The embodiments of the gating methods shown in FIGS. 21-26 are for illustration only, and other embodiments can be used without departing from the scope of this disclosure. Several embodiments execute a gating process that can be used to reduce the computational complexity and the training process of the ML-based ADM 720. Additionally, any combination of the gating mechanisms can be used because some of the gating mechanisms can be used to deactivate an ADM that is already in operation, and others can be used to active an ADM that is not yet in operation.

Figure 21:
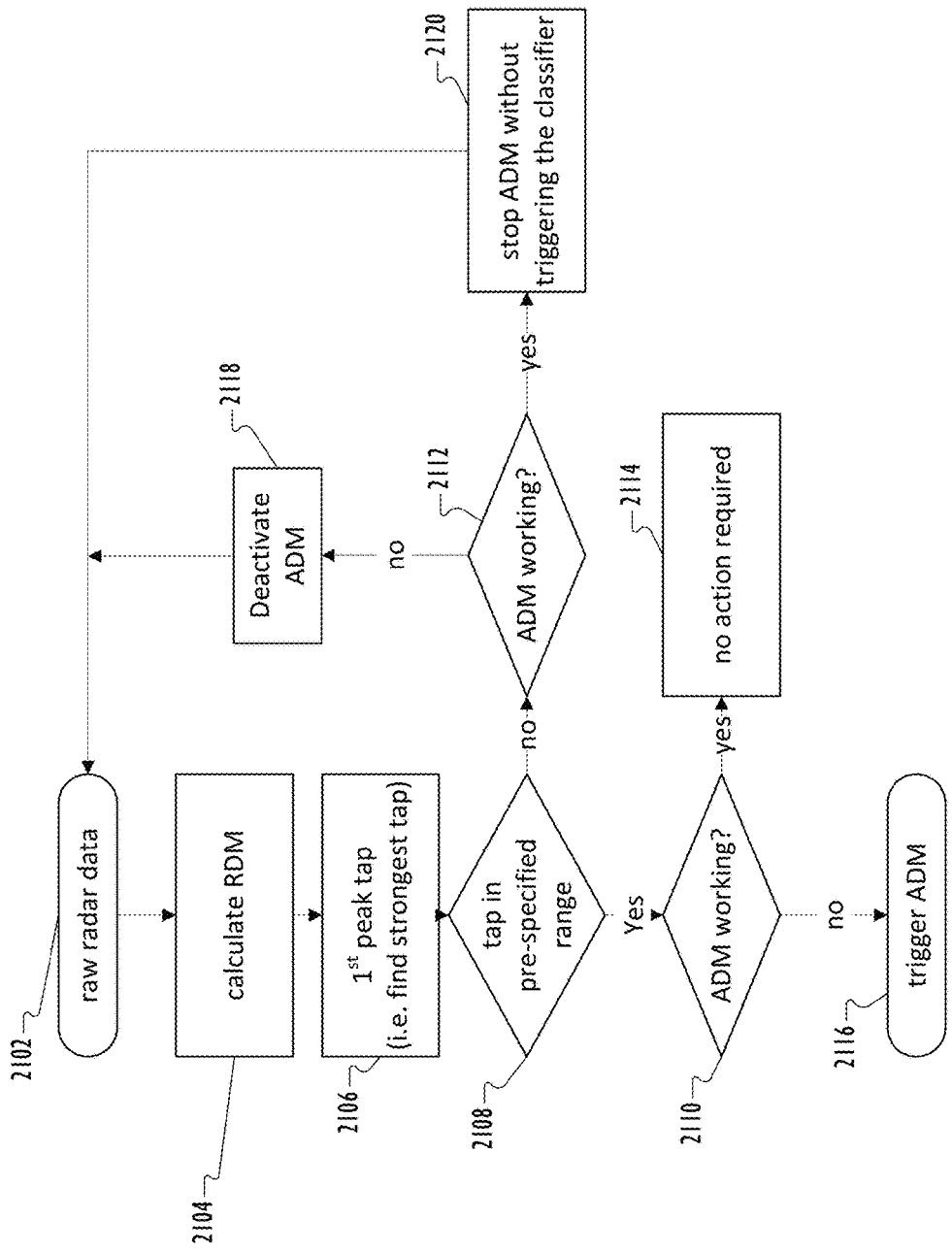
FIG. 21 illustrates a gating process of the strong-tap based gating mechanism in accordance with an embodiment of this disclosure.

FIG. 21 illustrates a gating process 2100 of the strong-tap based gating mechanism 2010 in accordance with an embodiment of this disclosure. The process 2100 is executed by the ADM 724, particularly, by the strong-tap based gating mechanism 2010. The strong-tap based gating mechanism 2010 is also referred to as a gating mechanism based on first peak tap detection or as a gating mechanism based on strongest detected tap. Different types of gestures are performed at different distance ranges from the electronic device 200 (e.g., smartphone). Particularly, micro-gestures that are gestures performed with finger level movements will typically be performed at a few centimeters from the device, e.g., 5-20 cm. The process 2100 exploits this information about the typical use case can be used to gate (for example, consider any activity outside this typical 5-20 cm range of distances as a non-gesture movement, and hence there is no need to trigger the ADM for movements outside this range. Accordingly, the process 2100 can be classified as a distance-based gating process.

The method 2100 begins with obtaining raw sensor data (at block 2102), and processing the raw radar data into a range-Doppler map (at block 2104). The procedures performed at blocks 2102 and 2104 can be the same or similar procedures as blocks 1802 and 1804 of FIG. 18, respectively.

At block 2106, the first peak tap is determined. In certain embodiments, the strongest tap is determined at block 2106. The procedure performed at block 2106 can be the same or similar procedure as block 1704 of FIG. 17. A reason for using the first peak tap instead of the strongest tap is that generally there is no target object between the radar and the hand of the user while performing gestures (particularly true for micro-gestures), and as such first peak tap is likely to be the tap of interest, whereas the strongest tap could be based on some reflection from the body of a close by user etc.

Each tap maps to a certain range, and the mapping can be obtained easily based on the radar parameters. At block 2108, the range mapped to the first peak tap is compared to a pre-specified range that needs to be monitored for the current application in use (e.g., application 262 of FIG. 2). In certain embodiments, the pre-specified range is an application range such as 5-20 cm, which can be specified by the current application 262. The subsequent action of the ADM depends on the whether the ADM is currently active or not. If the first peak tap is within the pre-specified range, the method 2100 proceeds to block 2110. If the first peak tap is not within the pre-specified range, the method 2100 proceeds to block 2112.

At each of blocks 2110 and 2112, the strong-tap based gating mechanism 2010 determines whether the ADM is active. Specifically, at block 2110, if the ADM is active, then the method proceeds to block 2114, at which is no action required. If the ADM is not active, the method proceeds from block 2110 to block 2116, at which the strong-tap based gating mechanism 2010 triggers the end detector 728.

Similarly, at block 2112, in response to a determination that the ADM is currently inactive and the tap is not in the pre-specified range, then such condition is a good indication that no valid gesture can be performed, and the method 2100 proceeds to 2118. At block 2118, strong-tap based gating mechanism 2010 deactivates the ADM, namely, the end detector 728, and the method 2100 returns to block 2102 to repeat. Alternatively, in response to a determination that the ADM is currently active and the tap is not in the pre-specified range, the method 2100 proceeds to block 2120, at which the strong-tap based gating mechanism 2010 stops the ADM that is already in operation and does not trigger the GC 730.

Figures 22, 23:
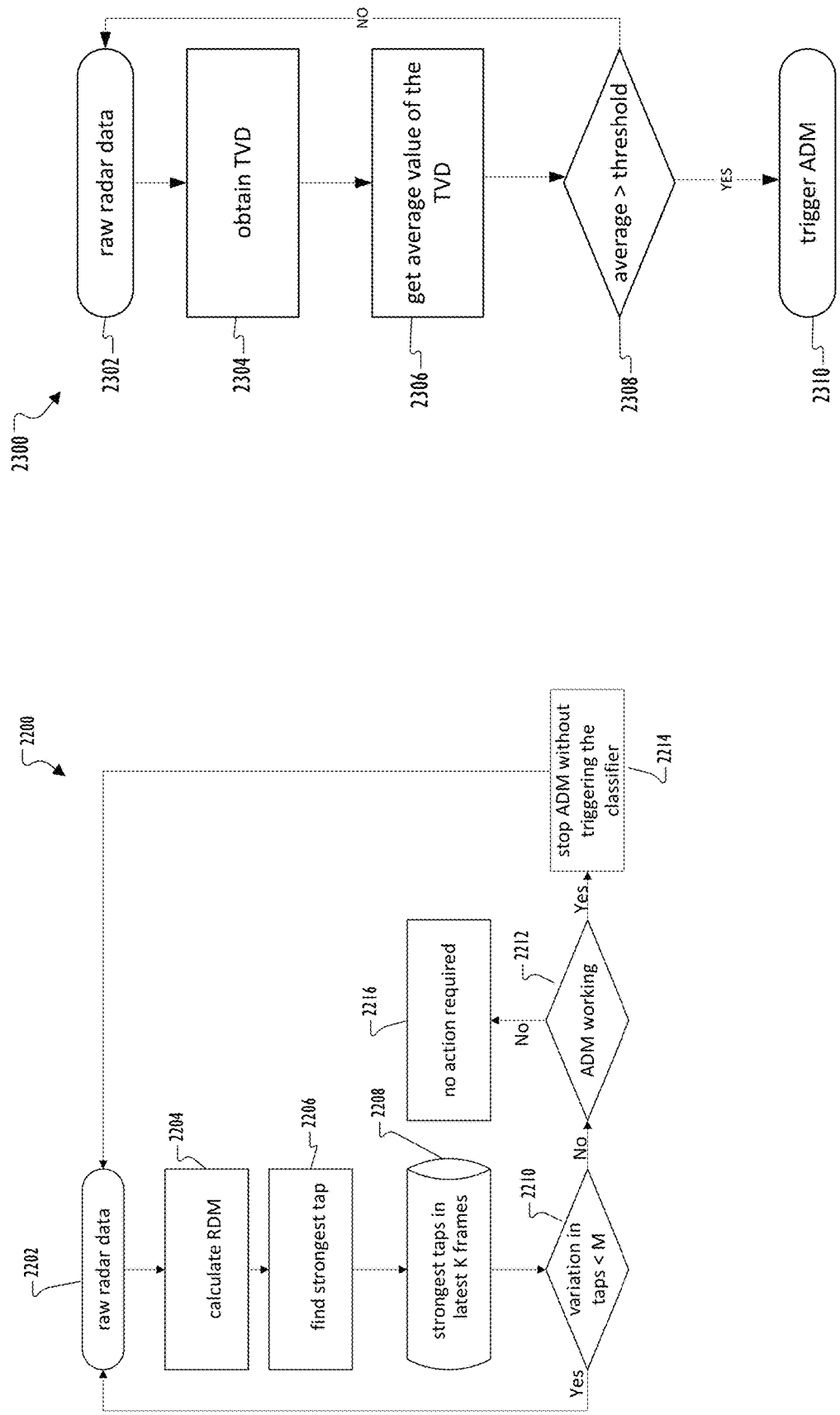
FIG. 22 illustrates a range variation based gating mechanism in accordance with an embodiment of this disclosure.
FIG. 23 illustrates a gating process of an average TVD based gating mechanism in accordance with an embodiment of this disclosure.

FIG. 22 illustrates a range variation based gating mechanism in accordance with an embodiment of this disclosure. The process 2200 is executed by the range-variation gating mechanism 2020 (FIG. 20). This is a gating process 2200 based on variation in range during the gesture, and consequently can be classified as a distance-based gating process.

When the gesture is being performed, some variation in the range is possible due to the dynamic nature of the gestures. However, this range variation is bounded, for example, in micro-gestures with finger level movement, the finger is expected to not move more than a few centimeters during the gesture duration. In other words, movement of the finger is expected to occur within a specified range variation throughout the gesture duration. This specified range variation could be a maximum of 8-10 cm, though for several gestures typical finger level movement is bound to be much lower than this maximum. If the radar detects motion is larger movement than 8-10 cm, then it is likely someone is walking by the electronic device, in which case no need for ADM triggering.

Within the method 2200, the procedures performed at blocks 2202, 2204, and 2206 can be the same or similar procedures as blocks 2102, 2104, and 2106 of FIG. 21, respectively. At block 2106, the strongest tap is determined.

At block 2208, the range-variation gating mechanism 2020 keeps track of the detected strongest tap in the last K frames in a database. Subsequently, the range-variation gating mechanism 2020 can display the variation in these taps via a display device (e.g., display 255 of FIG. 2).

At block 2210, several measures of variation can be used, but for simplicity, this disclosure describes range as the measure of variation. Specifically, the measure of range variation is the difference between the largest entry and smallest entry. If this variation (i.e., variation in taps) is greater than M, then the radar data 740 is determined to be an invalid gesture or non-gesture activity, and the method returns to block 2202. If the variation in taps is not less than M (No path), the method proceeds to block 2212, at which the range-variation gating mechanism 2020 determines whether the ADM is working. If the ADM is working, the method proceeds to block 2214, at which deactivation of the ADM without triggering the GC 730 is performed. Alternatively, if the ADM is not working, then the method proceeds to block 2216, at which is no action required.

There are two parameters in this gating method 2200, one parameter is K denoting the number of frames for which the strongest tap history is kept, and the second parameter is M denoting the threshold on the variation. The first parameter K could be set based on the expected length of a gesture, in order to keep track of the variation in range for the duration of the gesture (i.e., 50 frames). The second parameter M can be set based on the expectation that no micro-gesture may incur a variation in range more than 8-10 cm, and as such M is chosen based on translating this distance to the number of taps. Specifically, if the range resolution $\Delta R$ is 3 cm, then M could be set to 3.

FIG. 23 illustrates a gating process 2300 of an average TVD based gating mechanism 2030 in accordance with an embodiment of this disclosure. This gating process 2300 monitors for dynamic gestures, namely, gestures based on and characterized by movements. Therefore, it is possible that the hand of a user is within a specific range, hence satisfying the conditions for range-based gating, yet there is no need to trigger the ADM to operate the end detector 728 (FIG. 7) due to a lack of activity. This lack of activity of no activity condition can be determined based on the TVD.

The method 2300 begins with obtaining raw sensor data (at block 2302), and processing the raw radar data into a time velocity diagram (at block 2304). First the raw radar data is processed to obtain a TVD (for example, 1030 of FIG. 10).

At block 2306, the average value of the TVD is obtained, which is a scalar. The TVD can be denoted as $T \in R^{N \times M}$, then the average of the TVD is expressed according to Equation 47, where $T_{nm}$ represents the entry on the nth row and mth column in T.

$$\frac{1}{MN}\Sigma_{n=1}^{N}\Sigma_{m=1}^{M}T_{nm} \tag{47}$$

At block 2308, this average of the TVD is compared to a threshold. At block 2310, in response to the average TVD based gating mechanism 2030 determining that the value of average of the TVD is greater than the threshold, then the average TVD based gating mechanism 2030 triggers the ADM to operate the end detector 728. The parameter (for example, only parameter) controlling the performance of this average TVD based gating mechanism 2030 is the threshold. This threshold can be based on the noise level plus an offset that controls the false alarm rate. The larger the offset, the lesser the chance of the false alarm. The noise level can be obtained by obtaining a range profile (e.g., 1022) from the range-Doppler map (e.g., 1028). The range profile is obtained by averaging across the Doppler dimension. Subsequently, the median range tap can be processed to provide a noise level. The reason is that the information of the signal in gesture recognition application is limited to a few taps, and as such, the median is a good indication of the noise level. Since the average is obtained from 64×50 elements, the average is relatively stable, and with good noise level estimation, a small offset (e.g., 2-3 dB) can yield suitable performance.

Figure 24:
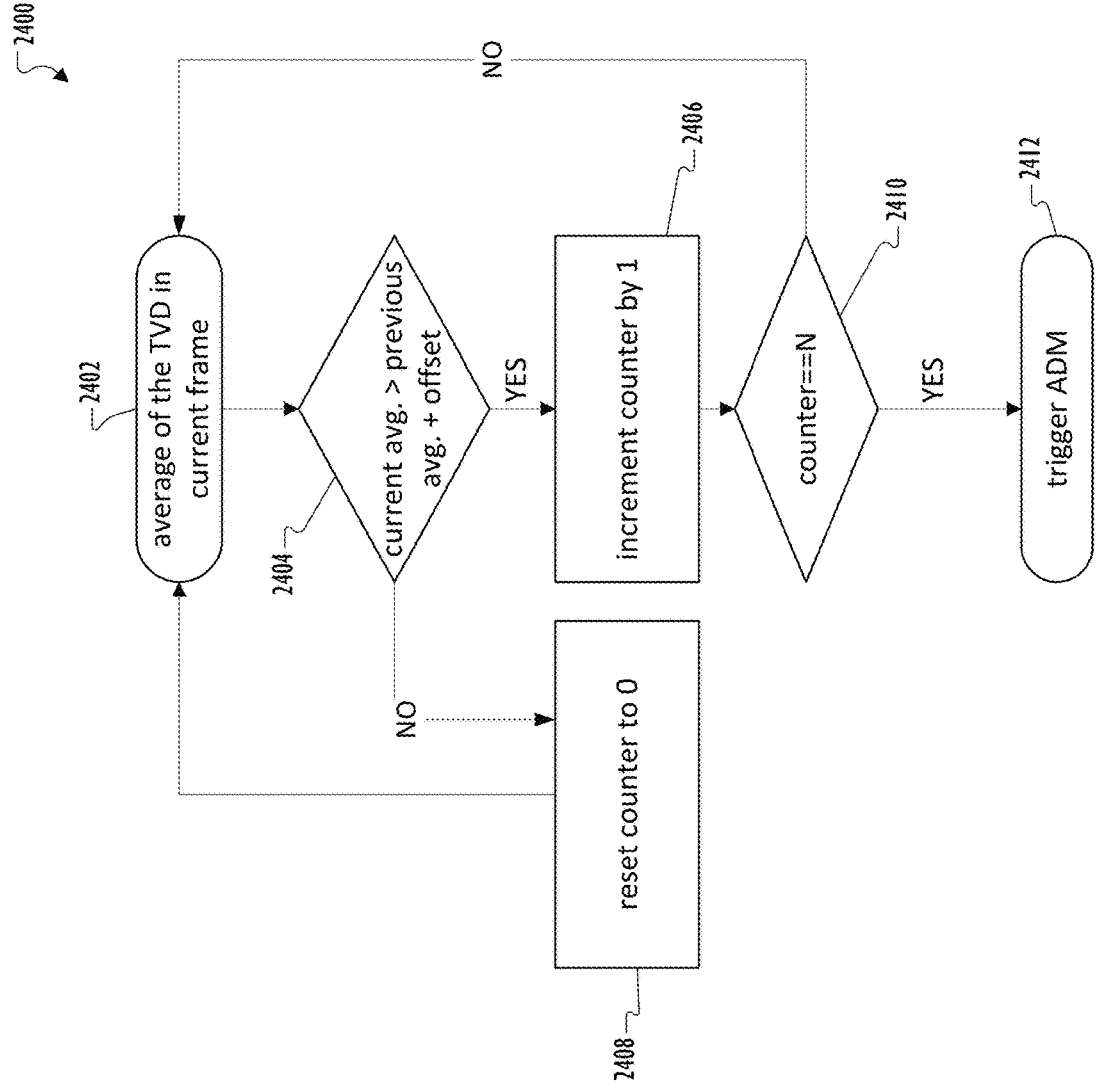
FIG. 24 illustrates a gating method of a persistent increase in the TVD based gating mechanism in accordance with an embodiment of this disclosure.

FIG. 24 illustrates a gating method 2400 of a persistent increase in the TVD based gating mechanism 2040 in accordance with an embodiment of this disclosure. An alternative gating method based on TVD is based on the idea of persistent change.

At block 2402, the persistent increase in the TVD based gating mechanism 2040 obtains (e.g., generates or receives) an average of the TVD in the current frame. Note that in every frame, the TVD gets updated. Specifically, the information from the recent most frame is added to the TVD (i.e., on the right most side in FIG. 12B), and the information from the oldest frame is removed (i.e., from the left most side in FIG. 12B). Specifically, if the TVD is based on 50 recent most frames, the information of the $51^{st}$ recent most frame is not made part of the current TVD. If the added frame is the one with activity, and the removed one is that of inactivity, the average value of the TVD is expected to increase with time. The added frame is one with activity because the user has started to perform a gesture. Similarly, the removed frame is one without activity because the user has not yet started (or only just started) to perform a gesture. This fact is exploited to develop the strategy of the gating method 2400.

At block 2404, the gating mechanism 2040 determines whether the current average of the TVD is greater than the previous average of the TVD plus an offset. At block 2406, a counter is incremented by 1, in response to a determination that the current average of the TVD is greater than the previous average of the TVD plus an offset. This counter keeps track of the number of frames in which the average increases. If there is a frame in which the current average is not greater than the previous average plus an offset, this counter is reset to 0 at block 2408.

At block 2410, the gating mechanism 2040 determines whether the counter has reached N (illustrated as counter=N), wherein N is a value denoting the number of consecutive frames monitored. At block 2412, the ADM is triggered in response to a determination that the counter has reached N. Alternatively, in response to a determination that the counter has not reached N, the method returns to block 2402 to repeat.

There are two hyperparameters that control the performance of this persistent increase in the TVD based gating mechanism 2040. The first hyperparameter is the offset. This offset can be determined based on some numerical observations. In a large dataset, if the average of the columns with activity is A dB, and the average of the columns without activity is I dB, then adding a column with activity and removing a column without activity changes the TVD average by (A–I)/50, where 50 is the number of frames. Thus, the offset can be set to (A–I)/50, where the numerical value is obtained based on a larger dataset. The second hyperparameter is N for the counter. For the value of N, note that the function of this counter is similar to the persistent movement strategy described above in burst information-based ML ADM (e.g., third end detector 1230 of FIG. 12A), and as such can be set in a similar manner, e.g., 3.

Figure 25:
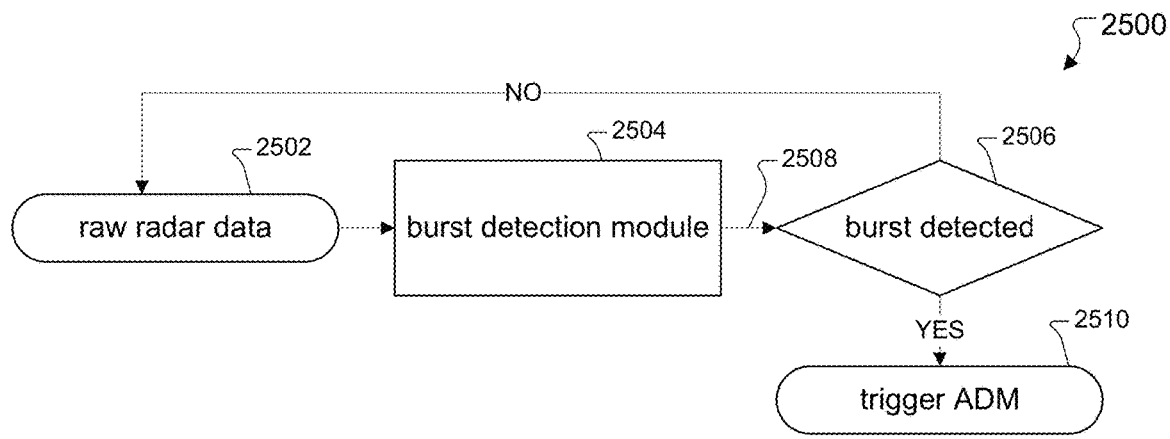
FIG. 25 illustrates a gating method performed by a burst detection based gating mechanism in accordance with an embodiment of this disclosure.

FIG. 25 illustrates a gating method 2500 performed by a burst detection based gating mechanism 2050 in accordance with an embodiment of this disclosure. The activity of dynamic gestures is bursty, as described above in the context of ML based ADM (e.g., end detectors 1210, 1220, and 1230 of FIG. 12A). This burst information can also be used for gating. Any activity that has a shorter duration than a valid burst is likely not to be a part of a valid gesture. In order to avoid triggering the ADM if a burst is not detected, the gating method 2500 determines whether radar data incudes a burst or not. The burst detection based gating mechanism 2050 includes a burst detection module 2504 that executes the burst detection method 1800 of FIG. 18. The output of the burst detection module 2504 is subsequently used to determine whether the ADM (e.g., end detector 728) needs to be triggered or not.

The method 2500 begins with obtaining raw radar data (at block 2502), processing the obtained radar data through burst detection method 1800 within the burst detection module 2504, and determining (at block 2506) whether a burst was detected based on the output 2508 of the burst detection module 2504. If a burst is not detected, the method 2500 returns to block 2502 to repeat. Alternatively, at block 2510, in response to a determination that a burst is detected, the burst detection based gating mechanism 2050 triggers the ADM to perform end detection (728).

Figure 26:
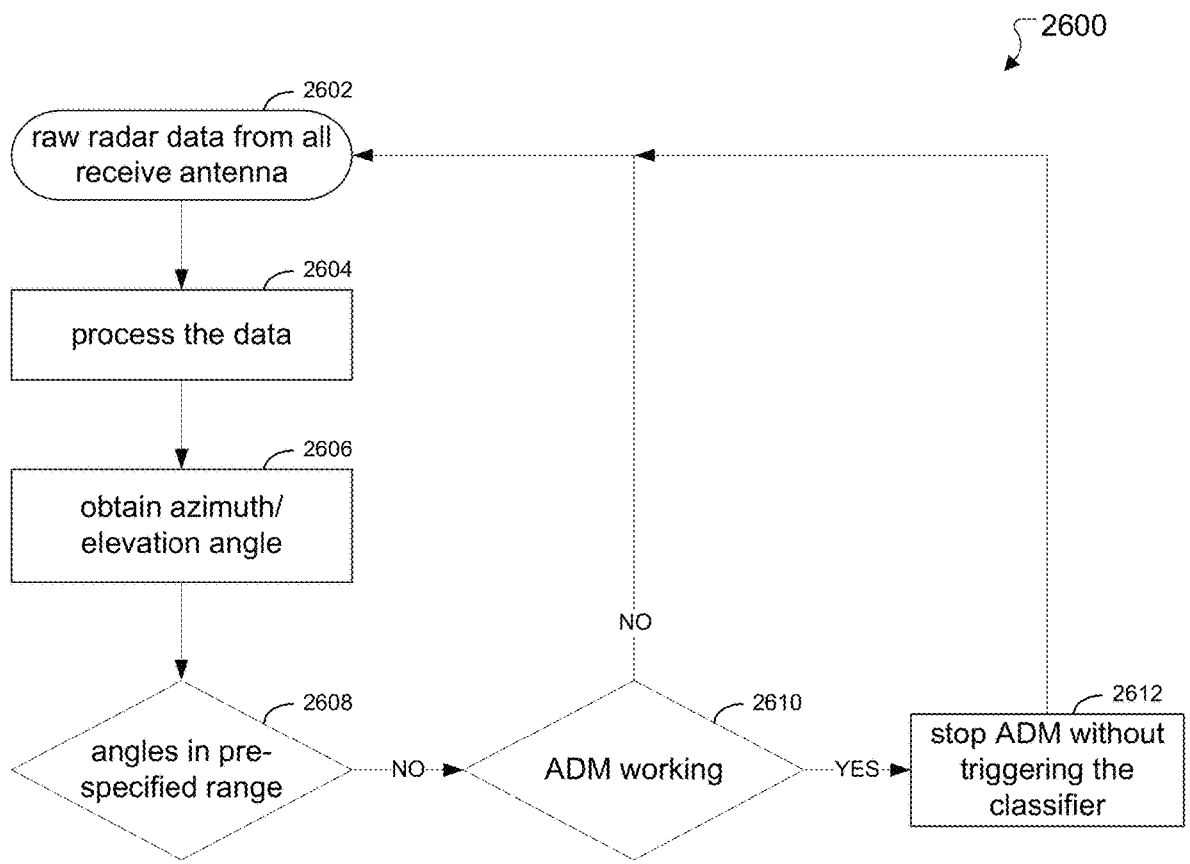
FIG. 26 illustrates a gating method performed by an angle based gating mechanism in accordance with an embodiment of this disclosure.

FIG. 26 illustrates a gating method 2600 performed by an angle based gating mechanism 2060 in accordance with an embodiment of this disclosure. The method 2600 begins with obtaining raw sensor data (at block 2602), and processing the raw radar data (at block 2304), for example, into a time angle diagram.

At block 2606, angle information is obtained from the TAD. In certain embodiments, azimuth angle information is obtained from the TAD. In certain embodiments, elevation angle information is obtained from the TAD. The azimuth angle information can indication the angular position of the target object in a vertical plane from the point of view of the radar antenna. The elevation angle information can indication the angular position of the target object in a horizontal plane from the point of view of the radar antenna. In sum, at blocks 2602-2606, the radar data from the all the receive antennas is gathered and processed to obtain the angle information in azimuth/elevation. Depending on the layout of the receive antennas, it might only be possible to obtain azimuth, or elevation information, in which case, only the available information is used in the gating process.

At block 2608, the angle based gating mechanism 2060 determines whether the obtained azimuth/elevation angle information is within a pre-specified range. The obtained angular information is compared to the pre-specified range. The procedure performed at block 2608 can be the same or similar procedure performed at block 2108 of FIG. 21. The pre-specified angle range is a function of the radar hardware, training process of the gesture classifier etc., but an example value can be [–30,30].

The procedure performed at block 2610 can be the same or similar procedure performed at block 2112 of FIG. 21. Particularly, in response to a determination that the ADM is currently active, the method 2600 proceeds to block 2612, at which the angle based gating mechanism 2060 stops the ADM that is already in operation and does not trigger the GC 730. Alternatively, in response to a determination that the ADM is currently inactive and the obtained azimuth/elevation angle information is not in the pre-specified range, the angle based gating mechanism 2060 deactivates the ADM because condition is a good indication that then there is no need to take any specific action, and the method 2600 returns to block 2602 to repeat.

For the radar modules that are equipped with multiple receive antennas, angle information can be obtained and used as part of the gesture classification process. In general, the user might be expected to perform the gesture within a limited angular range relative to the radar on the device. The limiting factor could be the GC 730, which might be trained on a data obtained within a limited field of view (FoV). In other words, gestures performed close to the radar antenna (e.g., near the radar boresight) can be classified by the GC 730 more easily and with greater confidence, but gestures performed at the far end of the radar's FOV (e.g., more towards the end fire of the radar FoV) can be more difficult for the GC 730 to classify and the difficulty of classification can lead to lower confidence. This is particularly true if the angle information is used in the gesture classification process. This dependence on angle is used in angle-based gating method 2600.

Figure 27:
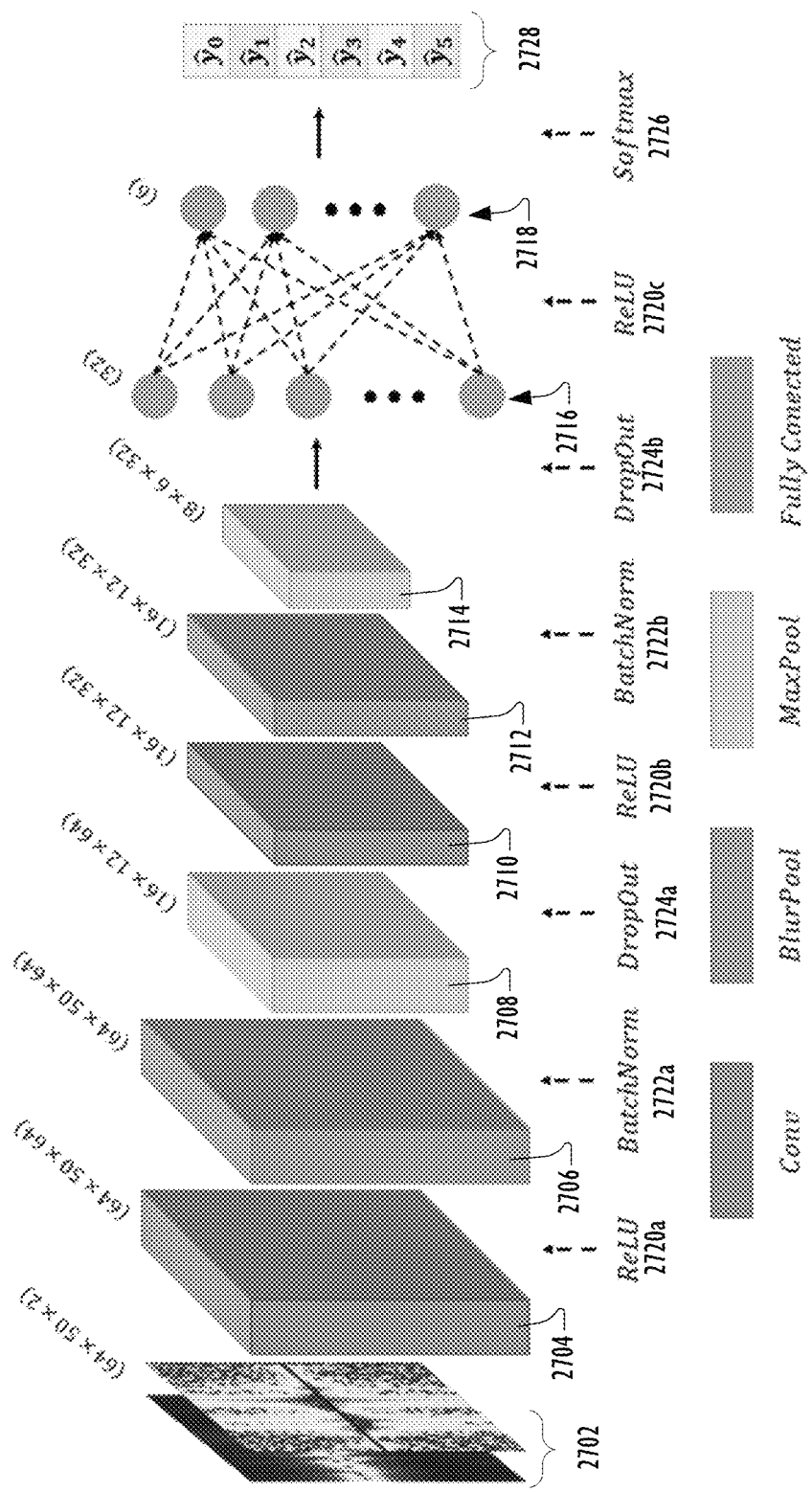
FIG. 27 illustrates a shift-invariant convolutional neural network (CNN) based architecture within a gesture classifier in accordance with an embodiment of this disclosure.

FIG. 27 illustrates a shift-invariant CNN-based architecture 2700 within a GC 730 in accordance with an embodiment of this disclosure. The CNN-based architecture 2700 is designed to classify the gestures. The input 2702 to the GC 730 is a TVD and/or a TAD. In certain embodiments, the CNN-based architecture 2700 is designed as a deep CNN because CNN has been shown to work remarkably well with tasks that involve unstructured data such as images, audio, and text due to its ability to automatically extract features in multiple stages (layers) and learn the patterns and representations of the input from raw data.

Regarding the dimensions of the CNN-based architecture 2700, $N_c$=64 and F=50, which are also the parameters used in evaluations. The CNN-based architecture 2700 includes two 2D-convolutional layers, two MaxPool layers, and two Dense layers. Among the two 2D-convolutional layers, one layer 2704 includes 64 channels and a kernel size of (7,8), and another layer 2710 includes 32 channels and a kernel size of (2,3). Among the two MaxPool layers, one layer 2708 includes a kernel size of (4,4), and another layer 2714 includes a kernel size of (2,2). Among the two Dense layers, one layer 2716 includes a size of 32, and another layer 2718 includes a size of 6 (corresponding to the number of gestures in the gesture vocabulary 800 of FIG. 8). In certain embodiments, to improve the robustness of the model against input-shifting, a couple of BlurPool layers 2706 and 2712 are additionally included in this CNN-based architecture 2700. That is, if ADM exhibits poor performance of by incorrectly indicating that a gesture has ended, the BlurPool layers increase the likelihood of an accurate gesture classification. Both of the BlurPool layers 2706 and 2712 have a kernel size of (3, 3).

The transformation of the input 2702 through multiple layers 2704-2718 of the neural network includes a first ReLU 2720a, a first BatchNorm 2722a, a first DropOut 2724a, a second ReLU 2720b, a second BatchNorm 2722b, a second DropOut 2724b, a third ReLU 2720c, and at the end of the CNN-based architecture 2700, a softmax activation function 2726 is attached to the last dense layer 2718 in order to enable the output 2728 to be multi-class classification. These functions in a pipeline of transformation are detailed operation soft the CNN-based architecture 2700.

The output 2728 includes six probabilities ($\hat{y}_0$ through $\hat{y}_5$) corresponding to the six gestures in the gesture vocabulary 800. Each probability within the output 2728 indicates the likelihood that the user performed the corresponding gesture. For example, a first probability $\hat{y}_0$ represents the likelihood that the user performed a radial circle gesture 802, and the fourth probability $\hat{y}_3$ represents the likelihood that the user performed a double pinch gesture 808.

Figure 28:
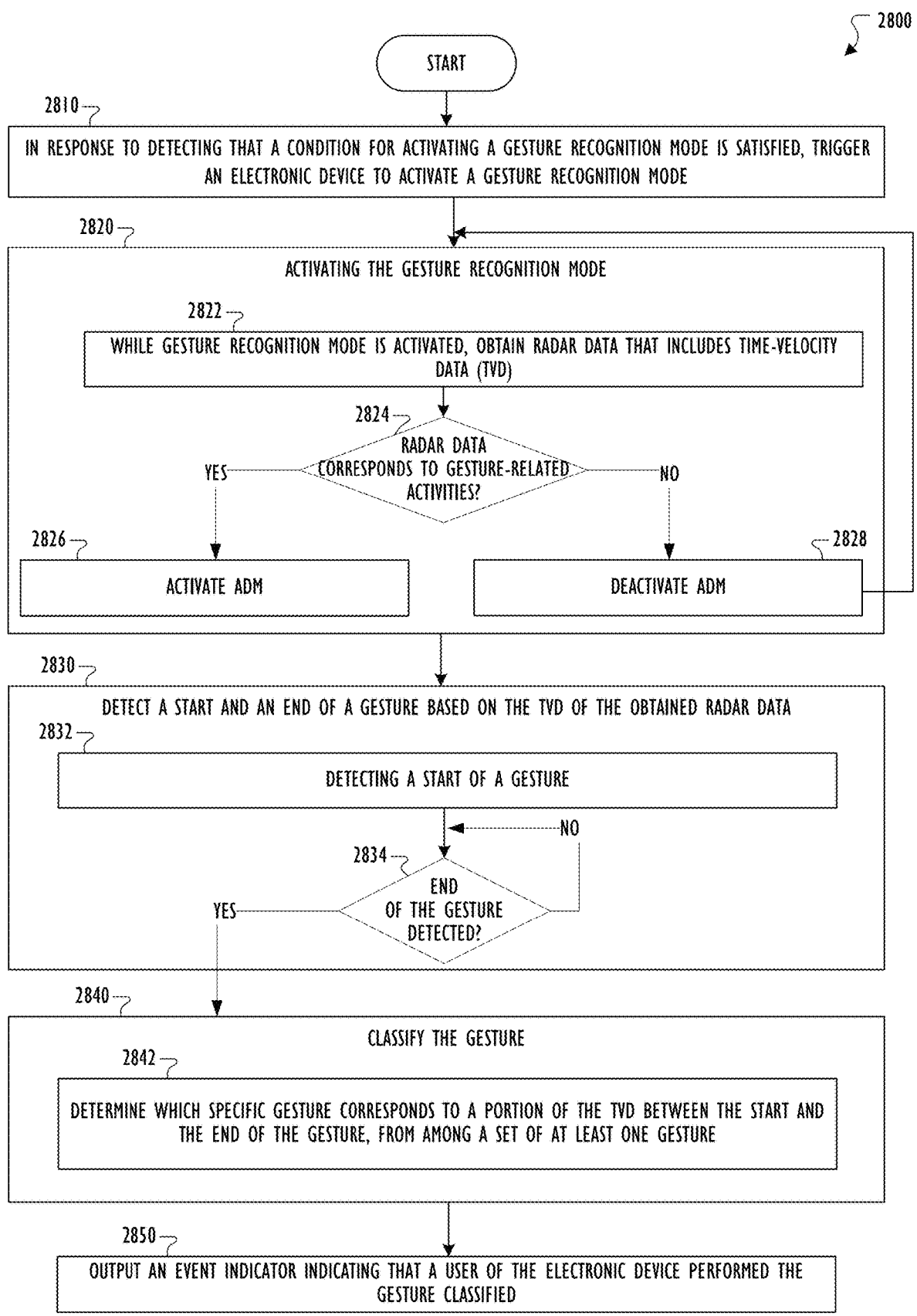
FIG. 28 illustrates a method for end-to-end dynamic gesture recognition using mmWave radar in accordance with an embodiment of this disclosure.

FIG. 28 illustrates a method 2800 for end-to-end dynamic gesture recognition using mmWave radar in accordance with an embodiment of this disclosure. The embodiment of the method 2800 shown in FIG. 28 is for illustration only, and other embodiments could be used without departing from the scope of this disclosure. The method 2800 is implemented by an electronic device that includes an end-to-end gesture recognition system 700 700, such as the electronic device 200 of FIG. 2. More particularly, the method 2800 could be and is described as being performed by a processor 240 of the electronic device 200.

In block 2810, the processor 240 triggers the electronic device to activate a gesture recognition mode, in response to detecting that a condition for activating the gesture recognition mode is satisfied.

In block 2820, the processor 240 activates the gesture recognition mode. Activating the gesture recognition mode can include sub-processes, such as the procedures at blocks 2822, 2824, 2826, and 2828. More particularly at block 2822, the processor 240 obtains radar data 740 while the gesture recognition mode is activated. The radar data includes time-velocity data and/or time-angle data. In certain embodiments, activating the gesture recognition mode enables the processor 240 to determine whether the obtained radar data corresponds to non-gesture activities or gesture-related activities. Particularly at block 2824, the processor 240 determines whether the obtained radar data corresponds to non-gesture activities or gesture-related activities. At block 2826, in response a determination that the radar data corresponds to gesture activities (illustrated as YES path), the processor 240 activates an ADM to detect the end of the gesture based on information extracted from the TVD. At block 2828, in response to determining that the radar data corresponds to non-gesture activities (illustrated as NO path), the processor 240 deactivates or maintains the ADM in a deactivated state.

In block 2830, the processor 240 detects a start and an end of a gesture based on the TVD of the obtained radar data. More particularly, at block 2832, the processor 240 detects a start of the gesture. At block 2834, the processor 240 determines whether the end of the gesture is detected. In response to a determination that the end of the gesture is not detected, the method 2800 repeats block 2834. In response to a determination that the end of the gesture is detected, the method proceeds to block 2840, at which the processor 240 classifies the gesture. In certain embodiments, the processor 240 (using the second end detector 1220 of FIG. 12A) detects the end of the gesture by using low-dimensional Doppler features extracted from the TVD of the obtained radar data. In certain embodiments, the processor 240 (using the third end detector 1230 of FIG. 12A) detects the end of the gesture by using burst information extracted from the TVD of the obtained radar data. In certain embodiments, at block 2830, it is sufficient for a ML-based ADM 724 with gating (including the first or second end detector 1210 or 1220) to determine the end of a gesture without determining the start of the gesture.

At block 2842, to classify the gesture, the processor 240 determines a gesture, from among a set of gestures, that corresponds to a portion of the TVD between the start and the end of the gesture. The set of gestures can be the gesture vocabulary 800 of FIG. 8. For example, the processor 240 determines that the user performed a double pinch gesture 808, by determining that among the probabilities within CNN's output 2728 of FIG. 27, the fourth probability $\hat{y}_3$ has the greatest value.

In block 2850, the processor 240 outputs an event indicator 770 indicating that a user of the electronic device performed the gesture classified. For example, in response to the determination that the fourth probability $\hat{y}_3$ has the greatest value among the probabilities within CNN's output 2728, the event indicator 770 can be an identifier of the fourth probability $\hat{y}_3$ or another identifier of the double pinch gesture 808.

Although FIG. 18 illustrates an example method 2800 for end-to-end dynamic gesture recognition using mmWave radar, various changes may be made to FIG. 28. For example, while shown as a series of steps, various steps in FIG. 28 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
triggering an electronic device to activate a gesture recognition mode in response to detecting that a proximity condition for activating the gesture recognition mode is satisfied and to deactivate the gesture recognition mode when the proximity condition is not satisfied;
obtaining radar data while the gesture recognition mode is activated, wherein the radar data includes time-velocity data (TVD);
after a determination from a binary classifier that the obtained radar data includes gesture activity, detecting an end of a gesture based on the TVD of the obtained radar data;
to classify the gesture, determining a gesture, from among a set of gestures, that corresponds to a portion of the TVD between a start and the end of the gesture; and
outputting an event indicator indicating that a user of the electronic device performed the gesture classified.

2. The method of claim 1, further comprising:
activating the gesture recognition mode by activating a gating mechanism to determine whether the obtained radar data corresponds to non-gesture activities or gesture-related activities;
in response to determining that the radar data corresponds to gesture activities, activating an activity detection module (ADM) to detect the end of the gesture based on information extracted from the TVD; and
in response to determining that the radar data corresponds to non-gesture activities, deactivating or maintaining the ADM in a deactivated state.

3. The method of claim 2, further comprising determining, using the activated gating mechanism, whether the obtained radar data corresponds to non-gesture activities or gesture-related activities based on at least one of:
a first peak detection;
a variation in range during the gesture;
average TVD;
a persistent increase in the TVD;
a burst detection;
an elevation angle; and
an azimuth angle.

4. The method of claim 1, wherein:
detecting the end of the gesture further comprises detecting, using an activity detection module (ADM), the end of a gesture based on information extracted from the TVD, and
the information extracted from the TVD includes low-dimensional Doppler features.

5. The method of claim 1, wherein:
Detecting the end of the gesture further comprises detecting, using an activity detection module (ADM), the end of a gesture based on information extracted from the TVD, and
the information extracted from the TVD includes burst information.

6. The method of claim 5, wherein detecting the end of the gesture further comprises:
determining whether a burst is detected based on a level of movement within a current frame of radar transmission;
determining that the current frame is not the end of a gesture in response to a determination that the burst is detected within the current frame; and
determining that the current frame is the end of a gesture in response to a determination that the burst is not detected within a threshold number of consecutive frames including the current frame.

7. The method of claim 1, further comprising:
classifying the gesture using a gesture classifier that includes a convolutional neural network-based (CNN-based) architecture that is shift-invariant,
wherein the CNN-based architecture includes one or more blur pool layers.

8. An electronic device comprising:
a transceiver; and
a processor operatively connected to the transceiver, the processor configured to:
trigger the electronic device to activate a gesture recognition mode in response to detecting that a proximity condition for activating the gesture recognition mode is satisfied and to deactivate the gesture recognition mode when the proximity condition is not satisfied;
obtain radar data while the gesture recognition mode is activated, wherein the radar data includes time-velocity data (TVD);
after a determination from a binary classifier that the obtained radar data includes gesture activity, detect an end of a gesture based on the TVD of the obtained radar data;
to classify the gesture, determine a gesture, from among a set of gesture, that corresponds to a portion of the TVD between a start and the end of the gesture; and
output an event indicator indicating that a user of the electronic device performed the gesture classified.

9. The electronic device of claim 8, wherein:
to activate the gesture recognition mode, the processor is further configured to activate a gating mechanism to determine whether the obtained radar data corresponds to non-gesture activities or gesture-related activities;

the processor is further configured to:
in response to determining that the radar data corresponds to gesture activities, activate an activity detection module (ADM) to detect the end of the gesture based on information extracted from the TVD; and
in response to determining that the radar data corresponds to non-gesture activities, deactivate or maintain the ADM in a deactivated state.

10. The electronic device of claim 9, the processor is further configured to determine, using the activated gating mechanism, whether the obtained radar data corresponds to non-gesture activities or gesture-related activities based on at least one of:
a first peak detection;
a variation in range during the gesture;
average TVD;
a persistent increase in the TVD;
a burst detection;
an elevation angle; and
an azimuth angle.

11. The electronic device of claim 8, wherein:
to detect the end of the gesture, the processor is further configured to detect, using an activity detection module (ADM), the end of a gesture based on information extracted from the TVD, and
the information extracted from the TVD includes low-dimensional Doppler features.

12. The electronic device of claim 8, wherein:
to detect the end of the gesture, the processor is further configured to detect, using an activity detection module (ADM), the end of a gesture based on information extracted from the TVD, and
the information extracted from the TVD includes burst information.

13. The electronic device of claim 12, wherein to detect the end of the gesture, the processor is further configured to:
determine whether a burst is detected based on a level of movement within a current frame of radar transmission;
determine that the current frame is not the end of a gesture in response to a determination that the burst is detected within the current frame; and
determine that the current frame is the end of a gesture in response to a determination that the burst is not detected within a threshold number of consecutive frames including the current frame.

14. The electronic device of claim 8, wherein the processor is further configured to:
classify the gesture using a gesture classifier that includes a convolutional neural network-based (CNN-based) architecture that is shift-invariant, and
wherein the CNN-based architecture includes one or more blur pool layers.

15. A non-transitory, computer readable medium embodying a computer program, the computer program comprising program code that, when executed by a processor of an electronic device, causes the electronic device to:
trigger a gesture recognition mode in response to detecting that a proximity condition for activating the gesture recognition mode is satisfied and to deactivate the gesture recognition mode when the proximity condition is not satisfied;
obtain radar data while the gesture recognition mode is activated, wherein the radar data includes time-velocity data (TVD);
after a determination from a binary classifier that the obtained radar data includes gesture activity, detect an end of a gesture based on the TVD of the obtained radar data;
to classify the gesture, determine a gesture, from among a set of gesture, that corresponds to a portion of the TVD between a start and the end of the gesture; and
output an event indicator indicating that a user of the electronic device performed the gesture classified.

16. The non-transitory computer readable medium of claim 15, wherein:
the program code that, when executed, causes the electronic device to activate the gesture recognition mode further comprises program code that, when executed, causes the electronic device to activate a gating mechanism to determine whether the obtained radar data corresponds to non-gesture activities or gesture-related activities; and
the computer program further comprises program code that, when executed, causes the electronic device to:
in response to determining that the radar data corresponds to gesture activities, activate an activity detection module (ADM) to detect the end of the gesture based on information extracted from the TVD; and
in response to determining that the radar data corresponds to non-gesture activities, deactivate or maintain the ADM in a deactivated state.

17. The non-transitory computer readable medium of claim 15, wherein:
the program code that, when executed, causes the electronic device to detect the end of the gesture further comprises program code that, when executed, causes the electronic device to detect, using an activity detection module (ADM), the end of a gesture based on information extracted from the TVD, and
the information extracted from the TVD includes low-dimensional Doppler features.

18. The non-transitory computer readable medium of claim 15, wherein:
the program code that, when executed, causes the electronic device to detect the end of the gesture further comprises program code that, when executed, causes the electronic device to detect, using an activity detection module (ADM), the end of a gesture based on information extracted from the TVD, and
the information extracted from the TVD includes burst information.

19. The non-transitory computer readable medium of claim 18, wherein the program code that, when executed, causes the electronic device to detect the end of the gesture further comprises program code that when executed causes the electronic device to:
determine whether a burst is detected based on a level of movement within a current frame of radar transmission;
determine that the current frame is not the end of a gesture in response to a determination that the burst is detected within the current frame; and
determine that the current frame is the end of a gesture in response to a determination that the burst is not detected within a threshold number of consecutive frames including the current frame.

20. The non-transitory computer readable medium of claim 15, further comprising program code that, when executed, causes the electronic device to:

classify the gesture using a gesture classifier that includes a convolutional neural network-based (CNN-based) architecture that is shift-invariant, and
wherein the CNN-based architecture includes one or more blur pool layers.

* * * * *